(12) United States Patent
Johns et al.

(10) Patent No.: US 9,149,778 B2
(45) Date of Patent: Oct. 6, 2015

(54) DEVICE AND METHOD FOR DISPENSING CATALYST PELLETS

(71) Applicant: Extundo Incorporated, Louisville, KY (US)

(72) Inventors: Clifford L. Johns, Louisville, KY (US); Munaf Chasmawala, Louisville, KY (US); Dennis McAndrews, Jeffersonville, IN (US)

(73) Assignee: Extundo Incorporated, Louisville, KY (US)

( * ) Notice: Subject to any disclaimer, the term of this patent is extended or adjusted under 35 U.S.C. 154(b) by 302 days.

(21) Appl. No.: 13/848,269

(22) Filed: Mar. 21, 2013

(65) Prior Publication Data

US 2013/0233882 A1   Sep. 12, 2013

Related U.S. Application Data

(63) Continuation-in-part of application No. 13/489,518, filed on Jun. 6, 2012, which is a continuation-in-part of application No. 13/102,662, filed on May 6, 2011, now Pat. No. 8,646,492.

(60) Provisional application No. 61/347,483, filed on May 24, 2010.

(51) Int. Cl.
*B01J 8/00* (2006.01)
*B01J 8/06* (2006.01)

(52) U.S. Cl.
CPC *B01J 8/003* (2013.01); *B01J 8/002* (2013.01); *B01J 8/067* (2013.01); *B01D 2259/128* (2013.01); *B01J 2208/00752* (2013.01)

(58) Field of Classification Search
CPC ............... B01D 2259/128; B01J 2208/00752; B01J 8/002; B01J 8/003; B01J 8/067; B01J 4/005
USPC ............... 141/1, 65, 247, 248, 284; 422/219; 209/21, 245, 250
See application file for complete search history.

(56) References Cited

U.S. PATENT DOCUMENTS

| | | | |
|---|---|---|---|
| 3,223,490 A | | 12/1965 | Sacken |
| 3,379,477 A | * | 4/1968 | Beckmeyer .................. 406/121 |
| 3,438,681 A | * | 4/1969 | Lunde ......................... 209/139.1 |
| 3,858,628 A | * | 1/1975 | Bendle ............................ 141/46 |
| 3,913,806 A | | 10/1975 | Red, Jr. |
| 4,000,061 A | * | 12/1976 | Bowling et al. ................. 209/21 |

(Continued)

FOREIGN PATENT DOCUMENTS

| CN | 2683241 | 3/2005 |
|---|---|---|
| CN | 1765481 | 5/2006 |

(Continued)

*Primary Examiner* — Timothy L Maust
(74) *Attorney, Agent, or Firm* — Camoriano and Associates

(57) ABSTRACT

A device and method for dispensing catalyst pellets from a hopper to a chemical reactor. The hopper receives and holds the catalyst pellets at an elevation above the elevation of the chemical reactor. The flow of the catalyst pellets is controlled so they flow into and through a conduit in a widely spaced-apart arrangement to the chemical reactor. This controlled, spaced-apart flow is created by providing a sieve between a hopper and the conduit having openings small enough that the catalyst pellets form bridges above the openings, and then repeatedly breaking up the bridges in a controlled manner.

19 Claims, 52 Drawing Sheets

(56) References Cited

U.S. PATENT DOCUMENTS

| | | |
|---|---|---|
| 4,402,643 A | 9/1983 | Lytton et al. |
| 4,597,946 A | 7/1986 | Ward |
| 4,701,101 A | 10/1987 | Sapoff |
| 5,143,126 A * | 9/1992 | Boesch et al. .................... 141/1 |
| 5,626,455 A | 5/1997 | Keller et al. |
| 5,906,229 A * | 5/1999 | Haquet et al. ................ 141/286 |
| 6,170,670 B1 | 1/2001 | Kato et al. |
| 6,183,232 B1 | 2/2001 | Bequette |
| 6,725,706 B2 | 4/2004 | Johns |
| 7,285,251 B2 | 10/2007 | Johns |
| 7,765,948 B2 | 8/2010 | Johns |
| 7,776,288 B2 | 8/2010 | Dialer et al. |
| 7,836,919 B2 | 11/2010 | Johns et al. |
| 7,861,875 B2 | 1/2011 | Johns |
| 7,878,225 B2 | 2/2011 | Johns |
| 7,897,120 B2 | 3/2011 | Hoffmann et al. |
| 8,166,811 B2 | 5/2012 | Johns |
| 2002/0129642 A1 | 9/2002 | Johns et al. |
| 2003/0194360 A1 | 10/2003 | Huziwara |
| 2004/0146457 A1 | 7/2004 | Bence |
| 2007/0196253 A1 | 8/2007 | Stocksiefen et al. |
| 2008/0149215 A1 | 6/2008 | Patureaux et al. |
| 2008/0193267 A1 | 8/2008 | Hoffmann et al. |
| 2008/0302388 A1 | 12/2008 | Johns |
| 2009/0095211 A1 | 4/2009 | Johns |
| 2009/0097958 A1 | 4/2009 | Camoriano et al. |
| 2009/0112367 A1 | 4/2009 | DeCourcy |
| 2009/0145727 A1 | 6/2009 | Johns |
| 2010/0059137 A1 | 3/2010 | Johns |
| 2011/0020186 A1 | 1/2011 | Beech |
| 2011/0083769 A1 | 4/2011 | Sanz et al. |
| 2011/0277421 A1 | 11/2011 | Te Raa et al. |
| 2011/0283666 A1 | 11/2011 | Johns et al. |
| 2012/0000761 A1 | 1/2012 | Bronshtein |

FOREIGN PATENT DOCUMENTS

| | | |
|---|---|---|
| DE | 19593628 | 4/1996 |
| WO | WO2010068094 | 6/2010 |
| WO | WO2011149636 | 12/2011 |

* cited by examiner

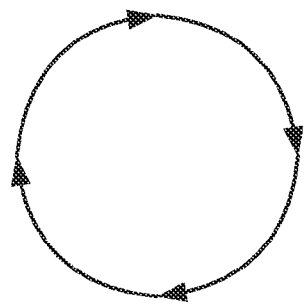
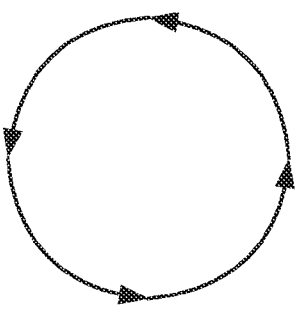
Fig 12A　　　　　Fig 12B
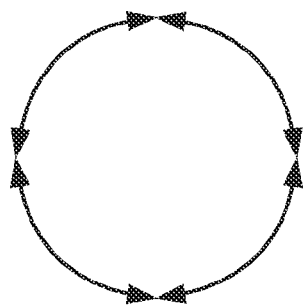
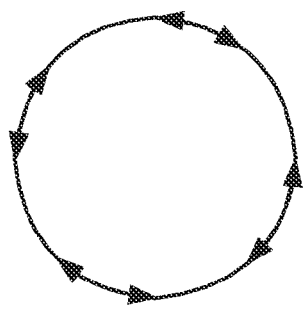
Fig 12C　　　　　Fig 12D
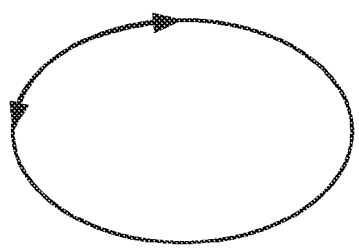
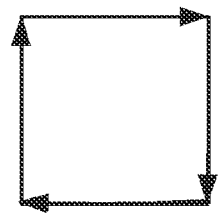
Fig 12E　　　　　Fig 12F
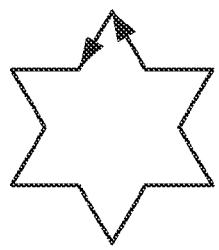
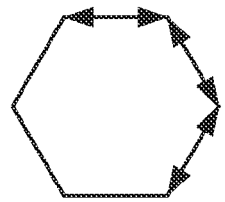
Fig 12G　　　　　Fig 12H

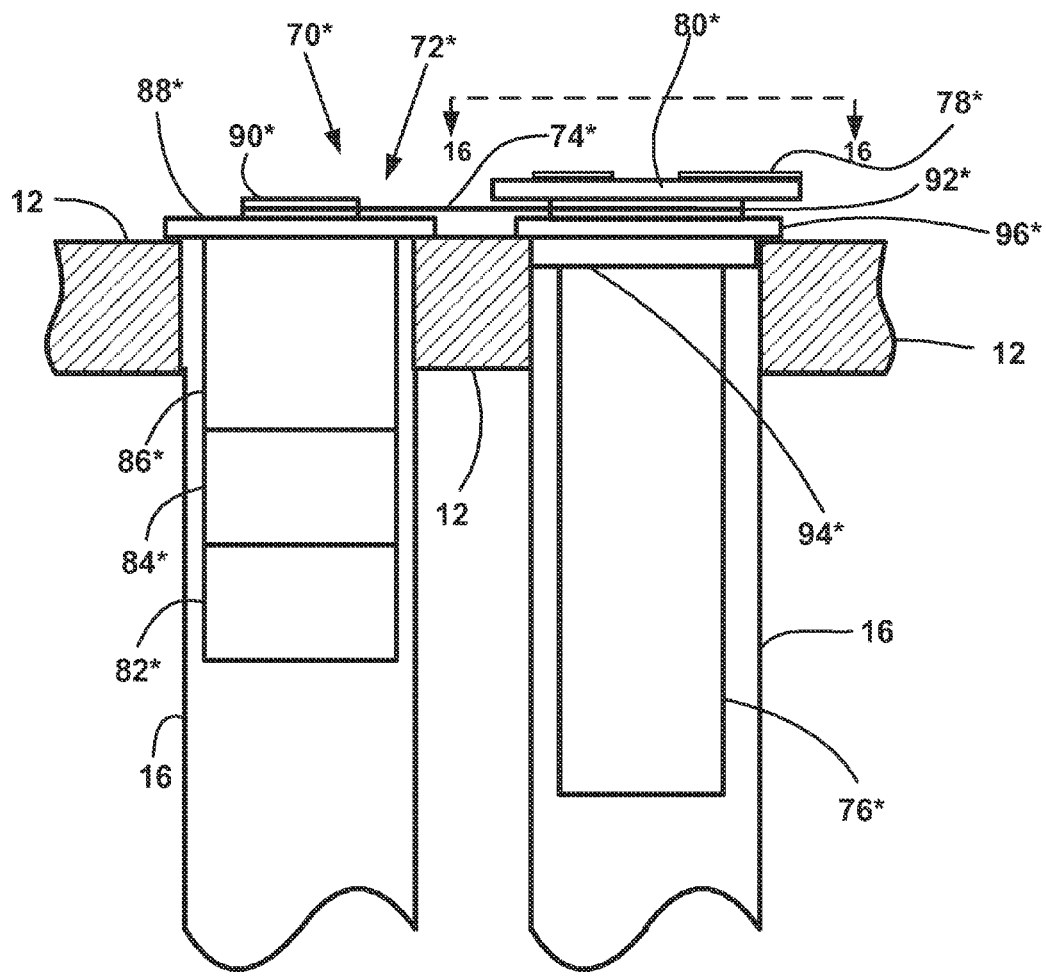
Fig 15
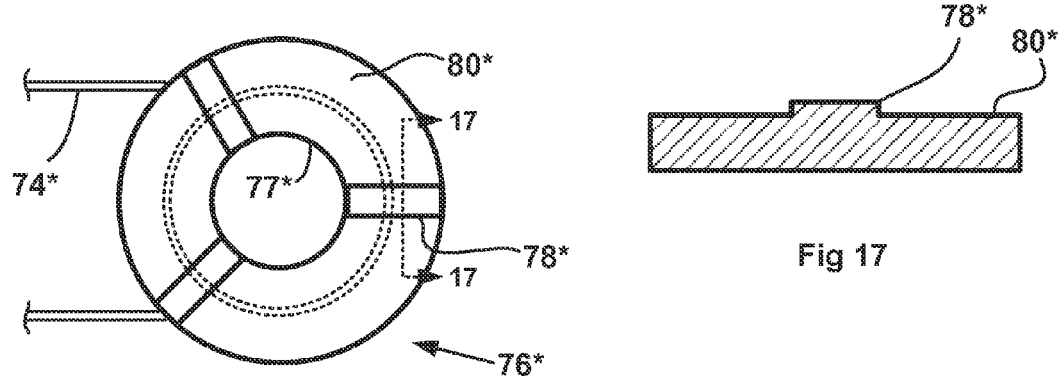
Fig 16
Fig 17

DEVICE AND METHOD FOR DISPENSING CATALYST PELLETS

BACKGROUND

This application is a continuation-in-part of U.S. application Ser. No. 13/193,739 filed Jun. 6, 2012, which is a continuation-in-part of U.S. application Ser. No. 13/102,662 filed May 6, 2011, which claims priority from U.S. Provisional Application Ser. No. 61/347,483 filed May 24, 2010, all of which are hereby incorporated herein by reference.

The present invention relates to a device and method for dispensing catalyst pellets to a chemical reactor, such as into a chemical reactor vessel or into the vertical tubes of a chemical reactor vessel.

Many chemical reactors are essentially a large shell and tube heat exchanger vessel, with the reaction occurring inside the tubes and a coolant circulating in the vessel outside the tubes. A chemical reactor vessel also can be a simple tank with a single volume of catalyst inside it, or it may be a single large tube. Some chemical reactions occur in furnace or reformer tubes, which may be a part of a system with 10 to 500 or more such tubes. In any of these reactor vessels, catalyst, typically in the form of pellets (including spacer pellets), may be loaded into the reactor to facilitate the reaction. The pellets are replaced periodically. The reactor tubes may be quite long, housed in a structure several stories tall, and the catalyst pellets may be transported up several stories to an elevation above the top of the tubes so they may then flow by gravity into the tubes. The catalyst pellets typically are supplied in 2,000 pound (or larger) "super sacks", 55 gallon drums, mini drums, metal bins or plastic bags loaded in pallet-mounted cardboard boxes.

The catalyst pellets may be dispensed onto the reactor tube sheet by flowing down through a large diameter hose. The diameter of the hose is large enough that the catalyst pellets do not bridge inside the hose. However, the hose is very heavy and difficult to handle, since it is essentially filled with catalyst. Also, the catalyst pellets rub against each other, abrade and crush each other as they pass through the hose, creating dust.

Once the catalyst pellets are dispensed from the hose, they are then carefully loaded into each reactor tube (there may be several thousand tubes in a single reactor) to try to uniformly fill each tube. It is desirable to prevent bridging of the catalyst pellets in the reactor tube, because bridging can create voids or areas within a tube in which there are no catalyst pellets. Mechanical devices may be used to aid in the dispensing of the catalyst pellets.

In some cases, in a shell and tube reactor in which vertical reactor tubes are supported by upper and lower tube sheets, a template is placed over a portion of the upper tube sheet. The template has openings aligned with the tops of the reactor tubes, with the openings in the templates having a smaller diameter than the inside diameter of the cylindrical reactor tubes in order to restrict the flow of catalyst pellets into the reactor tubes to prevent bridging in the tubes. Catalyst pellets are dumped on top of the template, and operators then use their gloved hands, paddles, brooms, or rakes to spread the catalyst pellets back and forth across the template so that catalyst pellets fall through the holes in the template and into the respective reactor tubes. Moving the catalyst pellets back and forth breaks up any bridging of the catalyst pellets above the template, allowing the catalyst pellets to flow through the holes in the template and into the reactor tubes.

In other instances, loading sleeves are inserted into each reactor tube, with each loading sleeve having a top opening that is smaller than the inside diameter of the cylindrical reactor tube in order to limit the flow of catalyst pellets to prevent bridging inside the reactor tubes. Again, the catalyst pellets are dumped on top of the loading sleeves, and the operators push the catalyst pellets back and forth across the loading sleeves so that the catalyst pellets fall through the holes in the loading sleeves and into the respective reactor tubes.

Various other dispensing techniques also are known, such as the method taught in U.S. Pat. No. 3,223,490 "Sacken", in which a tray with a plurality of downwardly extending loading sleeves is placed directly above the tube sheet, with the loading sleeves extending into respective reactor tubes. The catalyst is poured onto the tray, and then the tray is vibrated up and down vertically, shaking the catalyst pellets to break up any bridges and allow the catalyst pellets to fall through the sleeves in the tray and into the reactor tubes. The vibration of the catalyst pellets causes them to rub against and impact against each other. Catalyst is a friable material and thus is brittle and readily crumbled. It is desirable to minimize the opportunity for the catalyst pellets to rub against or impact against each other or otherwise to be abraded or crushed, because such abrasion and crushing damages the catalyst pellets and creates dust. Raking the catalyst pellets back and forth across the template or loading sleeves creates substantial abrading of the catalyst pellets, creating dust particles which may not only fall into the reactor tubes creating higher pressure drops than desirable, but which also may become airborne, creating a health hazard for personnel inside the reactor vessel. Vibrating a tray full of catalyst as in the Sacken arrangement also causes the catalyst pellets to be jostled and to rub against and impact against each other, which also produces similar results.

SUMMARY

The present invention relates to a device and method for controlled and gentle dispensing of catalyst pellets.

BRIEF DESCRIPTION OF THE DRAWINGS

FIGS. 12A-12H are schematic plan views of some of the possible motions which may be made by the dispensing device of FIG. 10;

FIG. 15 is a broken away view, partially in section, of another embodiment of a device for dispensing catalyst;

FIG. 16 is a view taken along line 16-16 of FIG. 15;

FIG. 17 is a view taken along line 17-17 of FIG. 16;

DESCRIPTION

Figure 1:
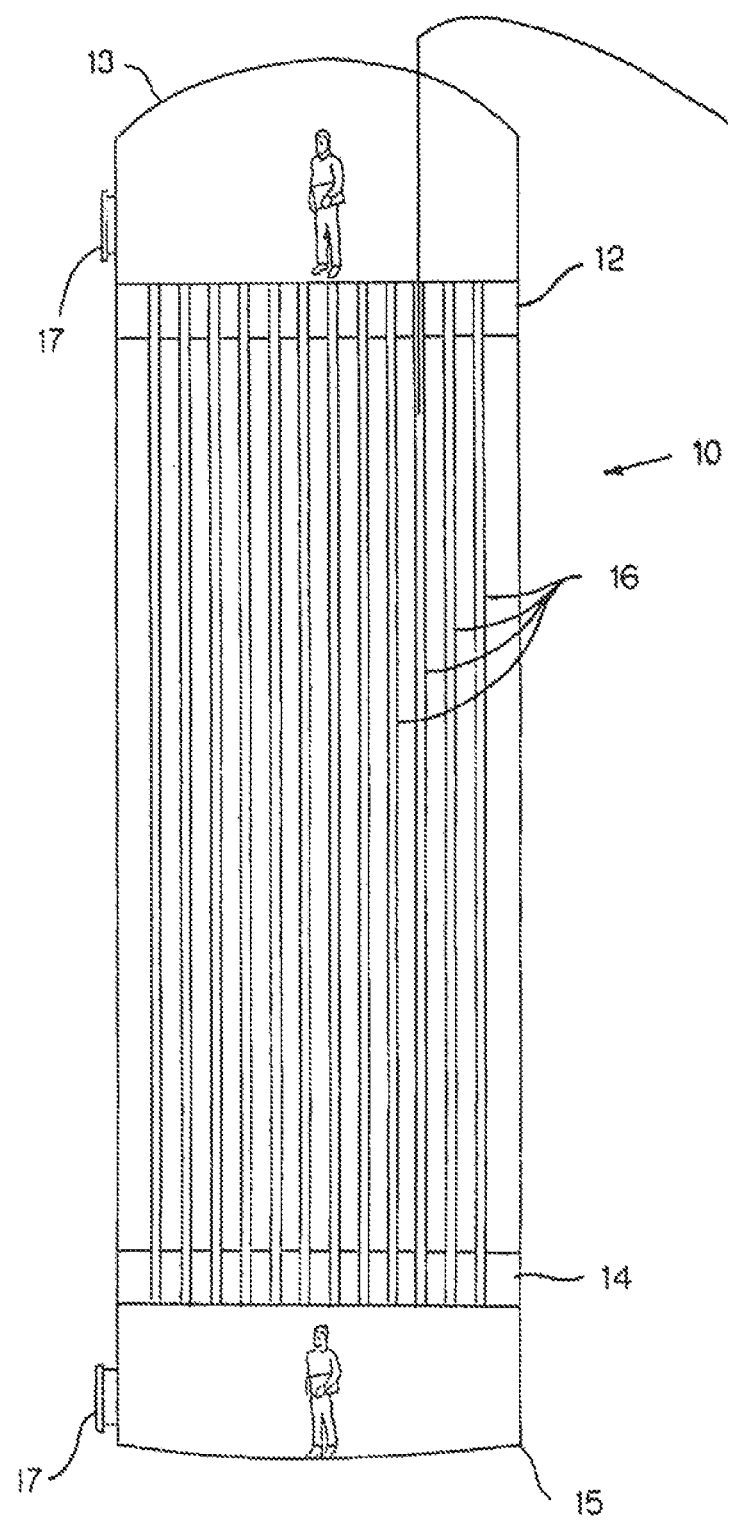
FIG. 1 is a schematic, section view of a shell and tube type of chemical reactor vessel.

FIG. 1 depicts a typical chemical reactor vessel 10, which is a shell and tube heat exchanger, having an upper tube sheet 12 and a lower tube sheet 14 with a plurality of vertical tubes 16 welded or expanded to the tube sheets 12, 14 to form a tightly packed tube bundle. There may be from one to many hundreds or even thousands of cylindrical tubes 16 extending between the tube sheets 12, 14. Each tube 16 has a top end adjacent the upper tube sheet 12 and a bottom end adjacent the lower tube sheet 14, and the tubes 16 are open at both ends, except that there may be a clip at the bottom end to retain catalyst pellets inside the tube. The upper and lower tube sheets 12, 14 have openings that are the size of the outside diameter of the tubes 16, with each tube 16 located in its respective openings in the tube sheets 12, 14.

The vessel 10 includes a top dome (or top head) 13 and a bottom dome (or bottom head) 15, as well as manways 17 for access to the tube sheets 12, 14 inside the vessel 10. The manways are closed during operation of the reactor but are opened for access, such as during catalyst handling. In this instance, the tubes 16 are filled with catalyst pellets, which facilitate the chemical reaction. (It may be noted that similarly-shaped shell and tube heat exchangers may be used for other purposes, such as for a boiler or other heat exchanger.)

This particular reactor vessel 10 is fairly typical. Its tubes may range in length from 5 feet to 65 feet, and it may be surrounded by a structural steel skid or framework (not shown), which includes stairways or elevators for access to the tube sheet levels of the reactor vessel 10 as well as access to intermediate levels and to a topmost level which may be located at or near the level of the top opening of the reactor vessel 10. On a regular basis, which can be every 2 to 48 months or longer, as the catalyst becomes less efficient, less productive, or "poisoned", it is changed out, with the old catalyst being removed and a new charge of catalyst being installed in the tubes 16 of the reactor vessel 10. Catalyst handling also may have to be done on an emergency basis, on an unplanned and usually undesirable schedule.

A catalyst change operation involves a complete shutdown of the reactor, resulting in considerable cost due to lost production. (The dispensing devices shown and described herein may be used both for the initial loading of a new reactor and for catalyst change operations.) It is desirable to minimize the amount of time required for the catalyst change operation in order to minimize the lost production and accompanying cost caused by the reactor shutdown.

Figure 2:
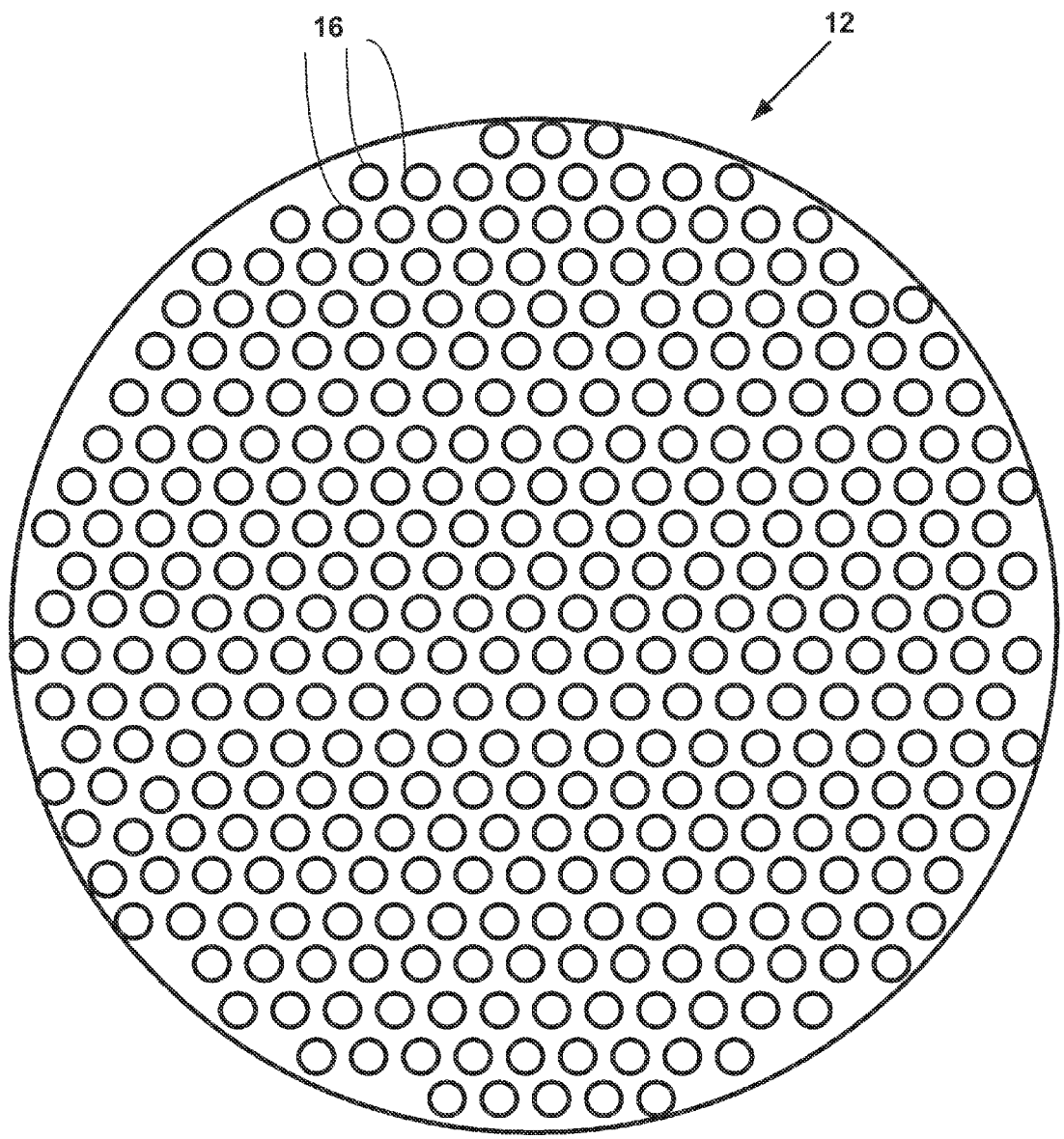
FIG. 2 is a plan view of the upper tube sheet of the reactor of FIG. 1.
Figure 3:
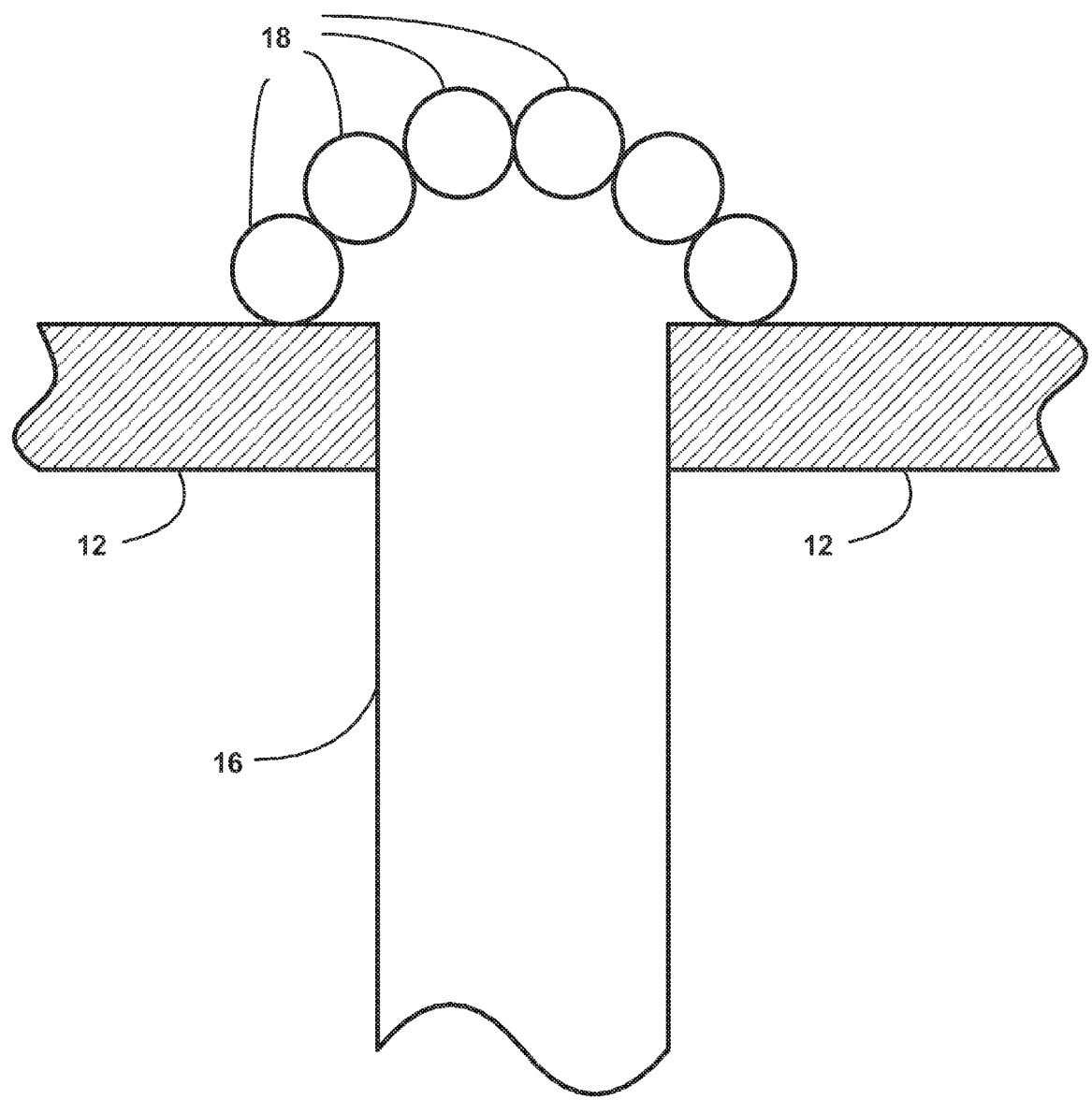
FIG. 3 is a broken away, schematic section view of a single reactor tube, tube sheet, and catalyst pellets, showing the catalyst pellets bridging across the top opening of the reactor tube.

FIG. 2 is a schematic plan view of the upper tube sheet 12 of FIG. 1, including a plurality of reactor tubes 16 (and is identical to the lower tube sheet 14). As shown in FIG. 3, catalyst pellets 18 may bridge over the open top end of the reactor tube 16 when trying to load catalyst into the reactor tube 16, which prevents the catalyst pellets from entering into the reactor tube 16. This occurs when the inside diameter of the open top end of the reactor tube 16 is less than about four times the diameter of the catalyst pellets. If the inside diameter of the reactor tube 16 and of the opening at the top of the reactor tube 16 are 8 times the size of the largest dimension of the catalyst pellets 18 or greater, bridging is very unlikely to occur.

Figure 4:
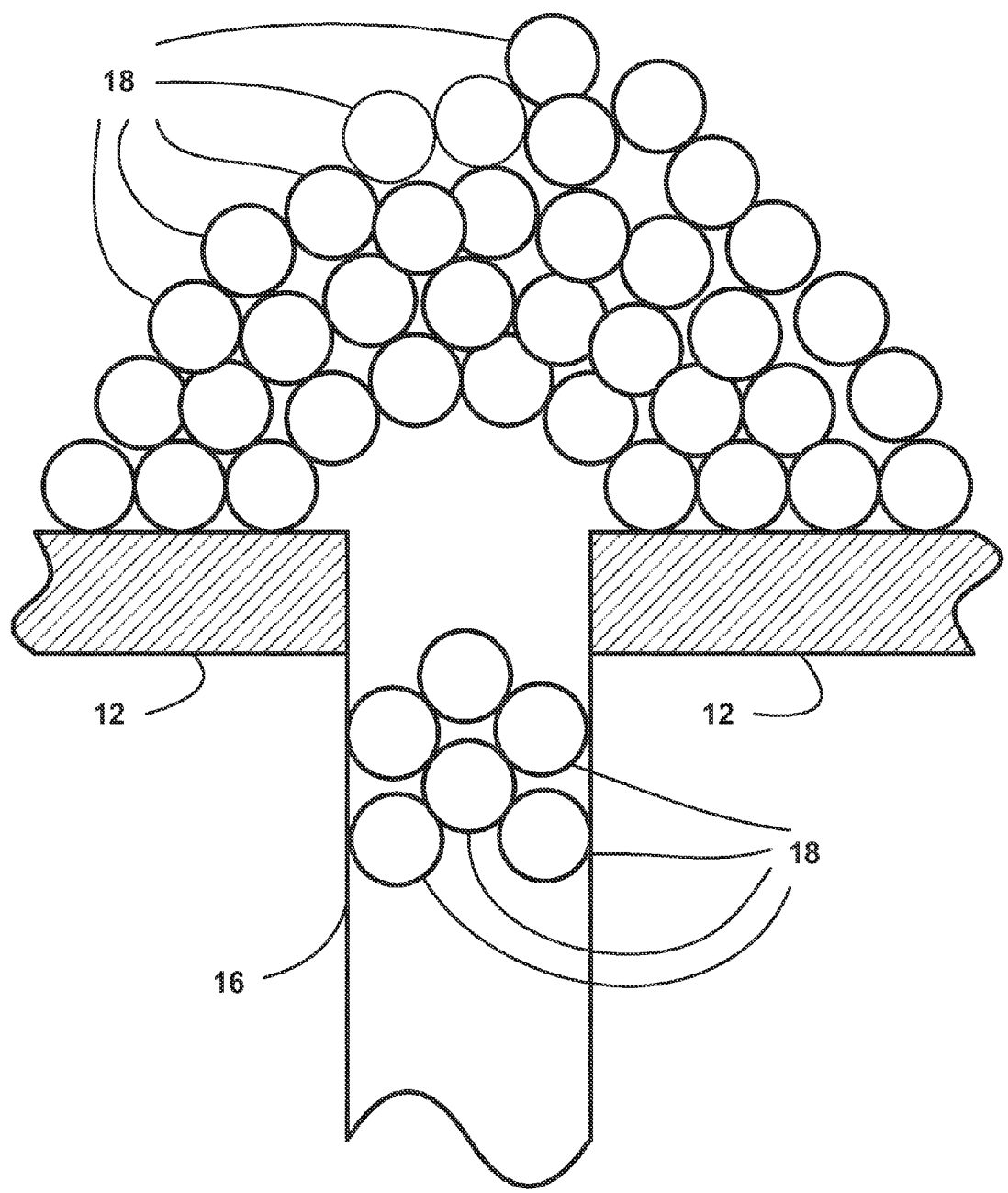
FIG. 4 is a broken away, schematic section view, similar to FIG. 3, but showing a much larger number of catalyst pellets bridging across the top opening of the reactor tube, and illustrates catalyst pellets bridging inside a reactor tube.

FIG. 4 shows that the bridging situation is exacerbated as more catalyst pellets 18 are dumped on top of the tube sheet 12. Furthermore, if two or more catalyst pellets 18 fall into the top opening of the reactor tube at approximately the same time, the conditions are favorable for forming a bridge inside the reactor tube 16, as shown in FIG. 4, which creates a void or space below the bridged catalyst inside the tube 16, preventing the catalyst from completely filling the reactor tube 16 and resulting in a non-uniform and undesirable catalyst loading of the reactor tube 16.

Figure 5:
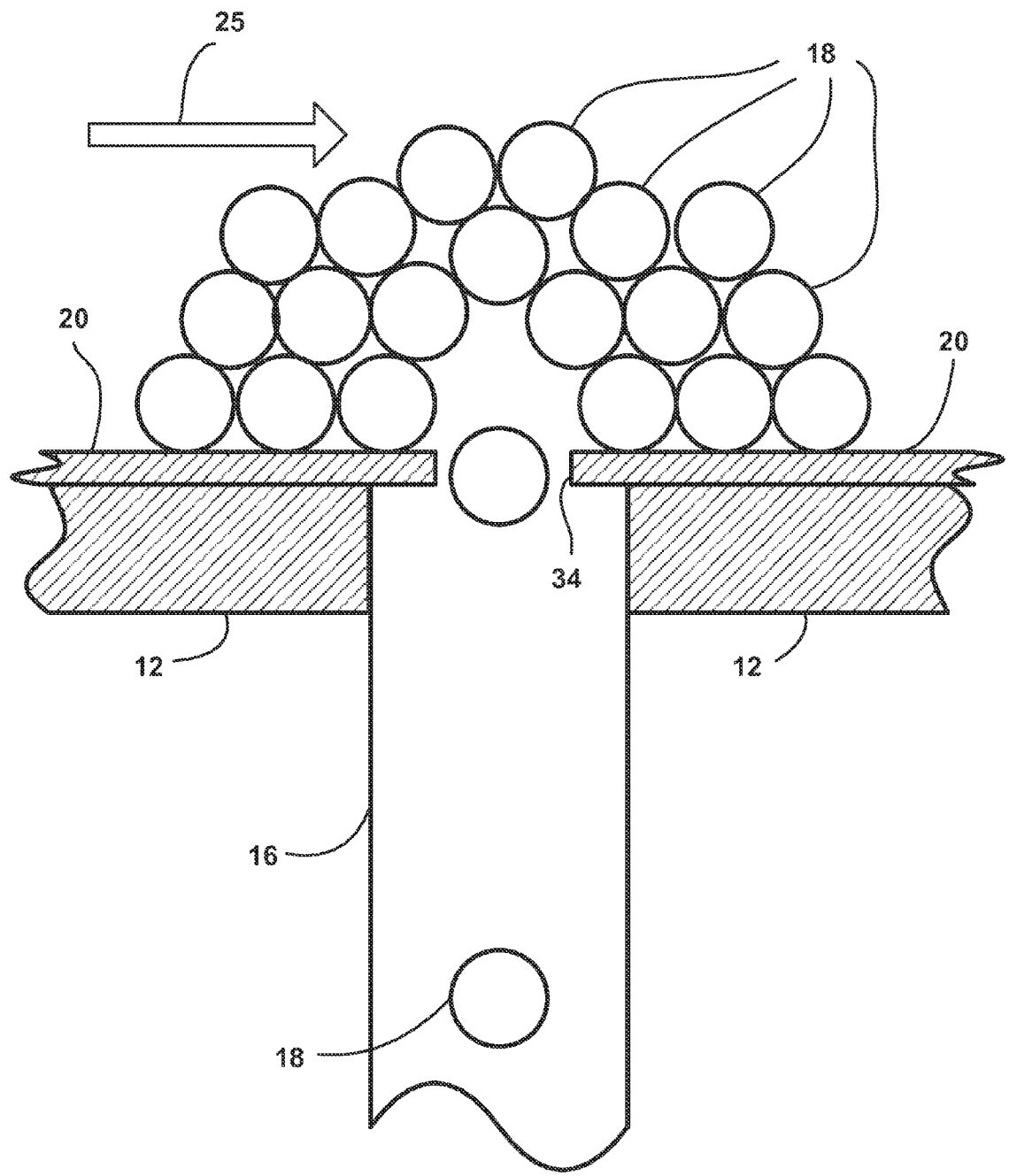
FIG. 5 is a broken away schematic section view, similar to FIG. 4, but with the addition of a template to aid in the dispensing of the catalyst pellets into the reactor tube.
Figure 5A:
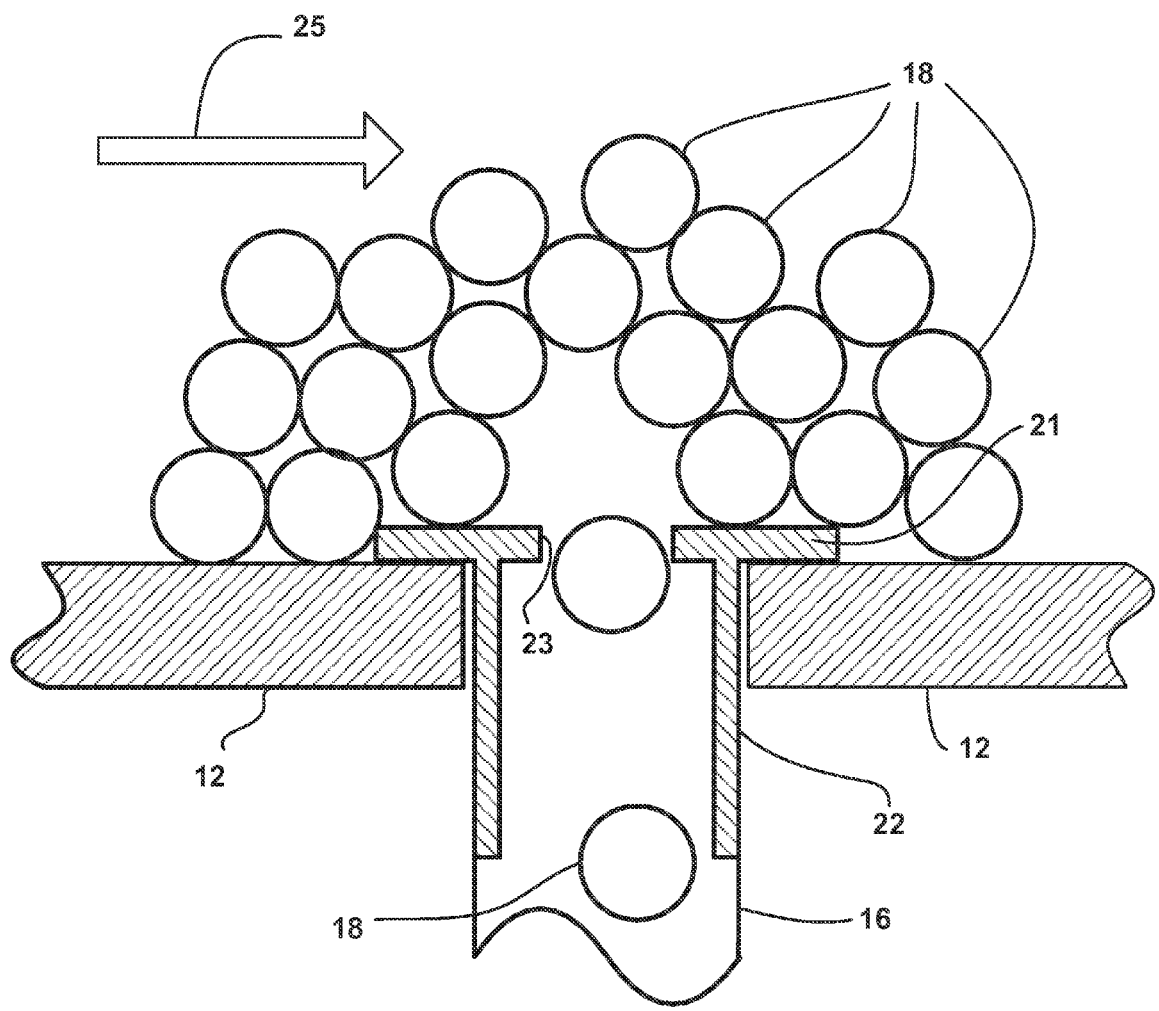
FIG. 5A is a broken away schematic section view, similar to FIG. 5, but using a loading sleeve instead of a template to aid in the dispensing of the catalyst pellets into the reactor tube.

To prevent bridging of catalyst pellets 18 inside the reactor tube 16, prior art devices have relied on templates 20 (as shown in FIG. 5) or loading sleeves 22 (as shown in FIG. 5A) which have smaller openings 34 (in FIGS. 5) and 23 (in FIG. 5A) than the reactor tubes 16 and thereby restrict the flow of catalyst pellets 18 into the reactor tubes 16 so as to prevent bridging inside the tube 16. (i.e., if the catalyst pellets flow through the tube 16 in "single file" or few enough at a time that they cannot span the full diameter of the tube at any one time, bridging will not occur.) However, the catalyst pellets 18 still form natural bridges atop the template 20 or atop the loading sleeve 22. Operators sweep the mound of catalyst pellets 18, as depicted by the arrow 25 in FIGS. 5 and 5A, using gloved hands, paddles, brooms, rakes, and other such devices to break the bridging so that additional catalyst pellets 18 fall through the openings 34 in the template 20 (or through the openings 23 in the flanges 21 of the loading sleeves 22) and drop into the reactor tubes 16. This sweeping action is applied to substantially the entire mass of catalyst pellets 18 resting atop the template 20 or loading sleeves 22, causing many of the brittle catalyst pellets 18 to abrade, fracture, and break into smaller particles and forming dust.

Figure 6A:
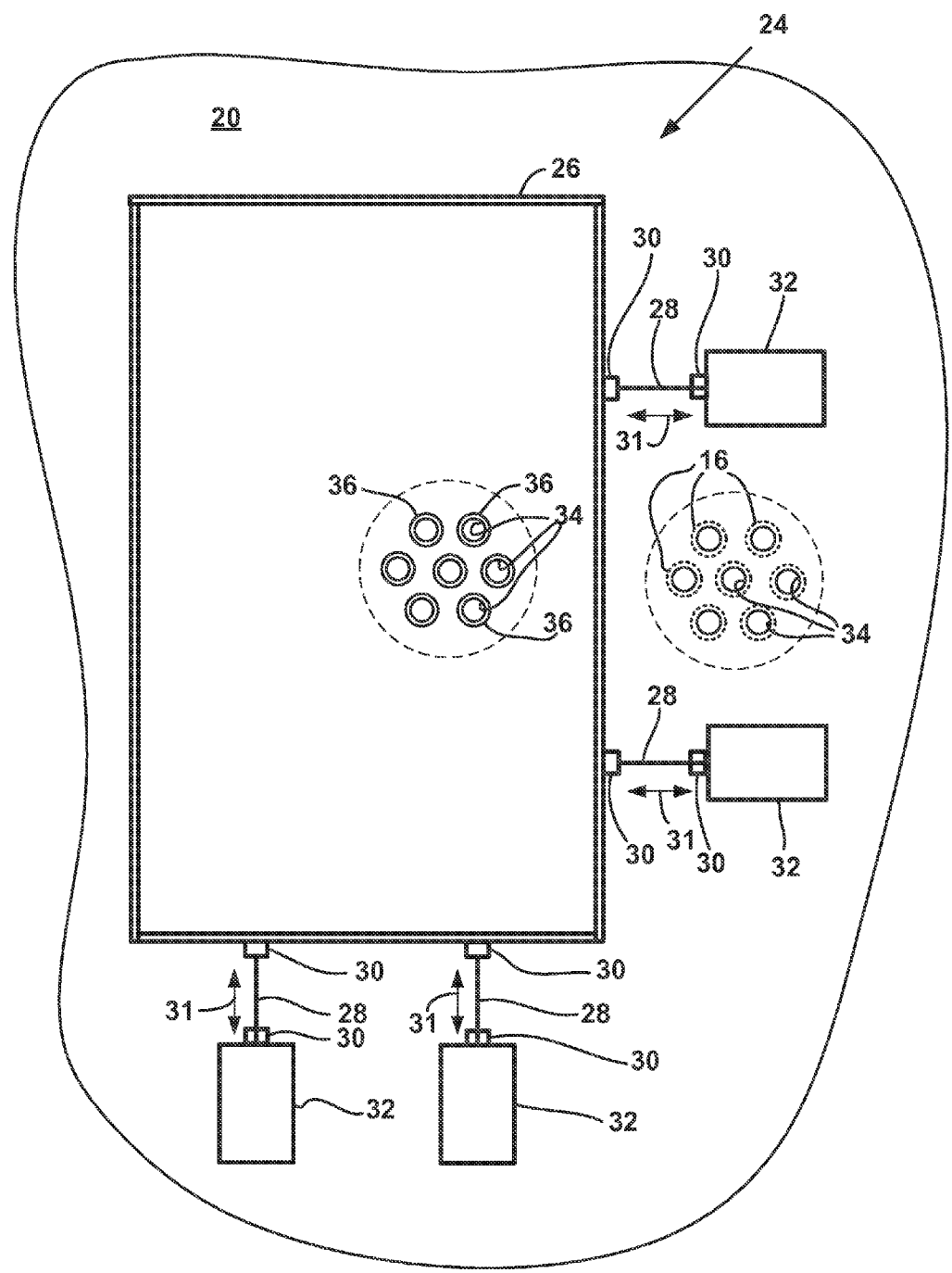
FIG. 6A is a broken away, schematic plan view of a device for dispensing catalyst mounted over a portion of the template.

FIGS. 6A-D and 7-10 show an arrangement including a first embodiment of a catalyst dispensing device 24 for loading catalyst into reactor tubes. The dispensing device 24 rests on top of a template 20, which rests on top of the upper tube sheet 12 of the reactor 10. On the right side of FIG. 6A are shown some of the openings 34 in the template 20, and, behind them in phantom are the open-top reactor tubes 16. While the drawing shows only some of those openings 34 and tubes 16, it is understood that the openings 34 and tubes 16 are distributed evenly throughout the template 20 and the upper tube sheet 12, respectively. (This may be better understood by looking at FIG. 11, which is a section view through the tray 26 only.) It should be noted that the openings 34 in the template 20 have a smaller diameter than the inside diameter of the reactor tubes 16 and are axially aligned with the tubes 16. The template 20 is a relatively thin plate body having horizontal, planar top and bottom surfaces and defining a plurality of holes extending from the top surface to the bottom surface. The bottom surface of the template 20 rests on top of the upper tube sheet 12 and may cover all or a portion of the upper tube sheet 12.

Figure 7:
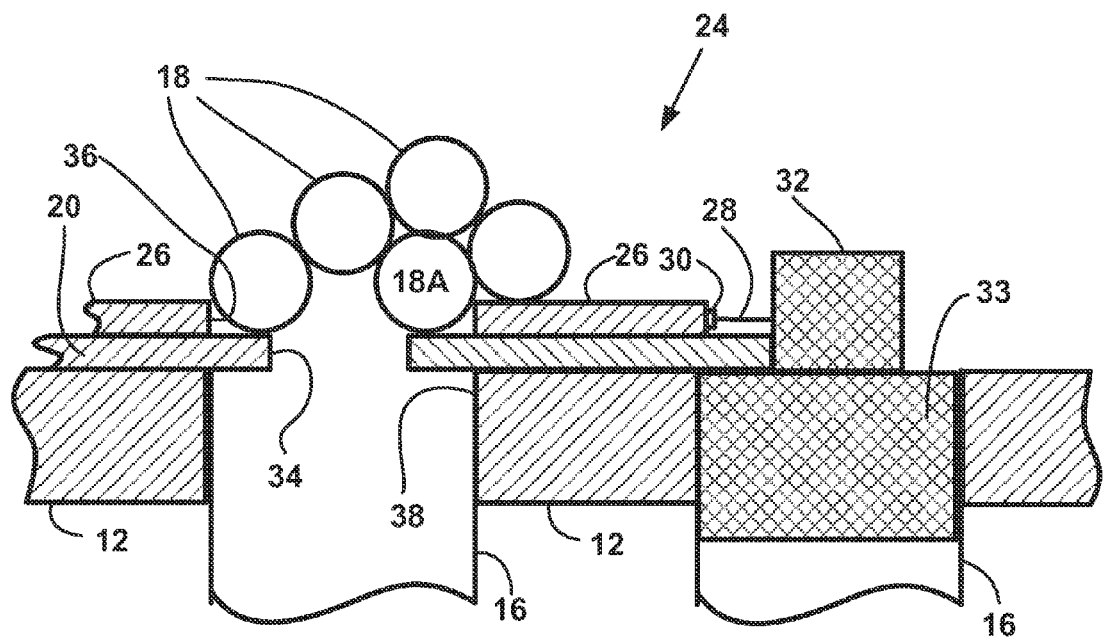
FIG. 7 is a broken away schematic section view, similar to that of FIG. 5, but including the dispensing device of FIG. 6A in the position shown in FIG. 6A, with catalyst pellets bridging above the top of the reactor tube.
Figure 8:
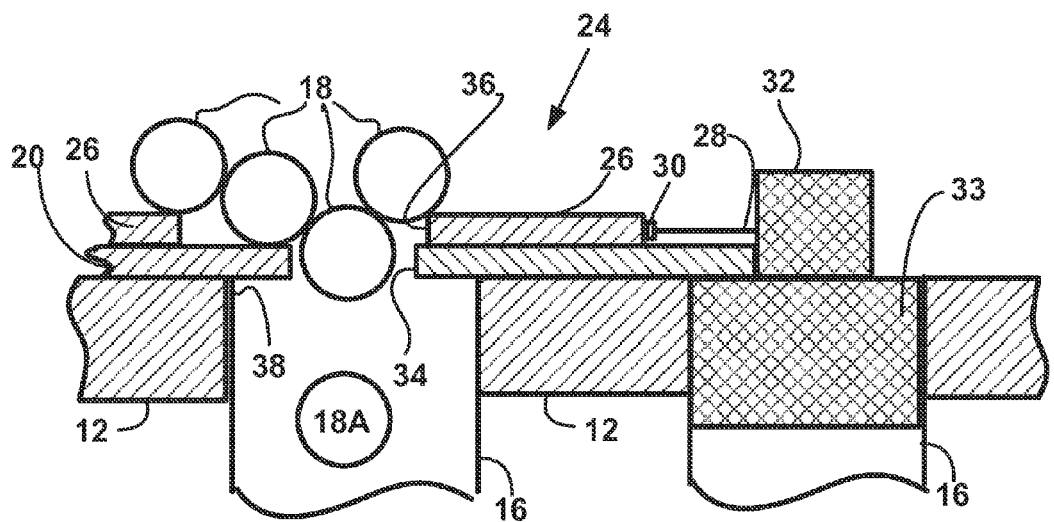
FIG. 8 is the same view as 7, but showing the dispensing device in the second position, shown in FIG. 6B so as to break the bridging of the catalyst pellets above the top of the reactor tube.
Figure 9:
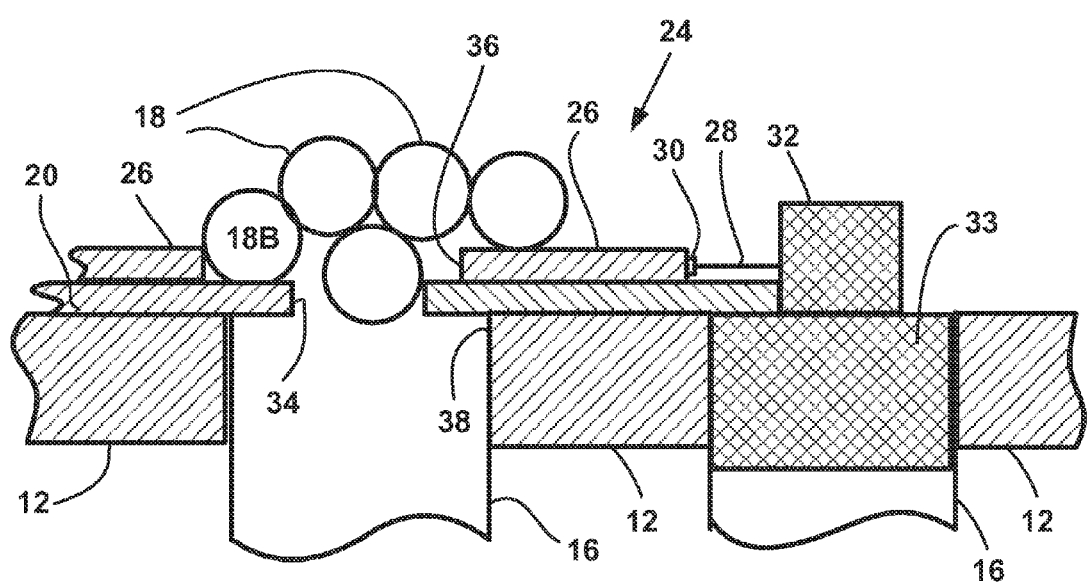
FIG. 9 is the same view as FIG. 8, but showing the dispensing device in a third position.

As best appreciated in FIG. 6A, the catalyst dispensing device 24 includes a tray 26, which serves as a hopper and is operatively connected, via connecting rods 28 and pivots 30 (pivot locations are located on the rod end and cap end of their respective cylinders), to four linear-motion drives 32, which are fixed in position by means of pins 33, which extend into reactor tubes 16, as shown in FIGS. 7-9. (They could extend into other openings in the tube sheet 12 or in the template 20, or be secured in position by other means, if desired.) The double headed arrows 31 indicate the direction of motion of the linear-motion drives 32. The pivots 30 at either end of each connecting rod 28 allow for misalignment in the connection between the linear-motion drives 32 and the tray 26 to permit the desired motion of the tray 26. The tray 26 moves substantially horizontally, along a plane which is parallel to the plane of the template 20 on which the tray 26 rests. The tray 26 includes means for holding a plurality of catalyst pellets and has a plurality of openings 36 through which the catalyst pellets must pass in order to flow from the tray into the respective vertical reactor tubes 16. The catalyst pellets also must pass through the openings 34 in the template 20 located below the tray 26 in order to flow into the respective reactor tubes 16.

Again, while only some of the openings 36 are shown, it is understood that the openings 36 are evenly distributed over the entire tray 26.

In an alternative arrangement, the catalyst dispensing device 24 may rest on top of the flanges 21 of a plurality of loading sleeves 22 (See FIG. 5A) instead of resting on top of the template 20. In that case, then the catalyst pellets also would pass through the openings 23 in the loading sleeves in order to flow into the respective reactor tubes 16.

As shown in FIGS. 6A-D and 7-9, the tray 26 of the catalyst dispensing device 24 is resting on top of the template 20. The openings 36 through the tray 26 are a bit larger than the corresponding openings 34 in the template 20, which permits the tray 26 to shift horizontally relative to the stationary template 20 without closing off any portion of the openings 34 in the template 20.

As shown in FIGS. 6A and 7, the openings 36 of the tray 26 are axially aligned with the openings 34 in the template 20, which, in turn, are axially aligned with the respective longitudinal axes of the reactor tubes 16. The template 20 lies between the tray 26 and the tube sheet 12. Some of the catalyst pellets 18 that are forming a bridge are in contact with the top surface of the template 20.

Figure 6B:
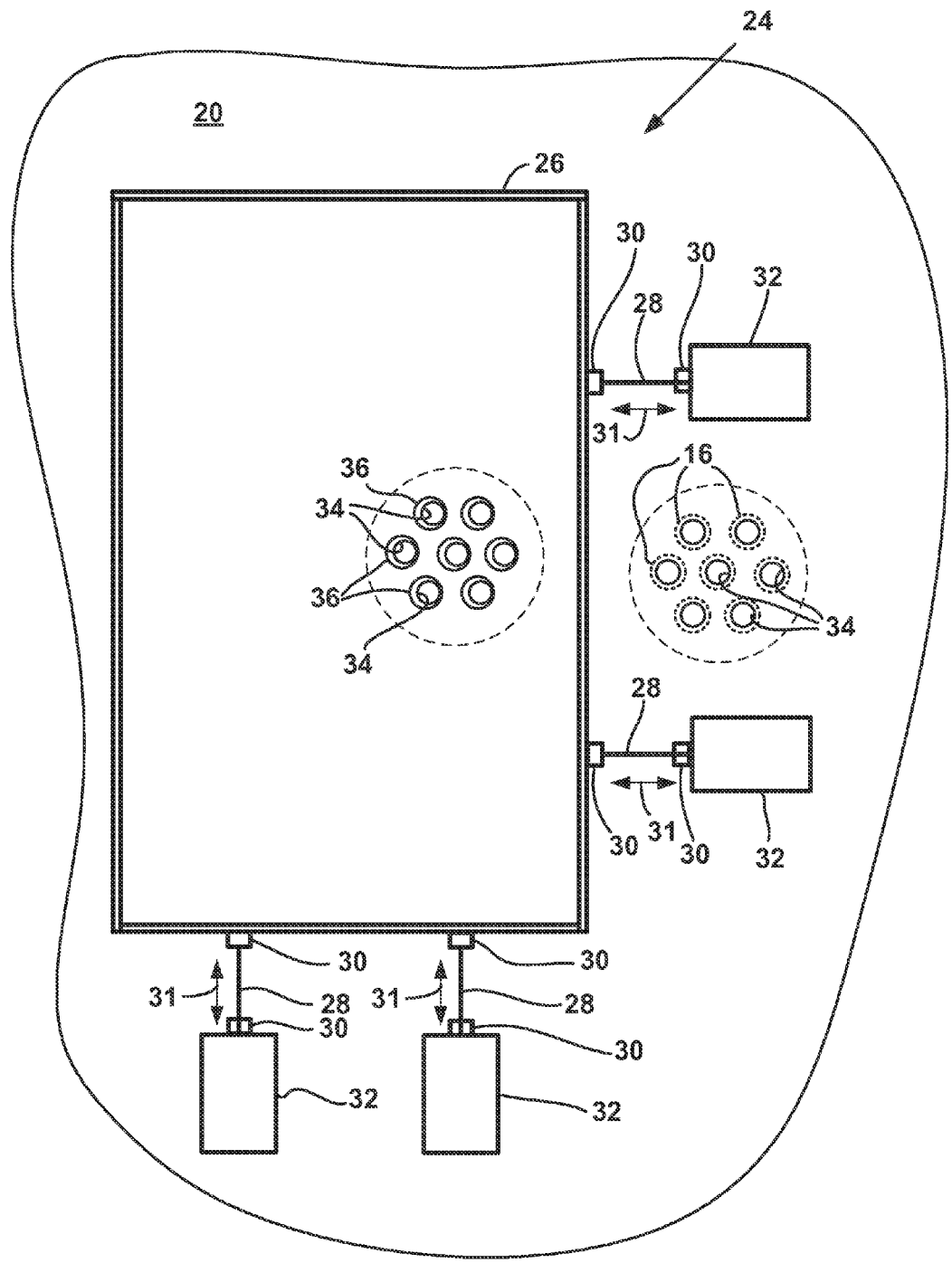
FIG. 6B is the same view as 6A, but with the device shifted to a second position.

As shown in FIGS. 6B and 8, the tray 26 has been shifted to the left, so the axes of the openings 36 in the tray 26 are to the left of the axes of their respective template openings 34 and reactor tubes 16. This position is achieved by the linear-motion drives 32 on the right hand side of the catalyst dispensing device 24 (as seen from the vantage point of FIGS. 6A-C) pushing the tray 26 to the left. This causes the vertical edge of the opening 36 in the tray 26 to contact the pellet 18A, which is resting on the top surface of the template 20 and push it to the left, into the opening 34 of the template 20, so that pellet 18A falls through the openings 36 and 34 and into the reactor tube 16. Since the pellet 18A was supporting the bridge adjacent to the opening 36, its movement relative to the other catalyst pellets 18 causes the bridge to fall and allows other catalyst pellets 18 to fall through the openings 36, 34 into the reactor tube 16 until another bridge is formed adjacent to the opening 36.

As the linear-motion drives 32 on the right hand side of the catalyst dispensing device 24 (as seen from the vantage point of FIGS. 6A-C) pull the tray 26 to the right while at the same time the linear-motion drives 32 on the bottom of the catalyst dispensing device 24 (as seen from the vantage point of FIGS. 6A-C) pull the tray 26 to the bottom, the larger through openings 36 of the catalyst dispensing device 24 are also shifted to the right and bottom, but are still in fluid communication with the respective top openings 38 of the reactor tubes 16 via the smaller through openings 34 of the template 20. This corresponds to FIGS. 6C and 9.

As was explained briefly above, it can be seen in FIG. 7 that a bridge has been formed above the reactor tube 16, and some of the catalyst pellets 18 are resting on the template 20 inside the opening 36 of the tray 26. When the tray 26 is shifted to the left, parallel to the template 20, the edge of the opening 36 of the tray contacts one or more of those catalyst pellets 18A, shifting them to the left as well, which breaks up the bridge and allows catalyst pellets 18 to fall through the opening 36 in the tray and through the opening 34 in the template 20 into the reactor tube 16 until another bridge forms adjacent to the opening 36 in the tray 26.

Shifting the tray 26 to the position of FIG. 9 causes the edge of the opening 36 to contact another pellet 18B, again shifting that pellet 18B to break up the bridge that it is supporting and allowing the catalyst pellets 18 to fall through the openings 36, 34 in the tray 26 and template 20, respectively, and into the open top 38 of the reactor tube 16 until another bridge is formed.

This movement of the tray 26 relative to the template 20 continues to push the supporting catalyst pellets out from under the bridge of catalyst pellets that they are supporting, thereby breaking up the bridges and allowing the catalyst pellets to flow into the reactor tubes 16 without causing any more jarring or abrading of the catalyst pellets than is needed to break up the bridging and allow the catalyst pellets to flow through the tray 26 into the reactor tubes 16.

Figure 6C:
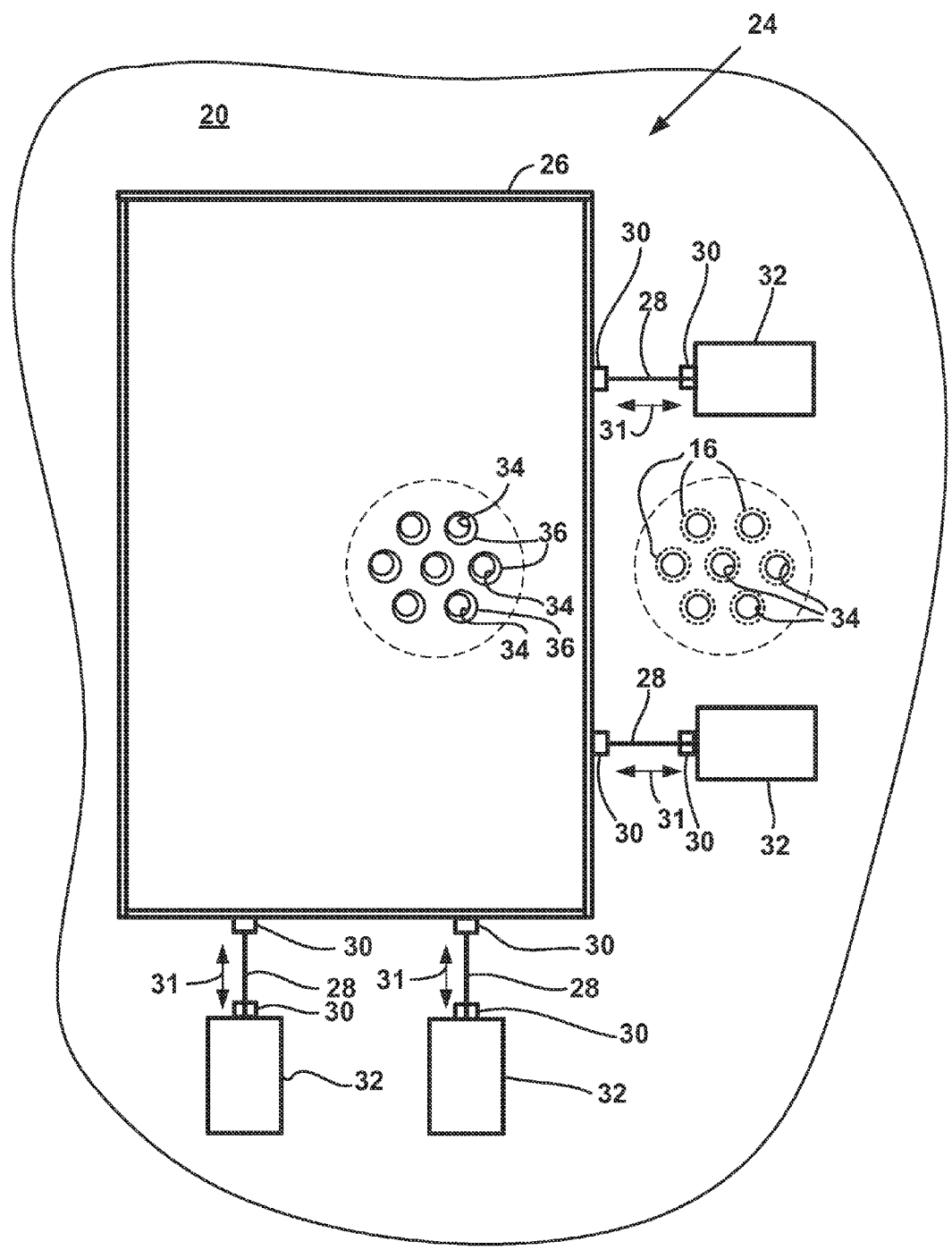
FIG. 6C is the same view as 6B, but with the device shifted to a third position.
Figure 6D:
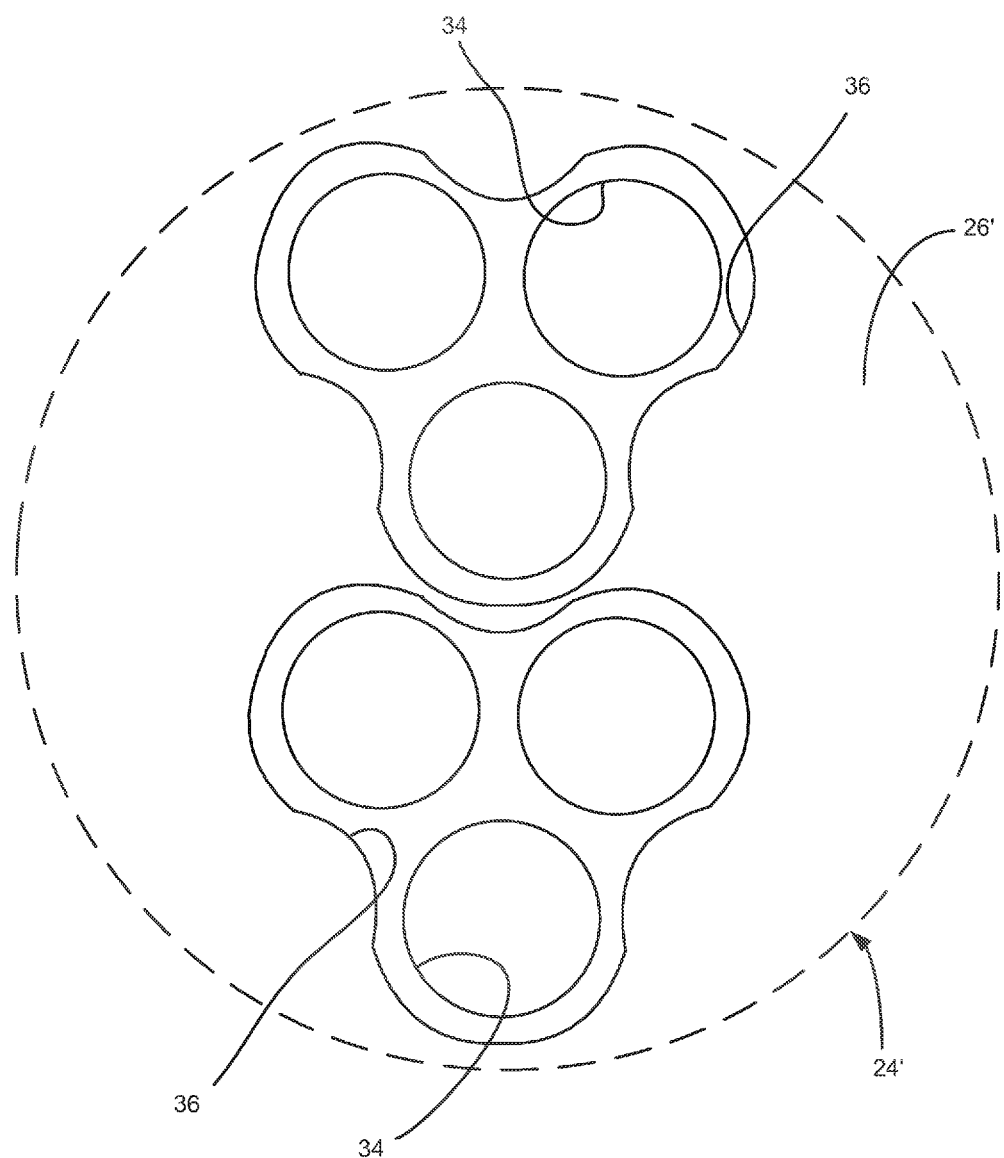
FIG. 6D is a broken away, plan view of a portion of the catalyst dispensing device of FIG. 6A, showing an alternate configuration for the openings in the dispensing tray.
Figure 10:
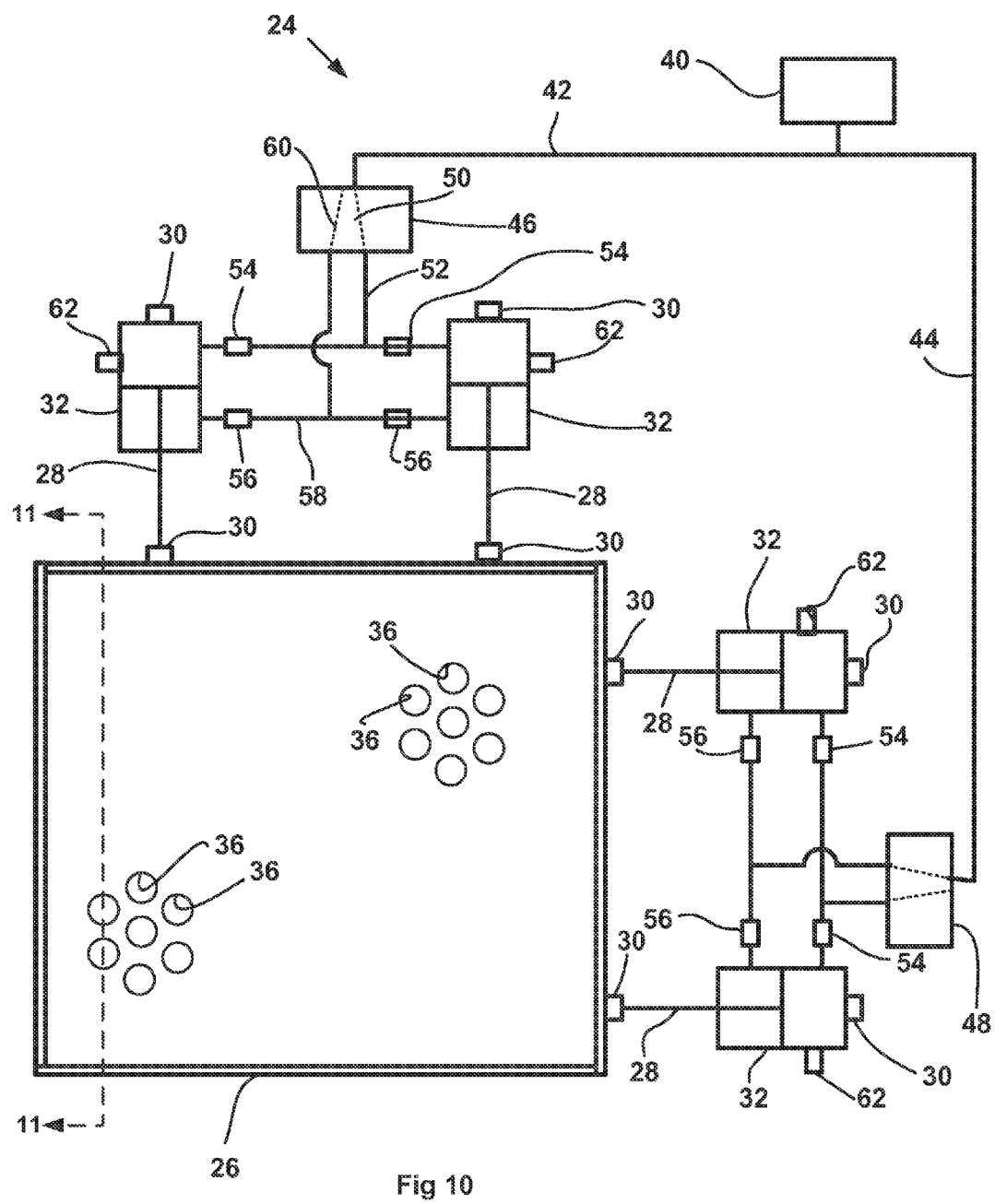
FIG. 10 is a schematic view of a pneumatic control arrangement for the dispensing device of FIGS. 6A-9.

FIGS. 12A-12H schematically depict some of the different paths which may be traced out by the tray 26, ranging from a circular clockwise orbit (FIG. 12A); a circular counter-clockwise orbit (FIG. 12B); quarter circle turns (ninety degrees) alternating clockwise and counterclockwise (FIG. 12C); shorter arcuate turns (such as 45 degrees) alternating clockwise and counterclockwise (FIG. 12D); quarter oval-shaped turns alternating clockwise and counterclockwise (FIG. 12E); rectangular orbits (FIG. 12F); star-shaped orbits (FIG. 12G); and hexagonal-shaped orbits (FIG. 12H). These different paths are just some of those which may be traced out by the tray 26, depending on the control scheme for the catalyst dispensing device 24. A possible control scheme is shown in FIG. 10 and described below. FIG. 6D depicts an alternate shape for the opening 36' in the tray 26' of the dispensing device 24', showing that these openings 36' need not be round (as shown in FIGS. 6A-6C) nor do they have to correspond on a one-to-one basis with the openings 34 in the template 20 (or in the loading sleeve 22). In this instance, the openings 36' are almost triangular in shape, with each opening 36' of the tray 26' opening into three openings 34 in the template 20.

The control system described in FIG. 10 involves driving the dispensing device 24 pneumatically. It includes four linear-motion pneumatic drives 32, each one connected to the tray 26 via its corresponding connecting rod 28. A pivot 30 at each end of each connecting rod 28 ensures that the connection point at the tray 26 may be misaligned from the connection point at the linear-motion drive 32 so as to permit the desired motion of the tray 26.

A source 40 of pressurized gas (such as compressed air) is in fluid communication, through piping 42, 44, with two multi-port solenoid valves 46, 48. Each solenoid valve 46, 48 is in turn in fluid communication with two linear-motion pneumatic drives 32 through a set of four flow control devices as described in more detail below.

The operation of the control scheme for the catalyst dispensing device 24 of FIG. 10 is described below with respect to one linear-motion drive 32 only, on the upper left hand corner of FIG. 10. It will be clear that the other drives 32 operate in essentially the same manner. The air source 40 provides compressed gas to the solenoid valve 46 via the line 42. The solenoid valve 46 sends the compressed air via the path 50 to the line 52 and through the flow control limiter 54 to the linear-motion drive 32 which pushes the connecting rod 28 outwardly (in the down direction as seen from the vantage point of FIG. 10). The air is exhausted through the flow control limiter 56 and through the line 58 back to the solenoid valve 46 which exhausts the air through the path 60. A proximity switch 62 on the linear-motion drive 32 sends a signal to a controller (not shown) when the linear-motion drive 32 has reached the end of its run. The controller actuates the solenoid valve 46, causing it to shift to a second position (not shown), which reverses the flow of compressed air to retract the connecting rod 28 on the linear-motion drive 32. The proximity switch 62 on the linear-motion drive 32 again sends a signal to the controller when the linear-motion drive 32 has once again reached the end of its run. The controller actuates the solenoid valve 46 which shifts and again reverses the flow of compressed air, and the entire cycle is repeated.

While air-operated drives 32 are described here, it is understood that the drives could be electric motors or other known drive means instead, and the control means would be suitable to control the drive means.

Operation of the Catalyst Dispensing Device

The catalyst dispensing device 24 is placed atop a template 20 wherein the through openings 34 on the template 20 are substantially axially aligned with the reactor tubes 16. Preferably the linear-motion drives 32 of the catalyst dispensing device 24 are secured to the template 20 or to the tube sheet 12 to prevent any relative movement between the linear-motion drives 32 and the template 20. Catalyst pellets 18 are dumped into the tray (hopper) area 26 of the catalyst dispensing device 24 which is then powered up to begin the catalyst dispensing process. The relative horizontal motion between the tray 26 and the template 20 breaks any bridges as they form, allowing the catalyst pellets 18 to fall through the respective upper opening 36 in the tray 26 and lower opening 34 in the template 20 and into the reactor tubes 16, as shown in FIGS. 6A-9.

It should be noted that during this process there is very little jostling and relative motion between the vast majority of the catalyst pellets 18 in the tray 26. When a local bridge is broken and a catalyst pellet 18 falls through the template 20 and into a reactor tube 16, any catalyst pellets 18 immediately above the collapsed bridge will collapse as well and flow into the tube 16 until a new bridge is formed. This new bridge is then broken by the relative motion between the tray 26 and the template 20, and the process is repeated continuously until the reactor tube 16 is fully loaded, or the tray 26 runs out of catalyst pellets 18, or the catalyst dispensing device 24 is powered off. Not only is there very little relative motion among the catalyst pellets 18 in the tray 26, which limits the erosion and breakage of the catalyst pellets 18 and the consequent dust generation, but the whole process is mechanized and needs very little operator attention.

Of course, as explained earlier, the catalyst dispensing device 24 may rest on top of the flanges 21 of a plurality of loading sleeves 22 (see FIG. 5A) instead of resting on top of the template 20, in which case the operation would be the same.

Note that it is the relative motion between the tray 24 and the underlying substrate (such as the surface of the template 20 or the surface of the flange of the loading sleeve 22) that imparts a direct mechanical force to at least one of the catalyst pellets 18 adjacent to the opening 36 that is different from the forces being applied to the other surrounding catalyst pellets 18 in order to break up the bridging adjacent to the opening 36, allowing catalyst pellets 18 to fall out of the tray 26, through the openings 36 and 34, and into the reactor tube 16. This process continues repeatedly, with successive bridge forming followed by bridge breaking to load the reactor tube 16 with catalyst pellets 18. The reactor tube 16 also serves as a conduit to direct the catalyst pellets to the chemical reactor.

Additional Embodiments of a Catalyst Dispensing Device

Figure 13:
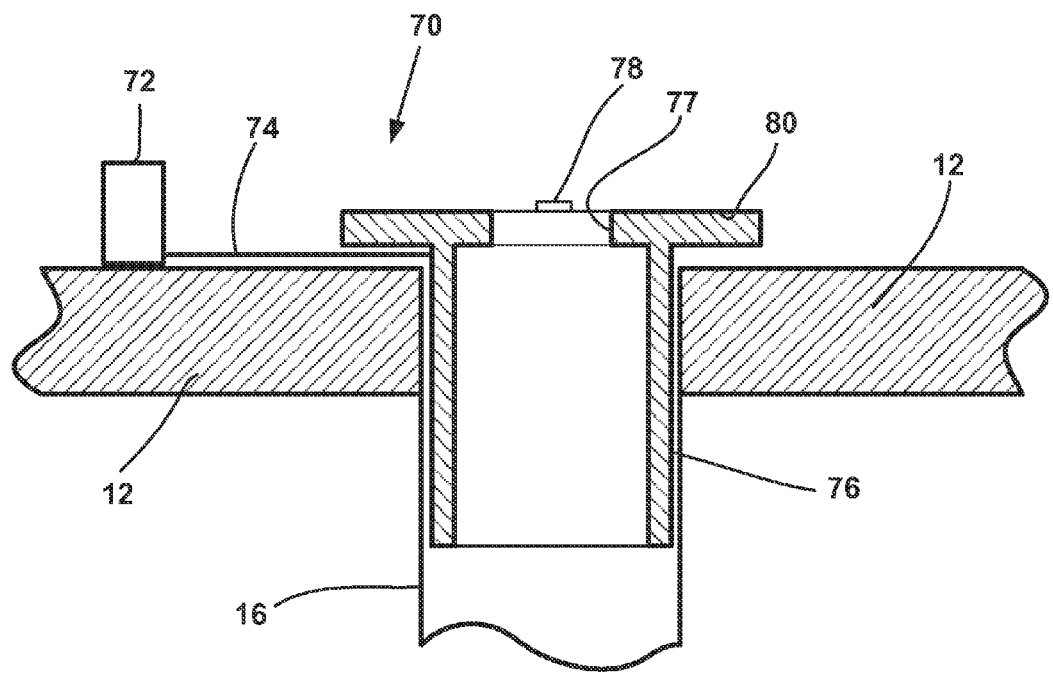
FIG. 13 is a broken away, section view of another embodiment of a dispensing device for dispensing catalyst, mounted on an upper tube sheet.
Figure 14:
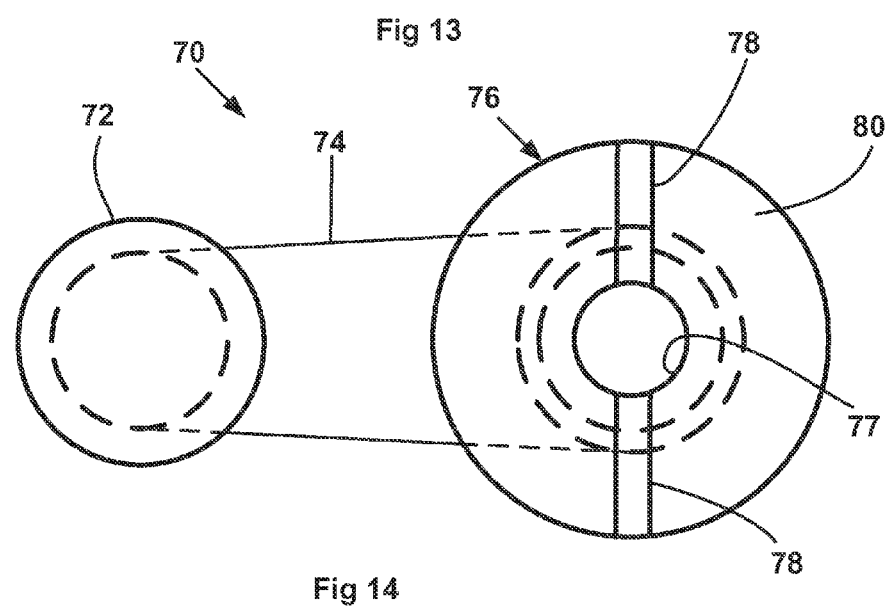
FIG. 14 is a plan view of the dispensing device of FIG. 13, with the tube sheet omitted for clarity.

FIGS. 13 and 14 show another embodiment of a catalyst dispensing device 70. Comparing this catalyst dispensing device 70 in FIG. 13 with the loading sleeve 22 of FIG. 5A, it may be seen that they are quite similar. The most obvious difference is that the catalyst dispensing device 70 is mechanically driven by a drive 72 via a belt 74. The drive 72 may be a rotary or articulating drive, and the belt 74 is a means for transferring the motion of the drive 72 to the loading sleeve 76 of the catalyst dispensing device 70, as best seen in FIG. 14. This means for transferring the motion of the drive 72 to the loading sleeve 76 may be accomplished by a variety of other means (not shown) such as a gear or a rod.

A less obvious difference is the presence of ridges 78 on the top surface of the flange 80 of the loading sleeve 76. This embodiment shows two ridges 78 (See FIG. 14) which extend radially from the opening 77 to the outer edge of the flange 80 and which are diametrically opposed from each other. While the ridges 78 are preferred, the flange 80 may have a roughened surface or other high friction surface that will cause a pellet 18 that is resting on the top surface of the flange 80 to move along with the flange 80.

As may be seen in yet another embodiment of a catalyst dispensing device 70* in FIG. 16, the loading sleeve may have one or more such ridges 78, 78*, as described in more detail later. The ridges 78, 78* serve to enhance the frictional resistance between the flange 80 of the loading sleeve 76 and the catalyst pellets resting atop the flange 80 of the loading sleeve 76, such that the mechanical motion imparted by the drive 72 to the loading sleeve 76 is more readily transmitted to the catalyst pellets resting atop the flange 80 so as to promote the breaking of any catalyst bridge.

In this embodiment, the drive 72 imparts a rotary motion to the loading sleeve 76 of the catalyst dispensing device 70, causing the flange 80 of the loading sleeve 76 to rotate in a horizontal plane, parallel to the top of the tube sheet 12, rotating slowly about its longitudinal axis, which is a vertical axis, aligned with the vertical axis of the reactor tube 16. As it does so, the catalyst pellets 18 resting directly on top of the flange 80 travel with the flange 80, so the flange 80 imparts a direct mechanical force to the catalyst pellets 18 resting on top of it, causing them to move relative to the other surrounding catalyst pellets 18 above them, which breaks up any catalyst bridges that may form just above the reactor tube 16. In this case, the tube sheet 12 and the wall of the reactor vessel serve as a hopper to provide means for holding a plurality of catalyst pellets above the vertical reactor tube 16. The opening 77 in the flange 80 has a smaller diameter than the inside diameter of the reactor tube 16, and the catalyst pellets pass through the opening 77 to flow through from the holding means into the reactor tube 16.

FIGS. 15-17 depict yet another embodiment of a catalyst dispensing device 70*. This is similar to the catalyst dispensing device 70 of FIGS. 13 and 14, except that the drive 72* is anchored and substantially enclosed by an adjacent reactor tube 16.

In FIG. 15, only the tube sheet 12 is shown in section. The drive 72* includes a battery 82*, a motor 84*, and a gearbox 86*, all of which are suspended inside a reactor tube 16 by the flange 88* which rests atop the tube sheet 12. A pulley 90* is engaged by the belt 74* which in turn engages and drives a similar pulley 92* on the loading sleeve 76*. In this embodiment of a catalyst dispensing device 70*, the loading sleeve 76* includes a bearing housing 94* and a bearing 96* to minimize frictional resistance to rotation of the loading sleeve 76* in the reactor tube 16.

The flange 80* on the loading sleeve 76* defines a plurality of ridges 78* (See also FIGS. 16 and 17). As the drive 72* rotates the loading sleeve 76*, the flange 80* imparts a direct mechanical force to the catalyst pellets resting on it, causing those catalyst pellets to shift relative to the rest of the catalyst pellets in the bridge, and thereby breaking up any bridging of catalyst pellets adjacent to the opening 77* in the flange 80* so the catalyst pellets 18 can flow through the opening 77* and into the reactor tube 16.

Figure 18:
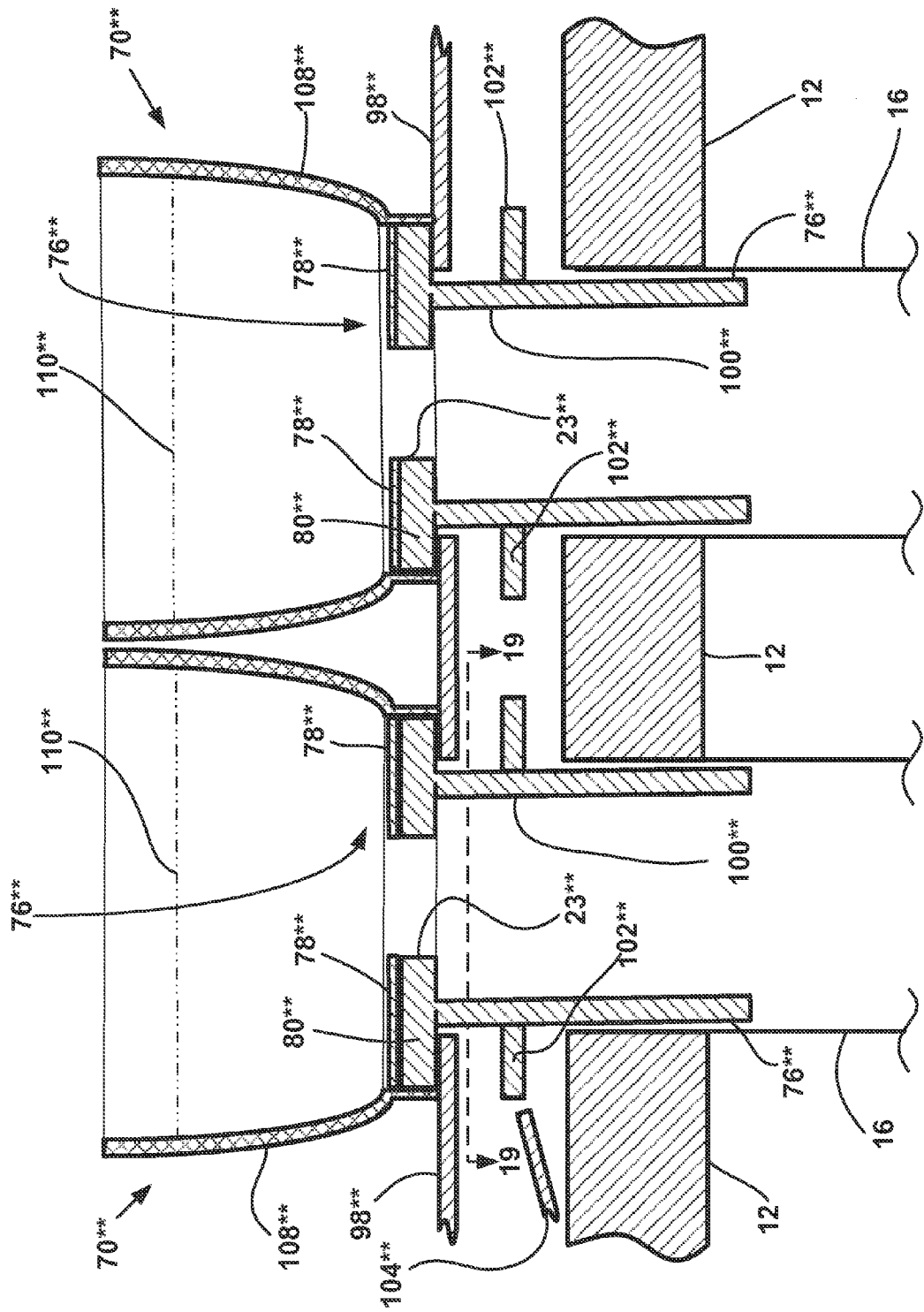
FIG. 18 is a broken away section view of another embodiment of a dispensing device.

FIG. 18 depicts yet another embodiment of a catalyst dispensing device 70. In this embodiment, the catalyst dispensing device 70 includes two loading sleeves 76 (though one or more such loading sleeves 76 may be present) which are similar to the loading sleeve 76 of FIGS. 13 and 14 in that they includes ridges 78. This catalyst dispensing device 70 rests on top of an elevated stationary template or frame 98 which has a top surface that lies on a plane which is parallel to the plane of the top surface of the tube sheet 12, but which provides some clearance between the frame 98 and the tube sheet 12. The loading sleeve 76 has its flange portion 80 resting on top of the frame 98, while its tubular "leg" portion 100 extends through the frame 98, through the space between the frame 98 and the tube sheet 12, through the tube sheet 12, and into the reactor tube 16. The flange 80 defines an opening 23 that has a smaller diameter than the inside diameter of the reactor tube 16, again in order to regulate the flow of catalyst pellets into the reactor tube 16 to prevent bridging within the tube 16.

Figure 19:
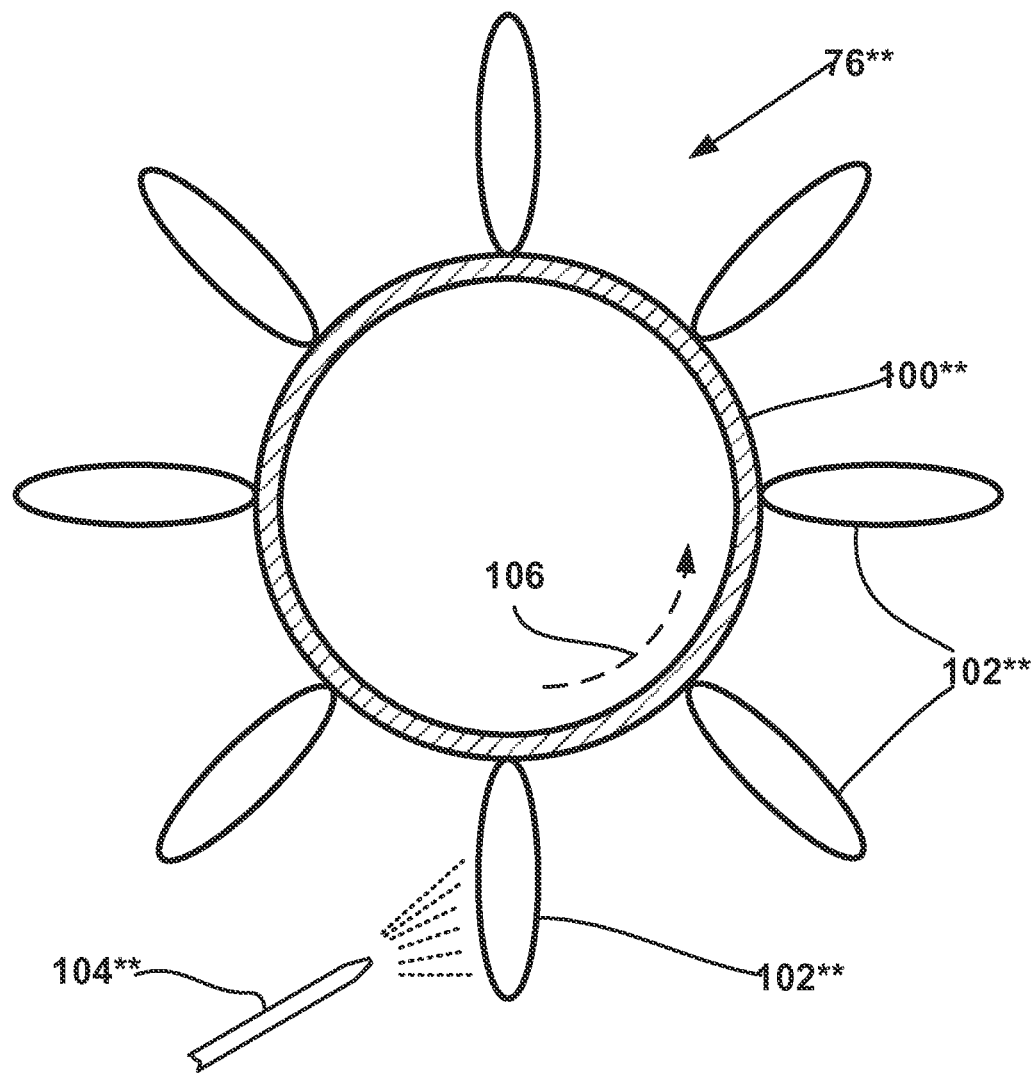
FIG. 19 is a view taken along line 19-19 of FIG. 18.

Mounted to the leg portion 100 of the loading sleeve 76, and in the space between the frame 98 and the tube sheet 12, are blades 102 (See also FIG. 19), similar to the blades of a blower fan. A compressed air nozzle 104 is mounted to the frame 98. As seen in FIG. 19, as the compressed air from the air nozzle 104 blows on the blades 102 of the loading sleeve 76, it applies a force causing the loading sleeve 76 to rotate in the direction of the arrow 106. The compressed air from the air nozzle 104 may blow continuously or it may blow intermittently to cause the loading sleeve 76 to spin about its longitudinal axis, and as it does so, it imparts a direct mechanical force to the catalyst pellets 18 resting on top of the flange 80 of the loading sleeve 76 which moves the catalyst pellets 18 resting directly atop the flange 80 relative to other catalyst pellets 18 that may be forming a bridge adjacent to the opening 23 in the flange 80 to break up any catalyst bridges, allowing catalyst to fall through the opening 23 in the loading sleeve 76**.

FIG. 18 also shows a funnel-like container or hopper 108 directly above the loading sleeve 76, which provides means for holding a plurality of catalyst pellets 18. This container 108 may include a mark 110 corresponding to a preset volumetric dispensing of catalyst inside a reactor tube. In this embodiment, the funnel-like container 108 does not rotate with the loading sleeve 76, but remains stationary, resting on the stationary frame 98**. This embodiment may be particularly useful for partial loading of reactor tubes, such as when reactor tubes are loaded with different types of catalyst to different heights within the reactor tubes.

Figure 20:
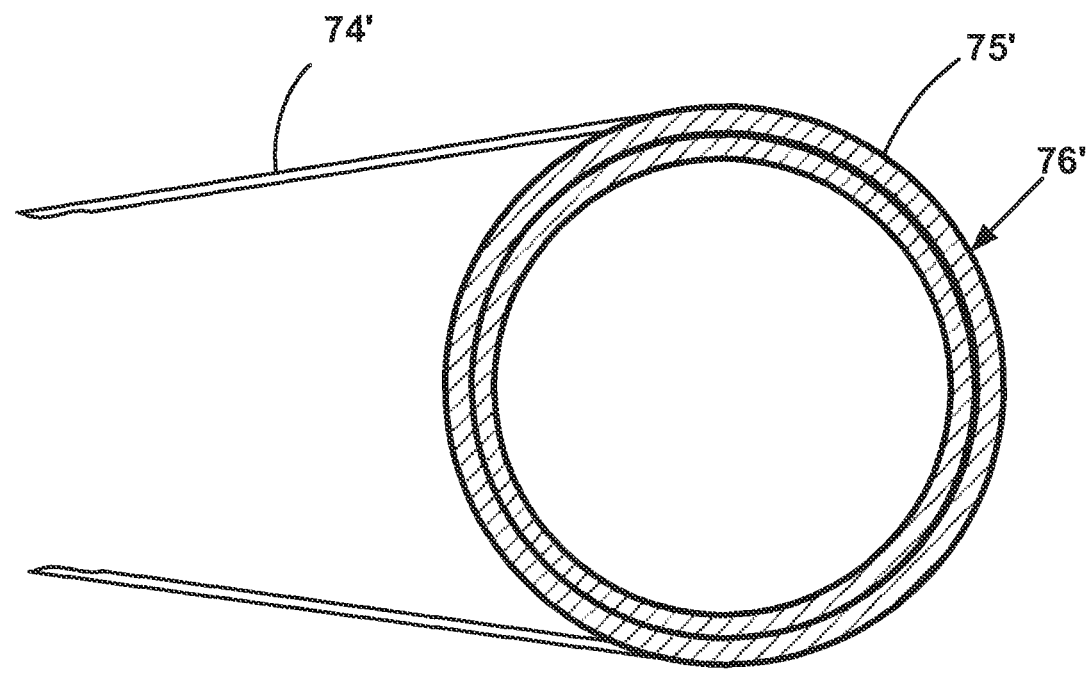
FIG. 20 is view similar to FIG. 19, but for another embodiment of a dispensing device.

FIG. 20 is a view similar to FIG. 19, but for yet another embodiment of a catalyst dispensing device. This catalyst dispensing device is essentially identical to the catalyst dispensing device 70** of FIG. 18, except that it has a different mechanism for rotating the loading sleeve 76'. In this instance, the loading sleeve 76' is rotated by means of a drive (not shown) similar to the drive 72 of FIGS. 13 and 14, via a belt 74' and a pulley 75'. Of course, other drive means, such as gears or rods, may be used instead of a belt.

Each loading sleeve 76 in FIG. 18 (or 76' in FIG. 20) may be individually driven, or several may be tied together to a common drive. For instance, the belt 74' in FIG. 20 may wind over a number of pulleys 75' of different loading sleeves 76'. Likewise, the air nozzle 104 may be fed by a common compressed air line manifold which supplies air to a plurality of air nozzles which blow air on other catalyst dispensing devices 70**.

Figure 22:
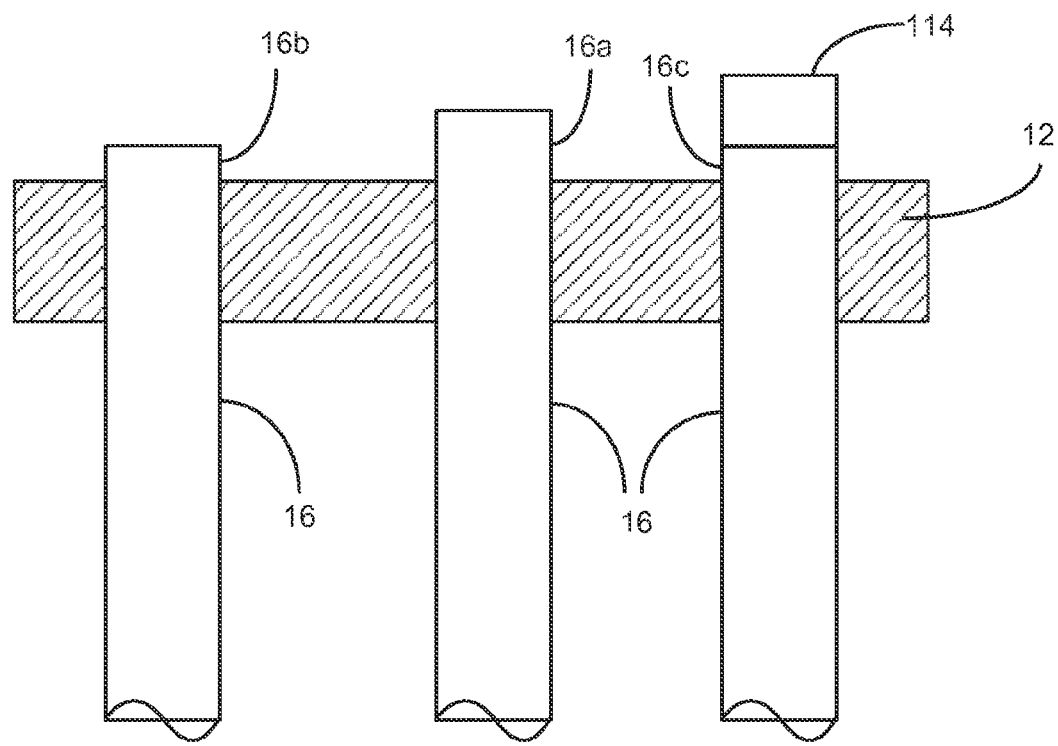
FIG. 22 is a broken away section view of the tube sheet, similar to FIG. 3, except showing three tubes, each having a different height relative to the tube sheet.

It sometimes occurs that the top tube sheet 12 in a reactor vessel is not completely flat. Sometimes it is very slightly domed and often, as shown in FIG. 22, the reactor tubes 16 project upwardly beyond the top tube sheet 12, with some tubes projecting upwardly more than other tubes. In FIG. 22, the upper portion 16A projects upwardly more than the upper portion 16b. Some tubes may have a plug 114 secured to the top portion, as shown with the top portion 16c, which causes the tube to project even a greater distance above the tube sheet 12.

Figure 21:
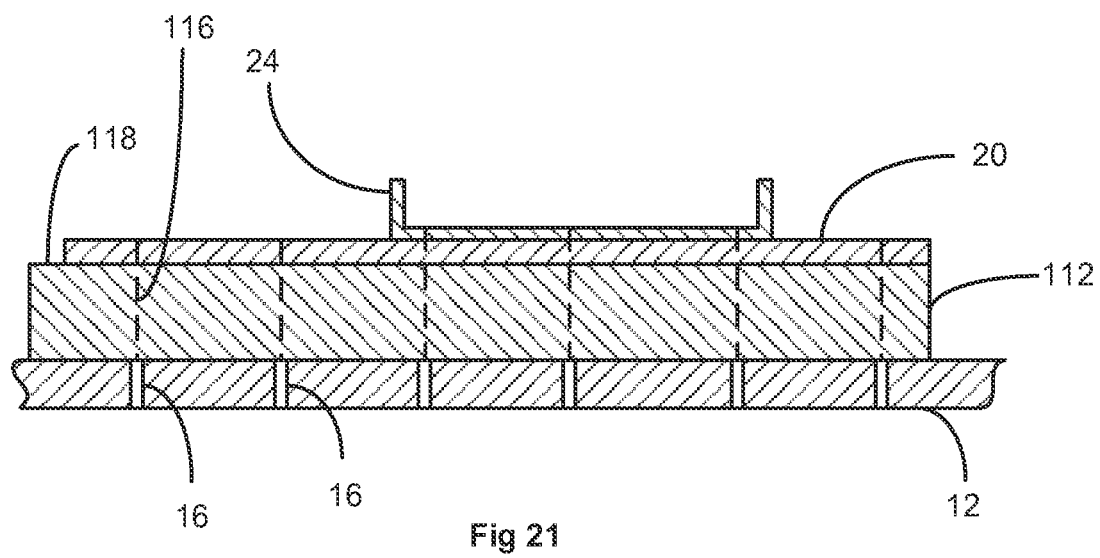
FIG. 21 is the same view of a dispensing tray as in FIG. 11 but showing an alternate arrangement mounted on a tube sheet and including a spacer between the dispensing device and the tube sheet.

FIG. 21 shows a solution to the problem of an uneven tube sheet 12, whether because the tube sheet 12 is slightly domed or because the tubes 16 project upwardly and unevenly from the tube sheet 12. In this instance, a spacer 112 is installed between the tube sheet 12 and the template 20 (or it could be between the tube sheet 12 and the loading sleeves 22 of FIG. 5A). This spacer 112 is preferably made of a foam material which adapts its shape to conform to the dome shape of the tube sheet 12. The spacer 112 has through openings 116 which are aligned with the reactor tubes 16 in the tube sheet 12. These openings 116 are large enough to accommodate any tube projections above the tube sheet 12 such that the top surface 118 of the spacer 112 is substantially flat despite any unevenness in the tube sheet 12 and its reactor tubes 16.

Figure 23:
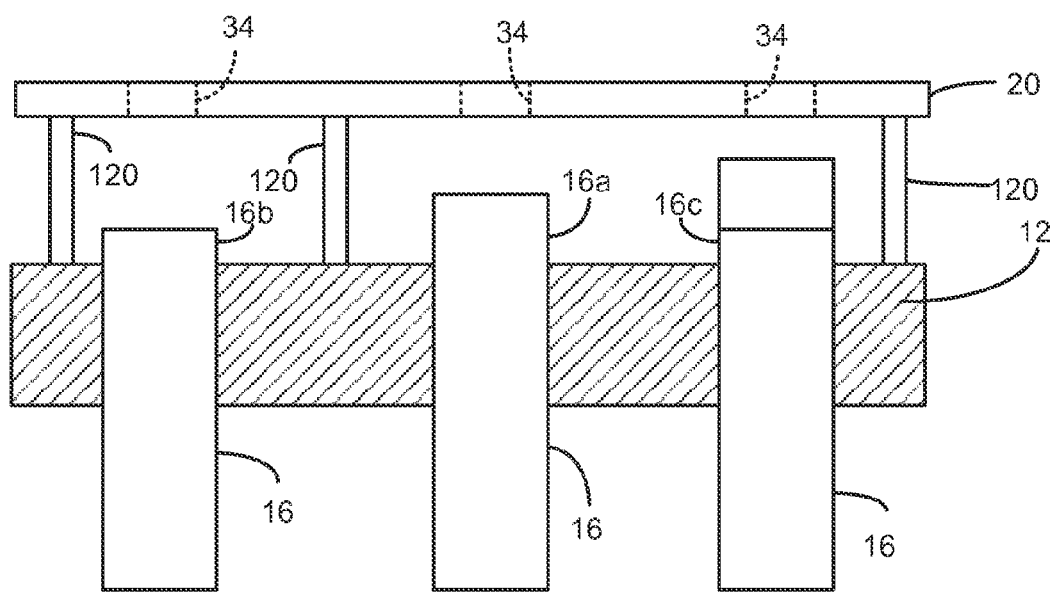
FIG. 23 is a side view of dispensing device like that of FIG. 11 or 21, but including a spacer to accommodate the varying tube heights of FIG. 22.

FIG. 23 shows an alternate solution to the problem of an uneven tube sheet 12. In this instance, the template 20 is supported above the tube sheet 12 via a plurality of legs 120, with the openings 34 in the template 20 substantially vertically aligned with the top openings of the reactor tubes 16.

In one embodiment, the template 20 is essentially a "mirror" tubesheet 20* (See FIG. 53) in that it duplicates the tubesheet 12 itself in terms of the size and location of the openings of the reactor tubes 16. However, this mirror tubesheet 20* has a substantially flat top surface with no plugged tubes and no irregularities or plugs projecting above this top surface of the mirror tubesheet 20*. The reactor tubes 16 may be loaded with catalyst pellets by using this mirror tubesheet 20* as a pristine starting surface, uninterrupted by any irregularities on the tubesheet 12.

Figure 53:
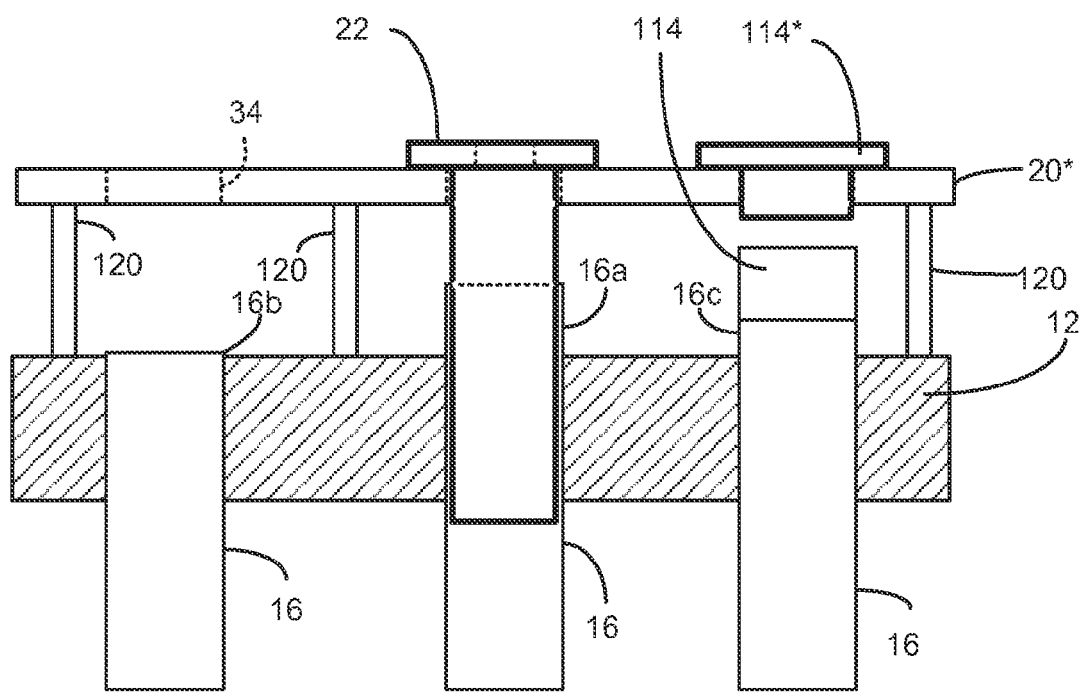
FIG. 53 is a side view of a mirror tubesheet device, similar to that of FIG. 23, but with a plurality of openings to match in size and location those of the actual tubesheet.

As described earlier, the loading device 24 (See FIG. 6A) may be placed directly over the mirror tubesheet 20* for loading catalyst pellets into the reactor tubes 16, or loading sleeves 22 may be installed in the openings 34 of the mirror tubesheet 20*, with the loading sleeves 22 extending into the reactor tubes 16, as shown in FIG. 53, and with the loading device 24 placed over these loading sleeves 22. Temporary plugs 114* may be placed into the openings 34 of the mirror tubesheet 20* above those reactor tubes which are plugged with a plug 114 as shown in FIG. 53.

Once the tubes 16 have been loaded with catalyst pellets, any excess catalyst pellets lying atop the mirror tubesheet 20* may be collected, such as by vacuuming them up, and any loading sleeves 22 that have been used may be removed. Pressure drop testing of the loaded reactor tubes may then be accomplished using this mirror tubesheet 20* as a surface from which to take the readings, taking care to ensure that the injectors of the testing device extend far enough into the reactor tubes 16 that there is a good seal between the injectors of the testing device and the reactor tubes 16.

Figure 24:
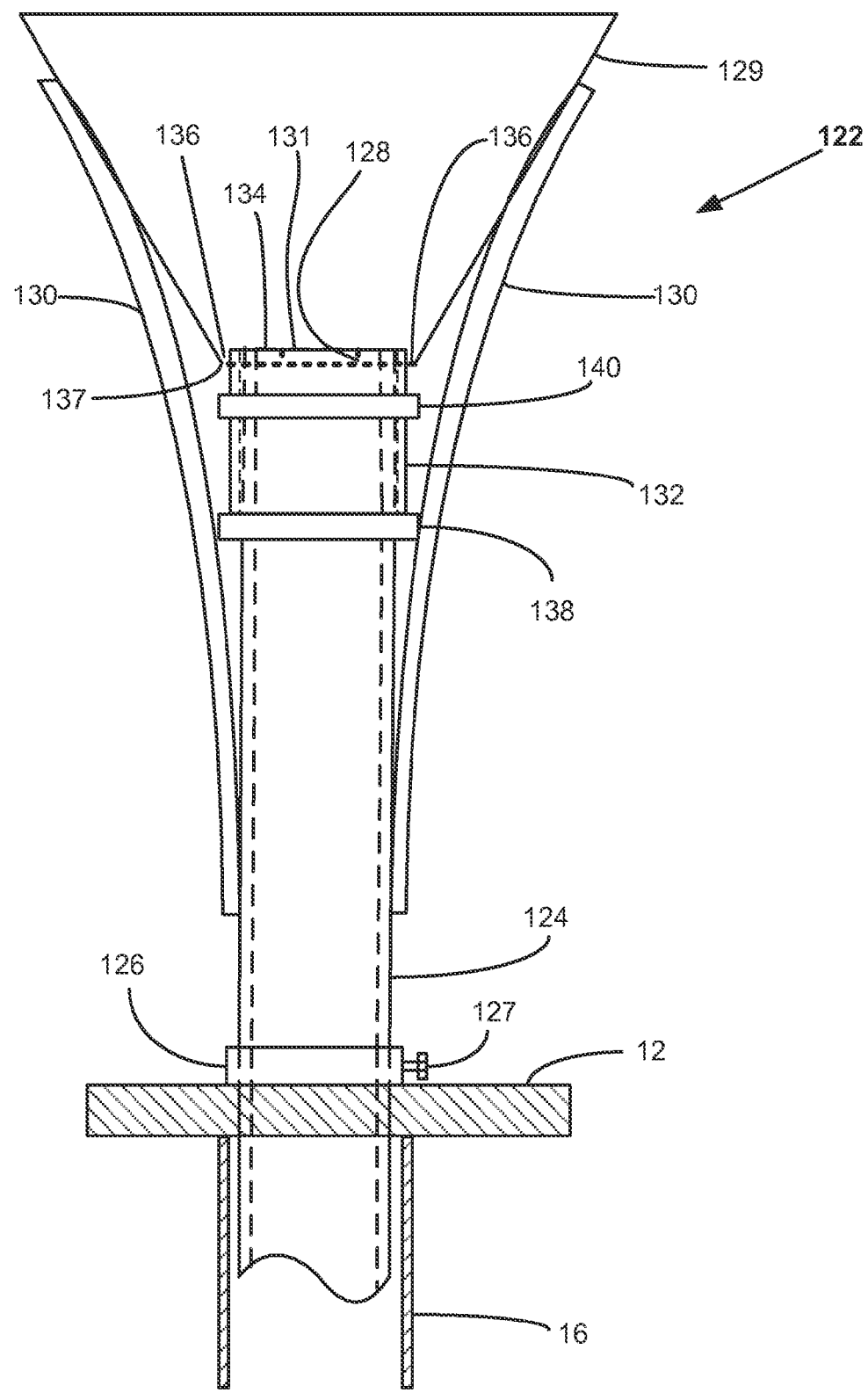
FIG. 24 is a side view of an alternate embodiment of a catalyst dispensing device, shown in a first, lowered position.
Figure 25:
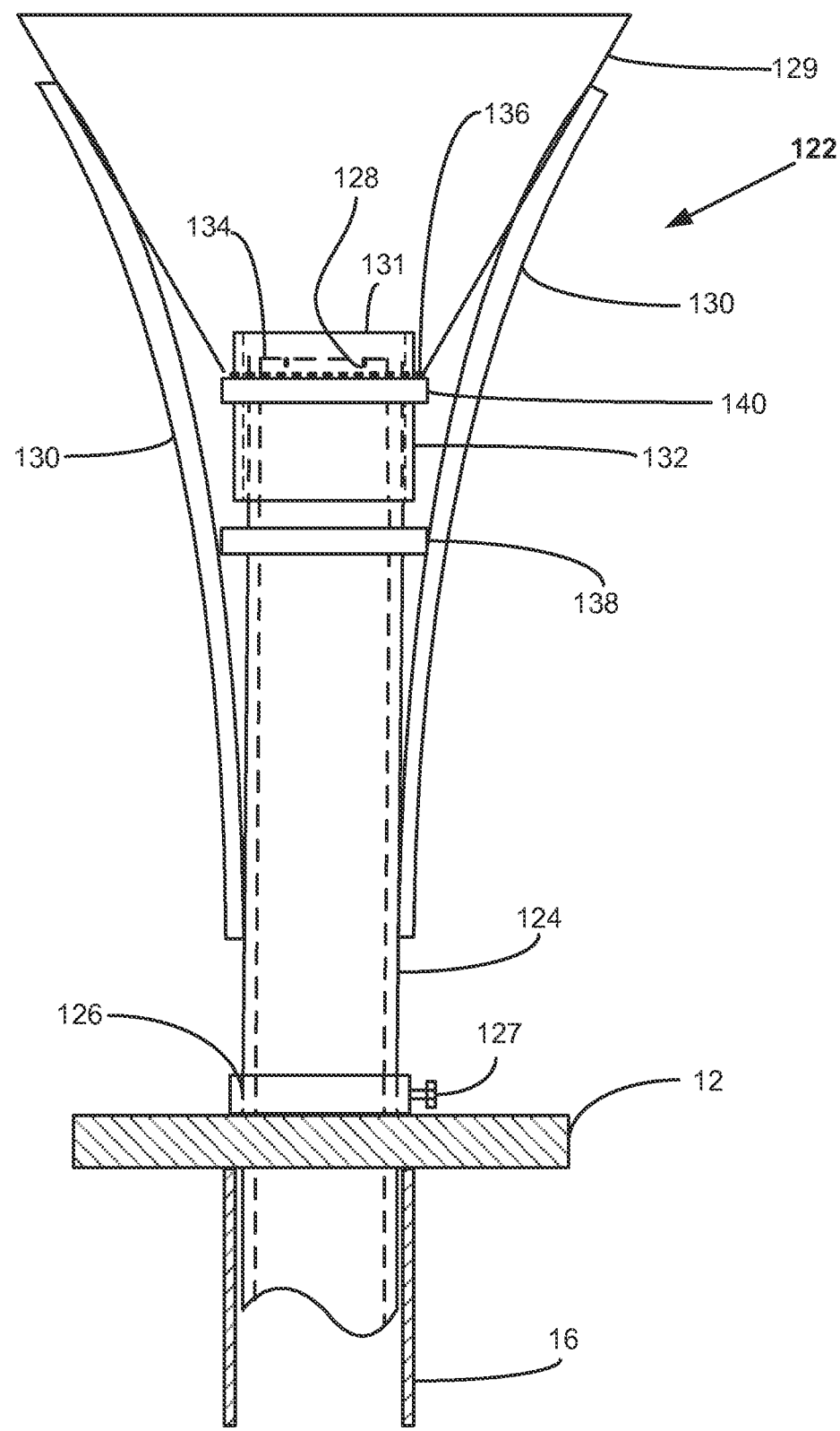
FIG. 25 is a side view of the dispensing device of FIG. 24, shown in a second, raised position.

FIGS. 24 and 25 show another embodiment of a catalyst dispensing device 122. This catalyst dispensing device 122 is similar to a loading sleeve, such as the loading sleeve 22 of FIG. 5A in that it includes tubular vertical leg 124, a portion of which slides into the top of a reactor tube 16. It also includes a flange 126 which supports the catalyst dispensing device 122 on the top surface of the tube sheet 12, and it has a through opening 128 at the top of the vertical leg 124 with a small enough diameter to restrict the flow of catalyst pellets into the vertical leg 124 and into the reactor tube 16 so as to prevent possible bridging inside the vertical leg 124 and the reactor tube 16.

The catalyst dispensing device 122 includes a funnel shaped container 129 which provides means for holding a plurality of catalyst pellets above the reactor tube. This funnel 129 is attached to, and supported by, the vertical leg (or conduit) 124 of the loading sleeve by a plurality of arched stringers 130. This arrangement allows a narrow annular clearance 136 between the top edge 134 of the vertical leg 124 and the bottom opening 136 of the funnel 129, which is just wide enough for a movable sleeve 132 to fit between the vertical leg 124 and the funnel 129 and to shift up and down, as explained in more detail below.

The movable sleeve 132 has an inside diameter which is just slightly larger than the outside diameter of the vertical leg 124 of the loading sleeve and an outside diameter that is just slightly smaller than the inside diameter of the bottom edge 137 (See FIG. 24) of the funnel 129. A lower stop band 138 is secured to the outside surface of the vertical leg 124 to provide a lower stop for the movable sleeve 132, as shown in FIG. 24. An upper stop band 140 is secured to the outside surface of the movable sleeve 132 to provide an upper stop for the movable sleeve 132, as shown in FIG. 25, wherein the upper stop band 140 impacts against the bottom of the funnel 129 to stop the movable sleeve 132 at its upper limit.

It may be appreciated that, when the movable sleeve 132 is in its lowest position, as shown in FIG. 24, the top edge 131 of the movable sleeve 132 is substantially flush with the top edge 134 of the vertical leg 124. However, when the movable sleeve 132 is moved to its raised position as shown in FIG. 25, the top edge 131 of the movable sleeve 132 projects above the top edge 134 of the vertical leg 124 and into the funnel area itself. This slight vertical movement of the movable sleeve 132 relative to the top edge 134 of the vertical leg 124 imparts a direct mechanical force to the catalyst pellets 18 adjacent to the opening 128 that is different from forces being applied to the surrounding catalyst pellets in order to break up any bridging that may occur within the funnel 129 adjacent to the opening 128.

To use the catalyst dispensing device 122, the leg 124 of the loading sleeve is inserted into a reactor tube 16 until the flange 126 is resting on top of the tube sheet 12. Note that the flange 126 may be adjusted vertically along the vertical leg 124, as desired by loosening the adjustment screw 127, shifting the flange 126 to the desired position, and then tightening the adjustment screw 127. Catalyst pellets (not shown) are added to the funnel 129, and the movable sleeve 132 is moved up and down to continuously break any bridge forming adjacent to the opening 128 of the loading sleeve. The movable sleeve may be moved manually or by some type of automated mechanism as described with respect to the dispensing device 122* of FIG. 36. This process continues repeatedly, with successive bridges forming and then followed by bridge breaking to load the reactor tube 16 with catalyst pellets. As is explained below with respect to another embodiment of a catalyst dispensing device 122* (See FIG. 36), the vertical movement of the movable sleeve 132 may be mechanized to automate the dispensing of catalyst into the reactor tubes 16.

FIGS. 36-40 show another embodiment of catalyst dispensing device 122*. It is similar to the catalyst dispensing device 122 of FIG. 24 in that it has a funnel 129*, a flange 126*, a vertical leg (or conduit) 124*, a stop 138*, and a through opening 128* (See FIG. 37) at the top of the vertical leg 124* which has a small enough diameter to ensure that the flow of catalyst pellets is restricted enough to prevent bridging in the leg 124* and in the reactor tube 16.

Figure 37:
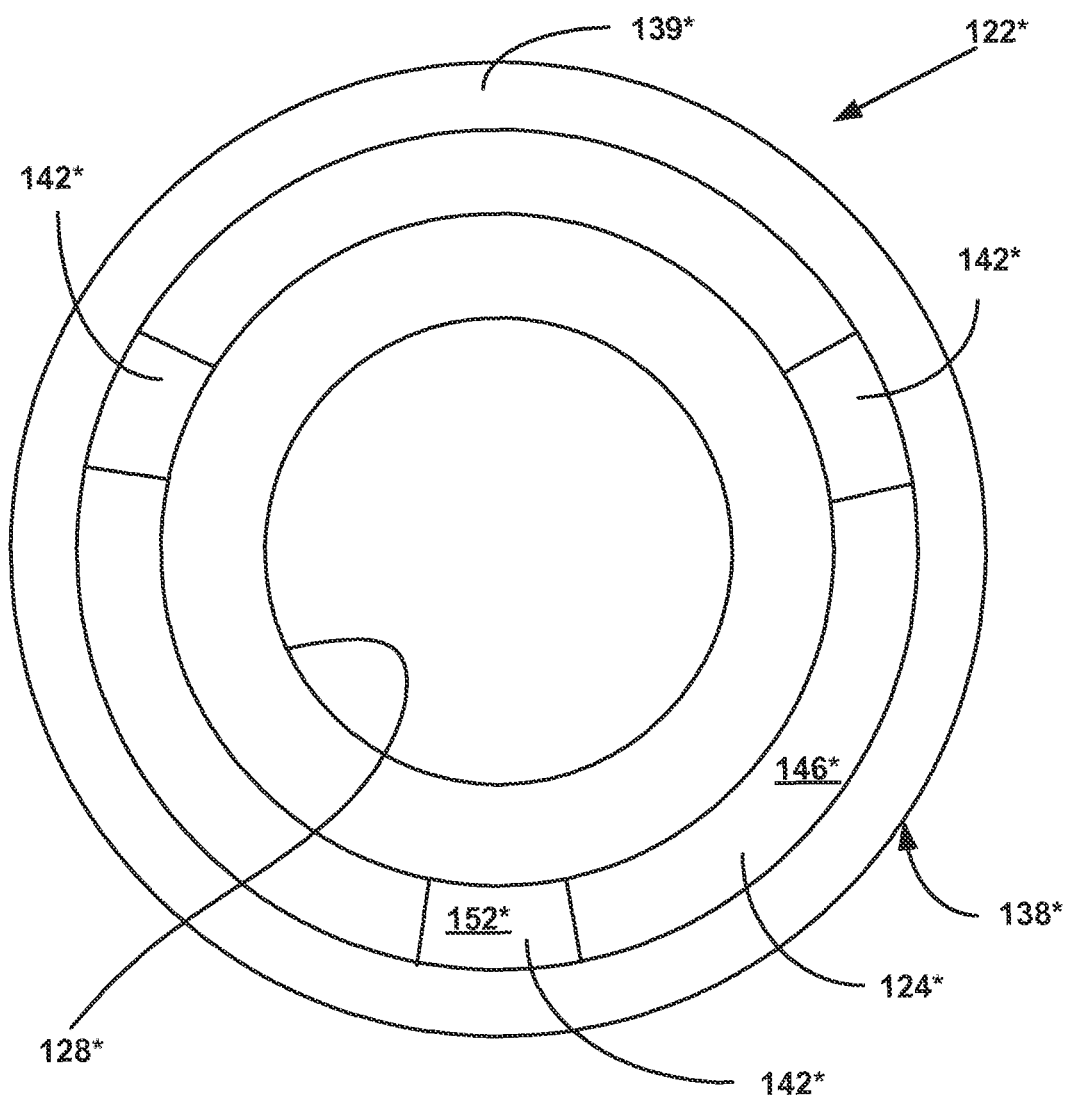
FIG. 37 is a view along line 37-37 of FIG. 36.
Figure 38:
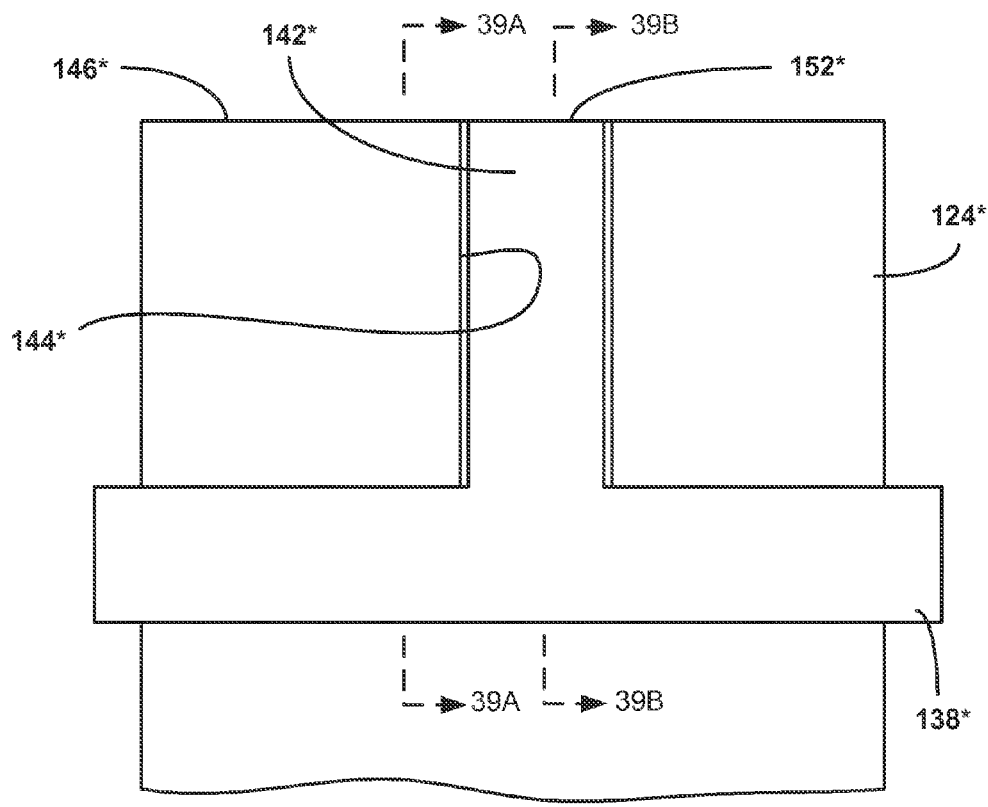
FIG. 38 is a broken away, side view, along line 38-38 of FIG. 36.

Referring to FIGS. 37, 38, 39A, and 39, the stop 138* is actually a sleeve or collar which includes a ring 139* with three upwardly and inwardly projecting prongs 142*. The prongs 142* are parallel to each other, have their top edges at the same elevation, their bottom edges at the same elevation, and are spaced apart at 120 degree intervals. The prongs 142* ride in grooves 144* (See FIG. 38) in the vertical leg 124*. These grooves 144* extend from the top edge 146* of the vertical leg 124* downwardly to a distance substantially equal to the height of the prongs 142*, as seen in FIG. 38. The grooves 144* lie inside the perimeter of the funnel 129*, so, as the collar 138* moves upwardly, the prongs 142* move up into the interior of the funnel 129*. The collar 138* can move upwardly until its ring 139* abuts the outer surface of the funnel 129*, and it can move downwardly until the bottom surfaces 148* of the prongs 142* abut the surfaces 150* at the bottom of the grooves 144* (unless the drive mechanism prevents the collar 138* from reaching its upper and lower limits).

Figure 36:
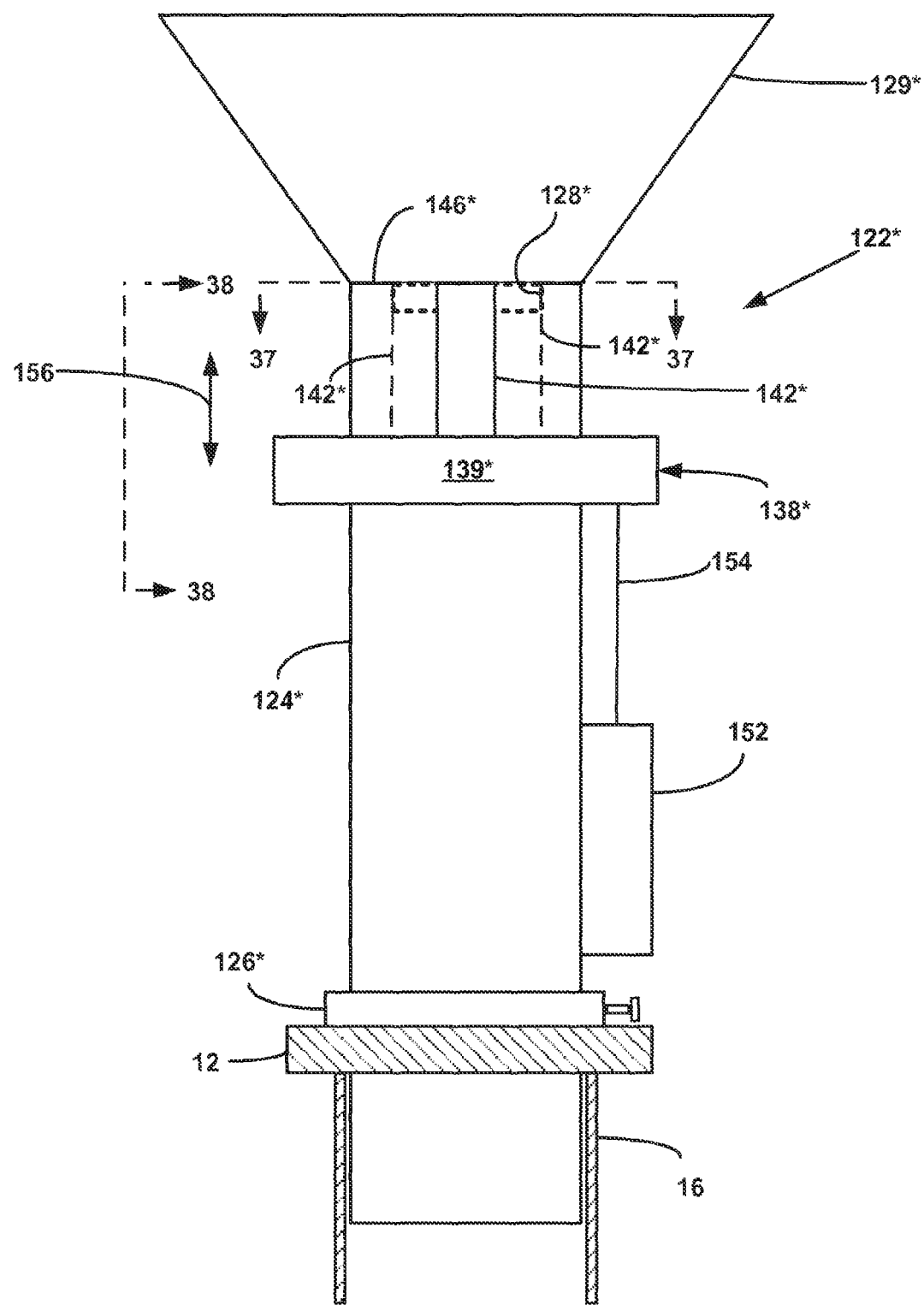
FIG. 36 is a side view of another embodiment of a catalyst dispensing device.
Figures 39A, 39B:
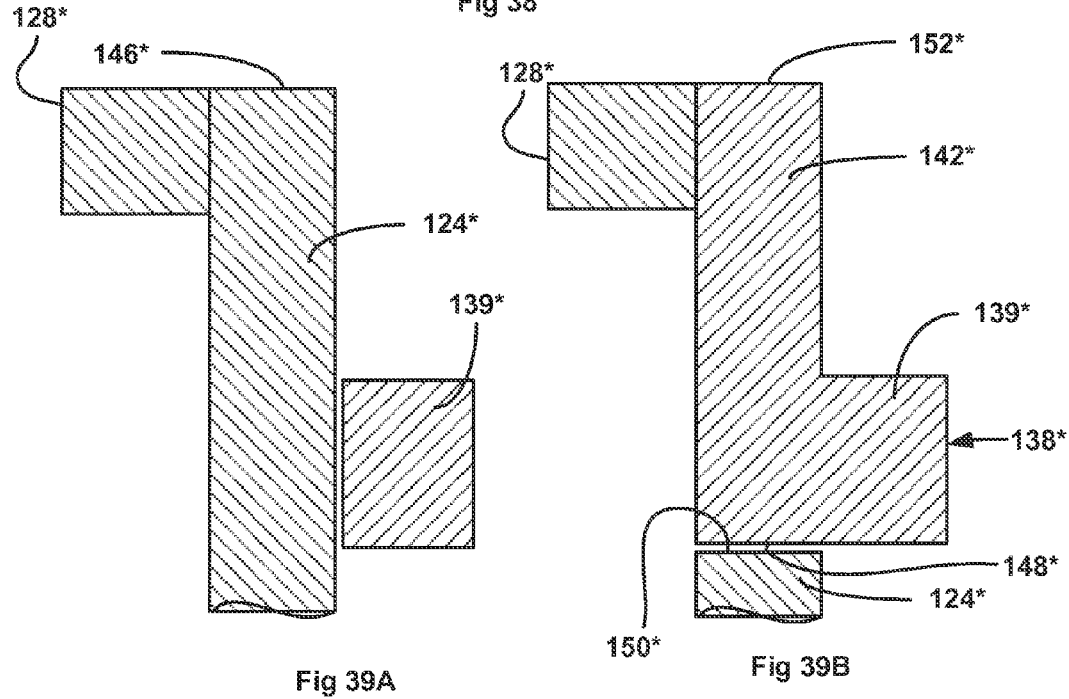
FIG. 39A is a section view along line 39A-39A of FIG. 38.
FIG. 39B is a section view along line 39B-39B of FIG. 38.

When the sleeve 138* is in its lowered position, as seen in FIGS. 38, 39A, and 39B, the bottom surface 148* of the prong 142* rests on top of the surface 150* at the bottom of the groove 144* (see FIG. 39B), and the top surface 152* of each prong 142* is flush with the top edge 146* of the vertical leg 124* (as shown in FIGS. 36, 37, and 38).

Figure 40:
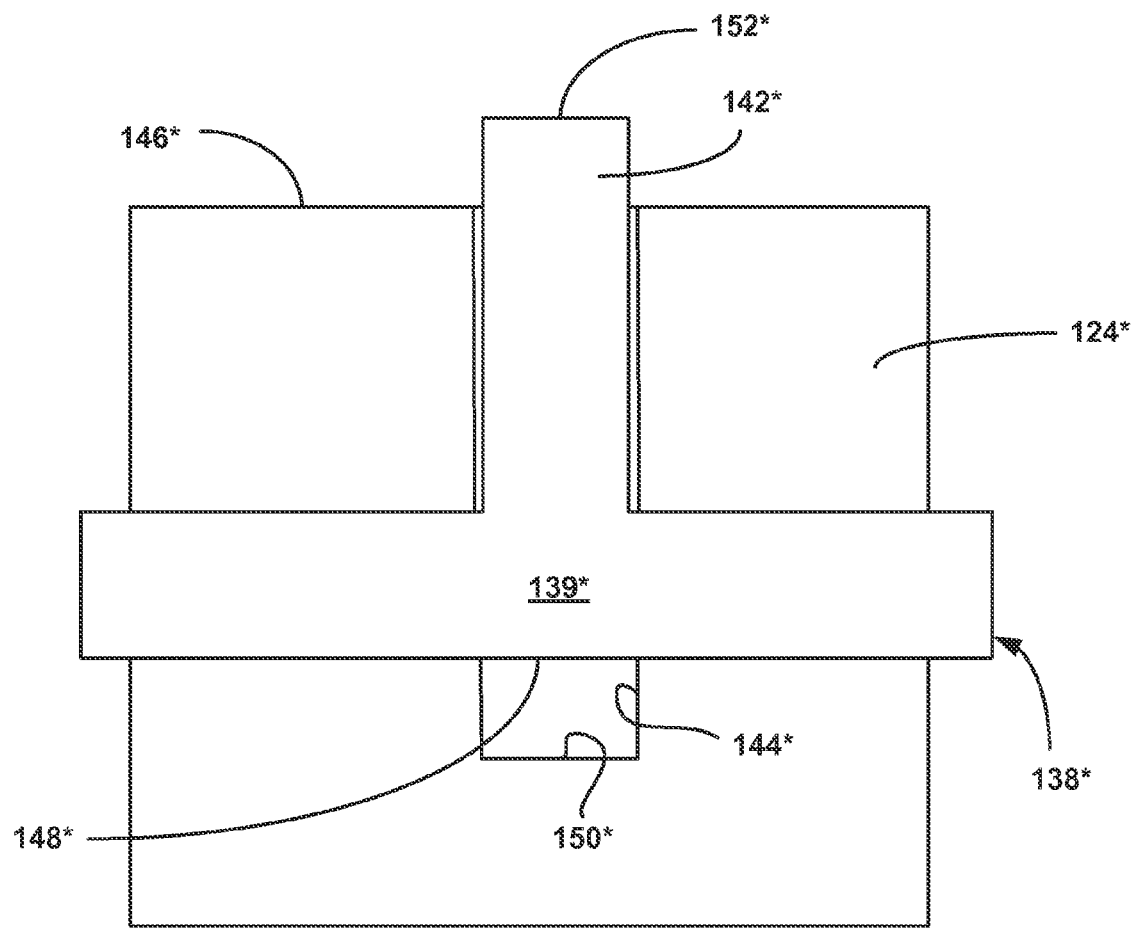
FIG. 40 is a side view, similar to that of FIG. 38, but with the bridge breaking device in the raised position.

When the sleeve 138* is raised, as seen in FIG. 40, the top surface 152* of each prong 142* projects upwardly into the funnel area. This vertical movement of the prongs 142* of the sleeve 13* allows the prongs 142* to impart a direct mechanical force to the catalyst pellets 18 adjacent to the opening 128* that is different from the forces being applied to the surrounding catalyst pellets in order to break up any bridging that may occur within the funnel 129* adjacent to the opening 128*. Therefore, this catalyst dispensing device 122* works in a very similar manner to the catalyst dispensing device 122 described earlier.

FIG. 36 shows an actuator 152 that is fixed relative to the vertical leg 124* and that is functionally connected to the collar 138* via a connecting rod 154. The actuator 152 imparts a linear, up-and-down vertical motion to the connecting rod 154, which, in turn, imparts the same motion to the collar 138*, as illustrated by the arrow 156, in order to automate the bridge breaking function of the catalyst dispensing device 122*.

Figure 26:
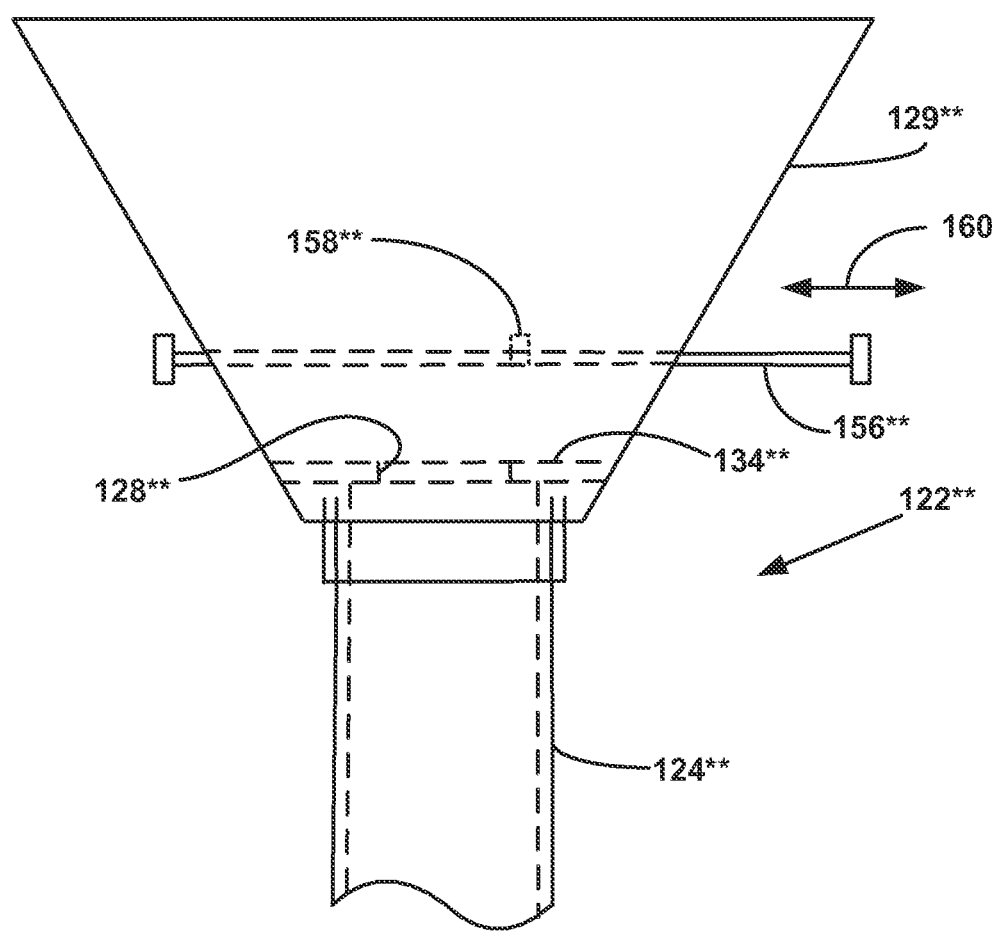
FIG. 26 is a side view of another alternate embodiment of a catalyst dispensing device, shown in a first position.
Figure 27:
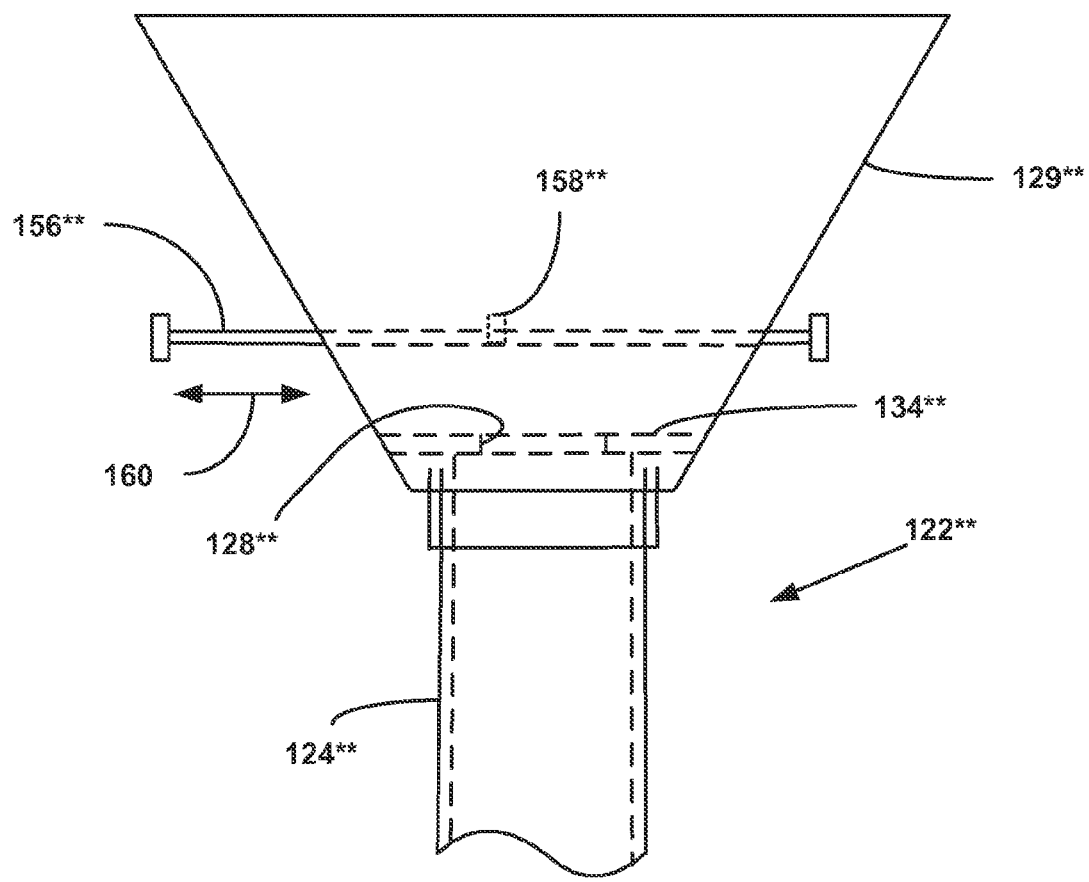
FIG. 27 is a side view of the catalyst dispensing device of FIG. 27, shown in a second position.

FIGS. 26 and 27 show yet another embodiment of a catalyst dispensing device 122**. This catalyst dispensing device 122* includes a vertical leg (or conduit) 124 and a funnel 129 which holds the catalyst pellets above the reactor tube. The top edge 134 of the vertical leg 124 defines a through opening 128 with a smaller diameter than the rest of the leg 124 and a smaller diameter than the inside diameter of the reactor tube 16 into which the leg 124 is inserted to control the flow rate of catalyst pellets in order to prevent bridging in the leg 124 and in the reactor tube 16. A short distance above the top edge 134 of the vertical leg 124 (that distance preferably being less than the smallest dimension of the catalyst pellets 18), a rod 156 projects through the sides of the funnel 129 and extends substantially across and over the opening 128. The rod 156 may be a stiff rod or wire, or it may have some flexibility such as may be obtained by using a thin plastic strip. A small enlargement or bump 158 is located midway along the length of the rod 156. As the rod 156 reciprocates horizontally back and forth in the motion indicated by the arrow 160, the enlargement 158 moves across the opening 128 and imparts a direct mechanical force to at least one of the catalyst pellets adjacent to the opening 128\*\* that is different from forces being applied to the other surrounding catalyst pellets in order to break up any bridges formed by the catalyst pellets adjacent to the opening 128\*\*. This process continues repeatedly, with successive bridge forming followed by bridge breaking to load the reactor tube with catalyst pellets. The rod 156\*\* may be moved manually or through an automated, reciprocating mechanism such as a linear actuator that is fixed relative to the leg 124\*\***.

Figure 28:
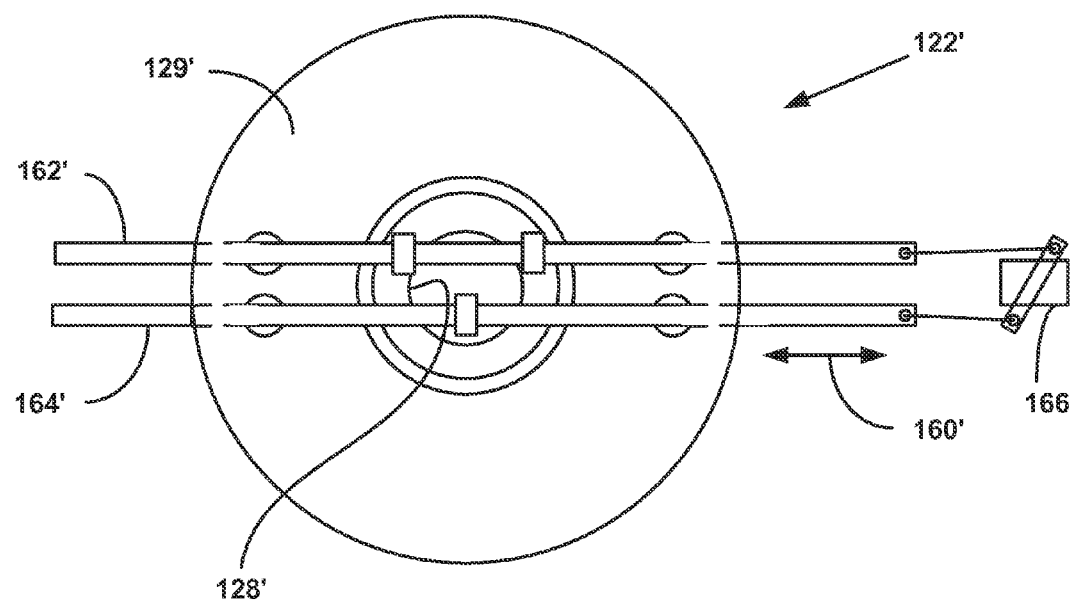
FIG. 28 is a plan view of an alternate embodiment of a catalyst dispensing device, similar to that of FIG. 26, but having two bridge breaking wires.

FIG. 28 is a plan view of another embodiment of a catalyst dispensing device 122'. This catalyst dispensing device 122' is identical to the catalyst dispensing device **122\*\* described above, except that it has two rods 162', 164' extending through the funnel 129' instead of the single rod 156\*\* described earlier. It should be noted that neither of these two rods 162', 164' is located directly above the centerline of the through opening 128' through which the catalyst pellets fall into the reactor tube 16. The rod or rods should be located close enough to the opening 128' to impart a localized, direct mechanical force to at least one of the catalyst pellets adjacent to the opening 128' that is different from the forces applied to the other surrounding catalyst pellets in order to break the bridges formed adjacent to the opening 128'**.

It should also be noted that the bumps **158\*\* and 158' in the rods are not strictly necessary for proper operation of the catalyst dispensing devices. They provide enhanced contact between the rod and the catalyst pellets and in this manner improve the bridge breaking characteristics of the device. Other means for enhancing the contact with the catalyst pellets 18**, such as roughening of the rod itself, may be used for the same end result.

FIG. 28 further shows a reciprocating rotary actuator 166 used to automate the reciprocating motion of the rods 162', 164' in the direction of the arrow 160'. Though not shown in this view, the actuator 166 may be used to reciprocate rods connected to a plurality of linearly-aligned catalyst dispensing devices 122'.

Figure 29:
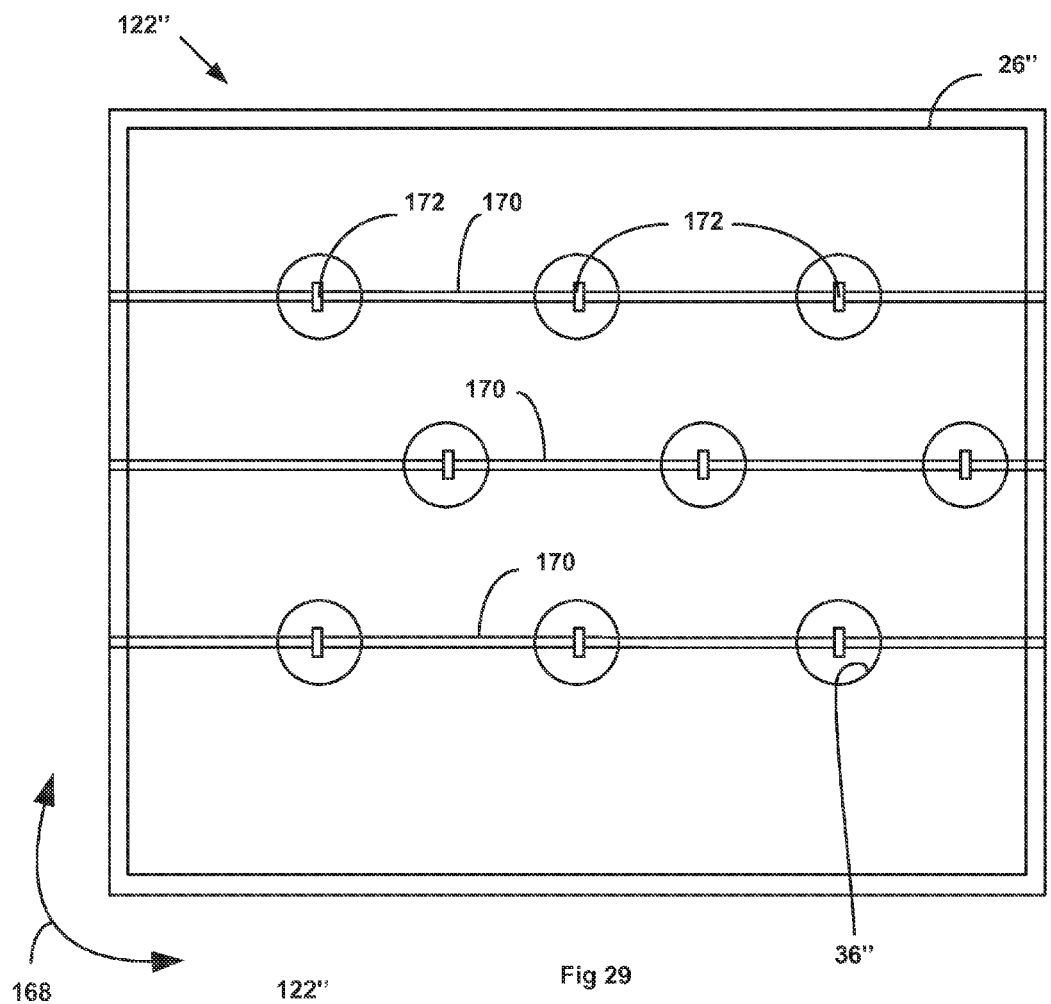
FIG. 29 is a plan view an alternate embodiment of a catalyst dispensing device, similar to that of FIG. 26, but for handling multiple tubes simultaneously.
Figure 30:
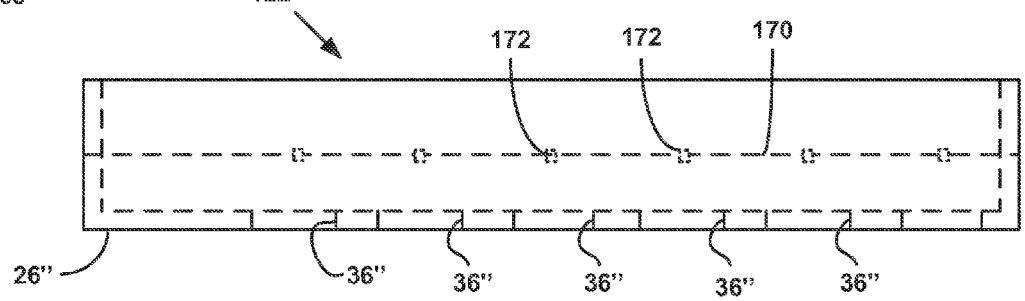
FIG. 30 is a side view of the catalyst dispensing device of FIG. 29.

FIGS. 29 and 30 show another embodiment of a catalyst dispensing device 122". This catalyst dispensing device 122" may be described as a hybrid between the catalyst dispensing device 24 of FIG. 6A and the catalyst dispensing device **122\*\* of FIG. 26. The catalyst dispensing device 122" includes a tray (or hopper) 26" with a plurality of through openings 36", similar to the tray 26 (See FIG. 11) of the catalyst dispensing device 24. The arrow 168 (See FIG. 29) indicates the reciprocating motion of the tray 26" to break any catalyst bridges by the tray 26" imparting a direct mechanical force to catalyst pellets resting on the underlying substrate within the openings 36" of the tray 26". The underlying substrate is not shown in this view, but has been identified earlier with respect to the description of the catalyst dispensing device 24**, as being either a template or a plurality of loading sleeves.

Figure 11:
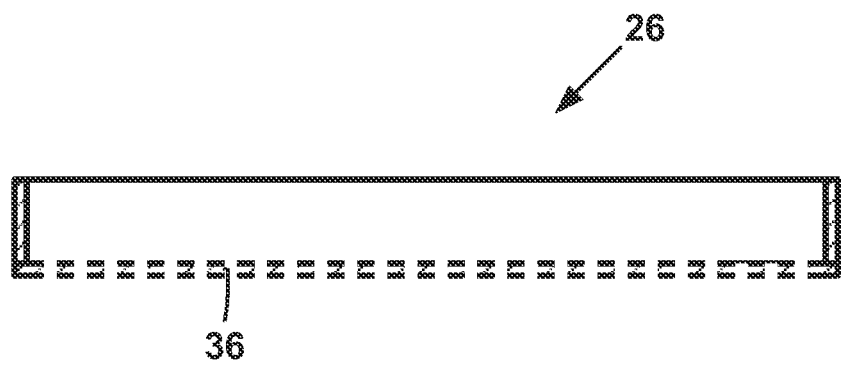
FIG. 11 is a schematic section view of the dispensing tray, taken along line 11-11 of FIG. 10.

A comparison of the tray 26 of FIG. 11 with the tray 26" of FIGS. 29 and 30 shows the addition of stationary rods 170 with resistance enhancing bumps 172 to the catalyst dispensing device 122", similar to the rod **156\*\* and bump 158\*\* of the catalyst dispensing device 122\*\* of FIG. 26. The reciprocating motion of the tray 26" relative to the stationary rods 170 (as indicated by the arrow 168) causes the rods 170 to impart a localized, direct mechanical force to the catalyst pellets adjacent to the openings 36" that is different from the forces applied to the surrounding catalyst pellets in order to break up catalyst bridges adjacent to the openings 36"**.

FIGS. 31-35 show yet another embodiment of a catalyst dispensing device 122^. This catalyst dispensing device 122" is similar to the catalyst dispensing device 24 of FIG. 6A, but it has several separate bins or hoppers mounted on the dispensing tray 12^ so a measured load of catalyst pellets 18 is delivered into each reactor tube 16.

Figure 31:
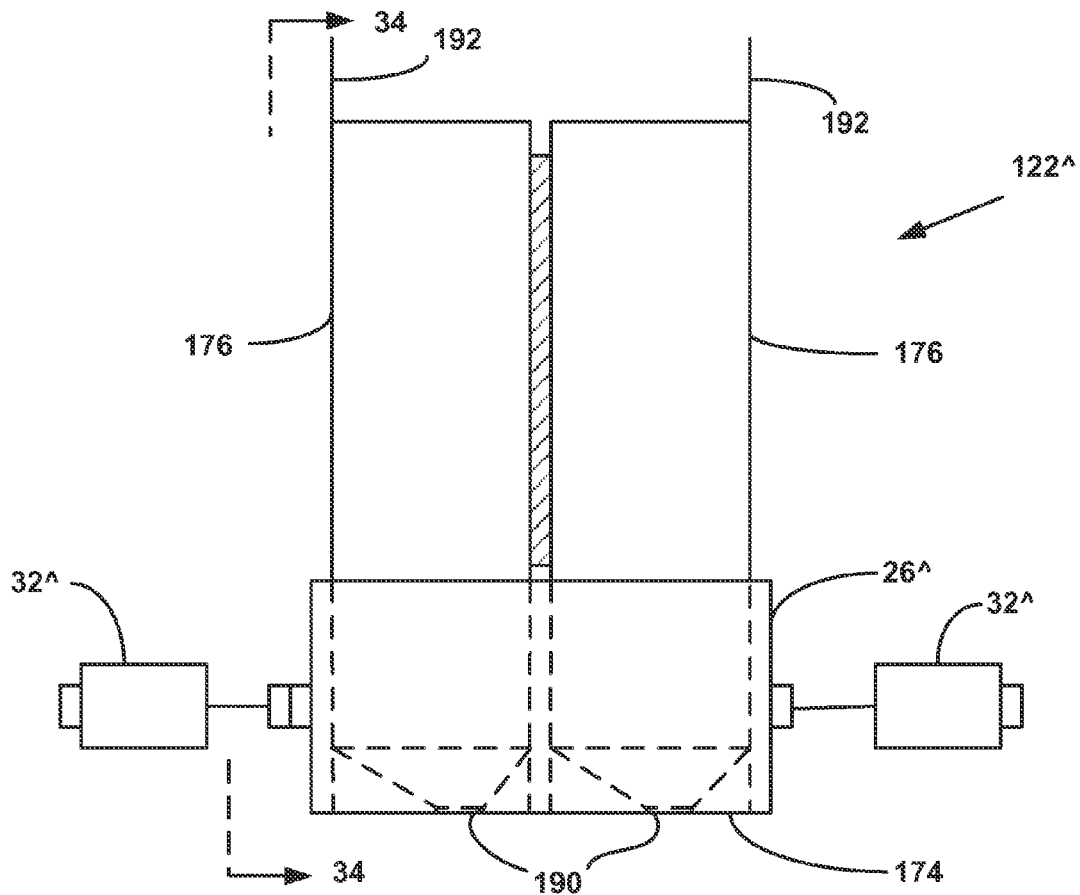
FIG. 31 is a side view of another embodiment of a catalyst dispensing device.

Referring to FIG. 31, and comparing it with FIG. 6A, the catalyst dispensing device 122^ includes a tray 26^ with a plurality of openings that are generally aligned with the openings in the top of the reactor tubes 16. It differs from the embodiment of FIG. 6A in that there are several bins 176 mounted on the tray 26^. The openings in the tray 26^ are the same size as and are aligned with the openings 190 in the bottoms of the bins 176, and the tray 26^ is thin enough that the openings in the tray are effectively the same as the openings 190 in the bottoms of the bins 176.

As with the embodiment of FIG. 6A, this embodiment includes a plurality of linear motion drives 32^ that impart a reciprocating motion to the tray 26^ (and to the bins 176 that are fixed relative to the tray 26^).

Figure 33:
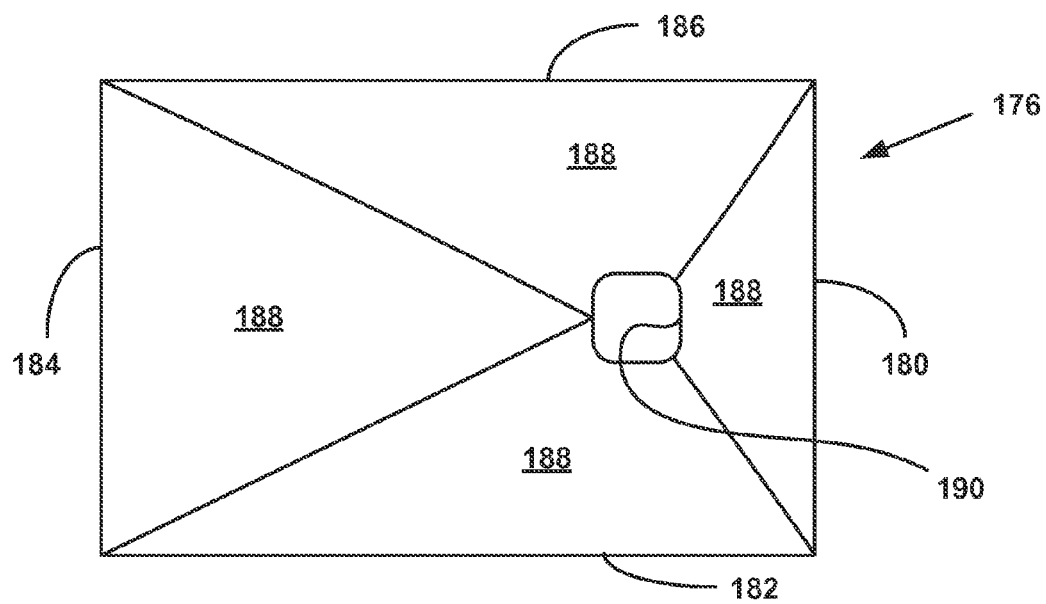
FIG. 33 is a plan view of one the bins of FIG. 31.
Figure 34:
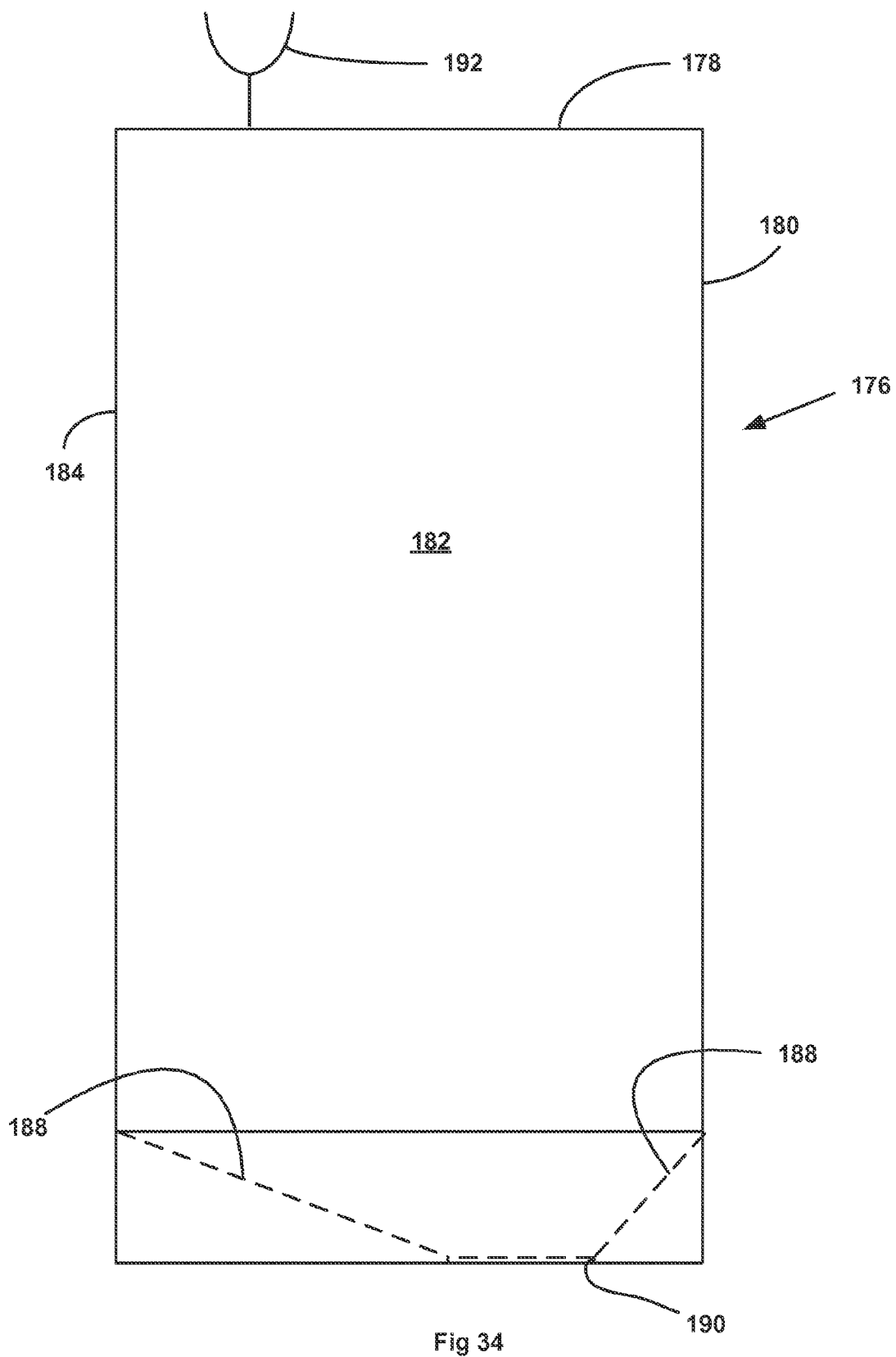
FIG. 34 is a side view of the bin of FIG. 33.

Referring to FIGS. 33 and 34, each dispensing bin 176 is a container having a generally rectangular cross-section with an open top 178, four side walls 180, 182, 184, and 186, and a bottom with sloping ramps 188 that directs catalyst pellets to the through opening 190 (which corresponds to the opening 36 in the tray 26 of FIG. 6A). Alternatively, each bin 176 may have an open bottom which matches up directly with its corresponding dispensing plate 174 which is part of the dispensing tray 26^, and these dispensing plates 174 that have the sloping ramps 188 direct catalyst pellets to the through openings 190.

The cross-section of the dispensing bin 176 is large enough relative to the size of the catalyst pellets that the catalyst pellets will not bridge in the bin 176 until they reach the bottom of the bin 176 adjacent the opening 190. Any bridging in the bin 176 will occur at the very bottom of the bin 176, just above the opening 190. Just as with the embodiment of FIG. 6A as described earlier, the reciprocating motion of the tray 26^ will impart a direct mechanical force to the catalyst pellets resting on the template below the tray 26^ that is different from the force being applied to surrounding catalyst pellets, thereby causing relative motion between the catalyst pellets forming a bridge so as to break up the bridges and allow the catalyst pellets to fall through the openings 190 and into the reactor tubes 16. This catalyst dispensing device 122^ has a yoke 192 that projects above the bins 176, as shown in FIGS. 31 and 34, which assists with dispensing the catalyst pellets into the bins 176, as will now be described.

Figure 32:
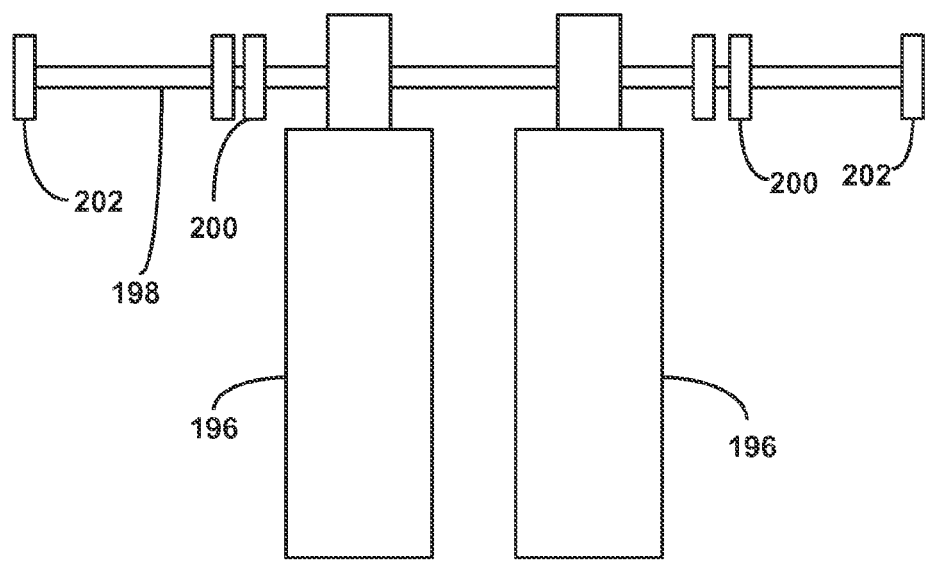
FIG. 32 side view of a bin transport device for the catalyst dispensing device of FIG. 31.

With this embodiment, catalyst pellets are delivered in catalyst transport devices 196, which are open top containers that are adjustably mounted together on a transport bar 198 as shown in FIG. 32 such that their positions along the length of the transport bar 198 may be adjusted to match the location and spacing of the dispensing bins 176. The transport bins 196 may be sized as needed. An exact, measured charge or load of catalyst pellets 18 (See FIGS. 35A-35C) is loaded into each transport bin 196 outside of or adjacent to the reactor prior to the dispensing operation. This charge may be measured by volume, by weight, or by some other desired means. In this particular embodiment, the transport bins 196 have marking lines 197 at various elevations, which indicate the various volume charges of catalyst pellets that would be loaded into the transport bin 196 if the catalyst pellets reached the particular marking line 197.

There are spools 200 mounted on the loading bar 198, and these spools rest on the yokes 192 of the dispensing bins 176. The spools 200 aid in the proper alignment of the transport bins 196 with the respective dispensing bins 176 and provide a bearing surface to support the transport bins 196 on the yokes 192. There also are handles 202 mounted on the transport bar 198 to assist the operators in pivoting the transport bins 196 to empty the catalyst pellets 18 into the respective dispensing bins 176, as shown in FIGS. 35B and 35C.

Figure 35A:
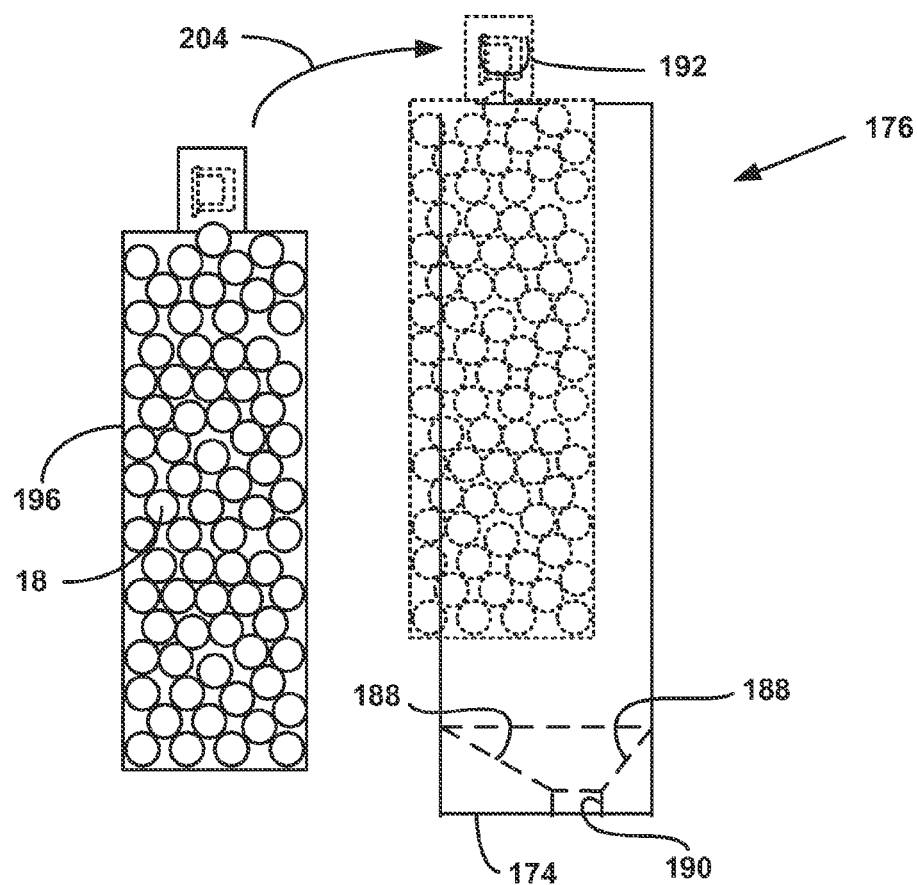
FIG. 35A is a side view of the bins of FIG. 31 and the bin transport device of FIG. 32, in preparation for transferring catalyst into the bins.
Figure 35B:
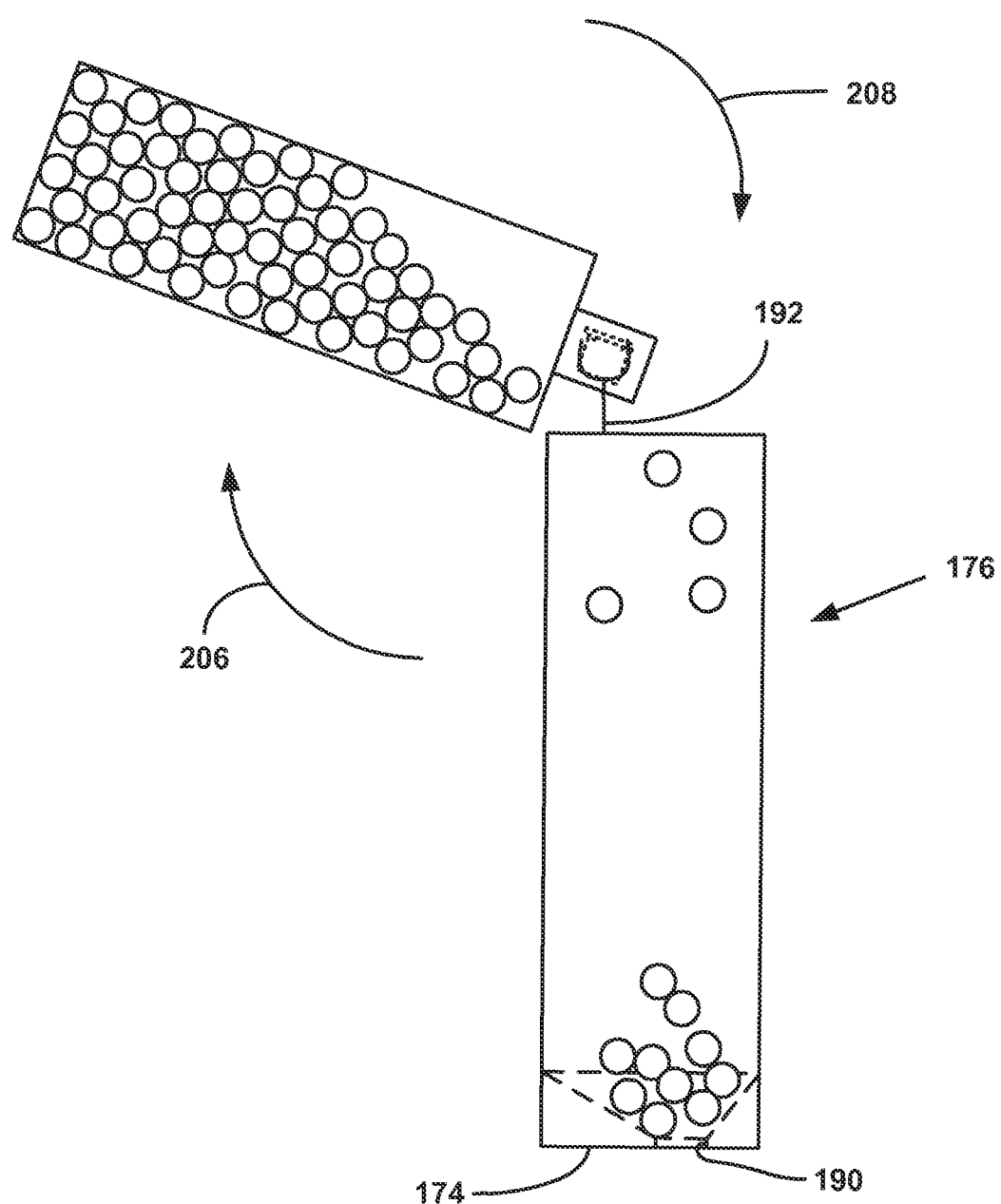
FIG. 35B is a side view, similar to FIG. 35A, but with the bin transport device starting to empty the catalyst into the bins.
Figure 35C:
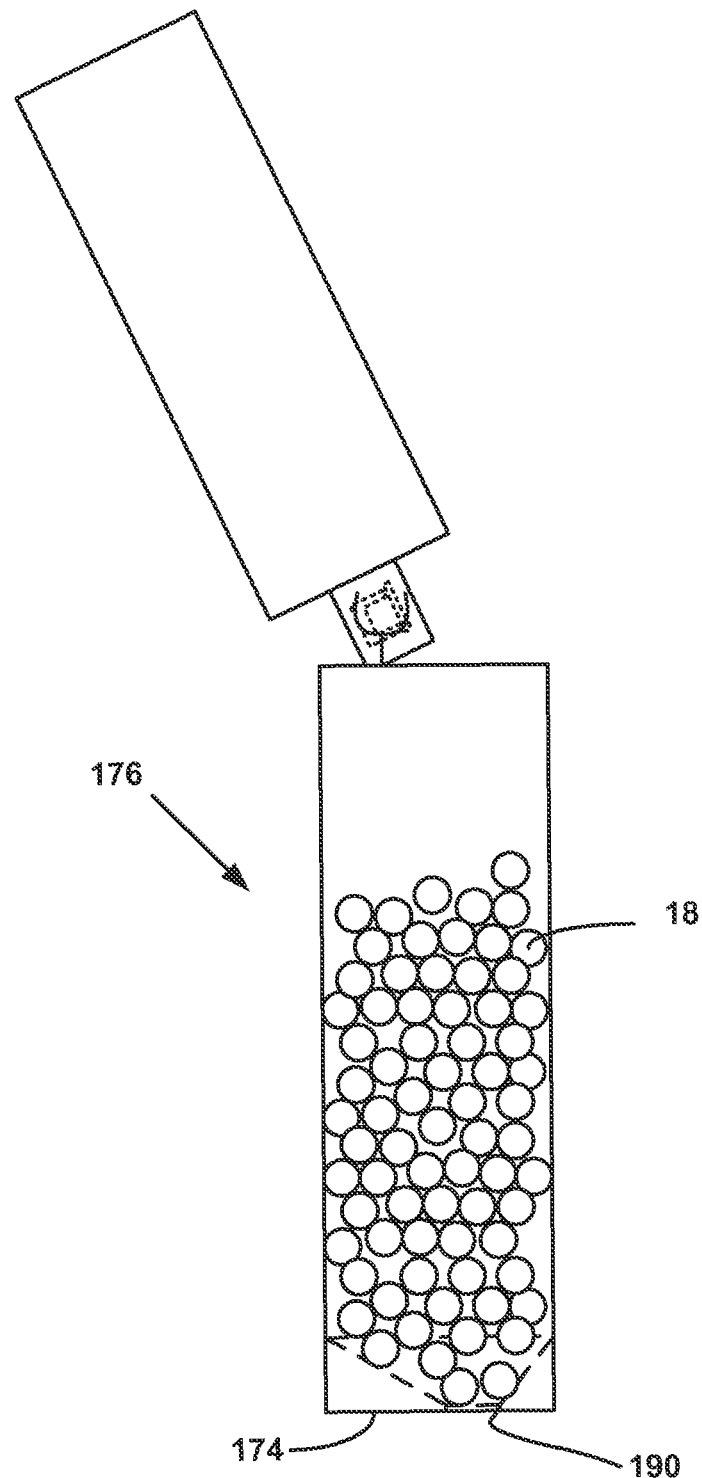
FIG. 35C is a side view, similar to FIG. 35, but with the catalyst in the bin transport device emptied into the bins.

Initially, a measured charge of catalyst pellets 18 is loaded into each of the transport bins 196 (See FIG. 35A). This preferably is done outside of the reactor 13 (See FIG. 1). A plurality of these catalyst transport bins 196 may be used such that some of them are being loaded while others are being used to transport catalyst to the catalyst dispensing device 122^, or the catalyst pellets may be delivered to the site pre-measured and pre-loaded into the transport bins 196.

The transport bins 196 may be picked up by the operators and transferred into the reactor vessel 13 through the manhole 17 for fixed head reactors or onto the reactor tube sheet area for removable head reactors either individually or in groups that are already mounted on a transport bar 198. Referring to FIG. 35A, the catalyst transport bins 196, mounted on the transport bar 198, are moved in the direction of the arrow 204, and placed onto the catalyst dispensing device 122^ such that the spools 200 rest on the yokes 192, which automatically aligns the transport bins 196 with the dispensing bins 176, as shown in phantom. The operators then pivot the transport bar 198 in the direction shown by the arrows 206, 208 of FIG. 35B until all the catalyst pellets 18 are emptied from the transport bins 196 into their respective dispensing bins 176, as shown in FIG. 35C.

Once the catalyst is loaded into the dispensing bins 176, the transport bar 198 with attached transport bins 196 is removed and the motion drives 32^ are powered up to start the reciprocating motion of the tray 26^ and of the dispensing bins 176 that are fixed to the tray 26^. Note that the catalyst dispensing device 122^ is mounted on a template 20, or on a plurality of loading sleeves 22, or may even be mounted directly on the tube sheet 12. If no template or loading sleeves are used, the openings 190 should be small enough to control the flow rate of catalyst pellets into the reactor tubes 16 to prevent bridging inside the reactor tubes 16.

The reciprocating motion of the catalyst dispensing device 122^ parallel to the tube sheet or template 20 imparts a localized force to at least one of the catalyst pellets resting on the template 20 or loading sleeve 22 or tube sheet 12 that is different from the force being applied to the surrounding catalyst pellets in order to break up any bridging in the dispensing bins 176 adjacent to the openings 190 to keep the catalyst pellets 18 flowing into the respective reactor tubes 16. This process continues repeatedly, with successive bridge forming followed by bridge breaking to load the reactor tubes 16 with catalyst pellets 18.

It should be noted that the speed of the reciprocating motion of the catalyst dispensing device 122^ may be adjusted as desired to achieve the desired flow of catalyst pellets through the dispensing device 122^ and into the reactor tubes 16.

Device Used for Dispensing and De-Dusting Catalyst

As explained earlier, in the background section, the reactor tubes may be quite long, housed in a structure several stories tall, and the catalyst pellets may be transported up several stories to an elevation above the top of the tubes so they may then flow by gravity into the tubes. The catalyst pellets typically are supplied in 2,000 pound (or larger) "super sacks", 55 gallon drums, mini drums, metal bins or plastic bags loaded in pallet-mounted cardboard boxes.

Figure 41:
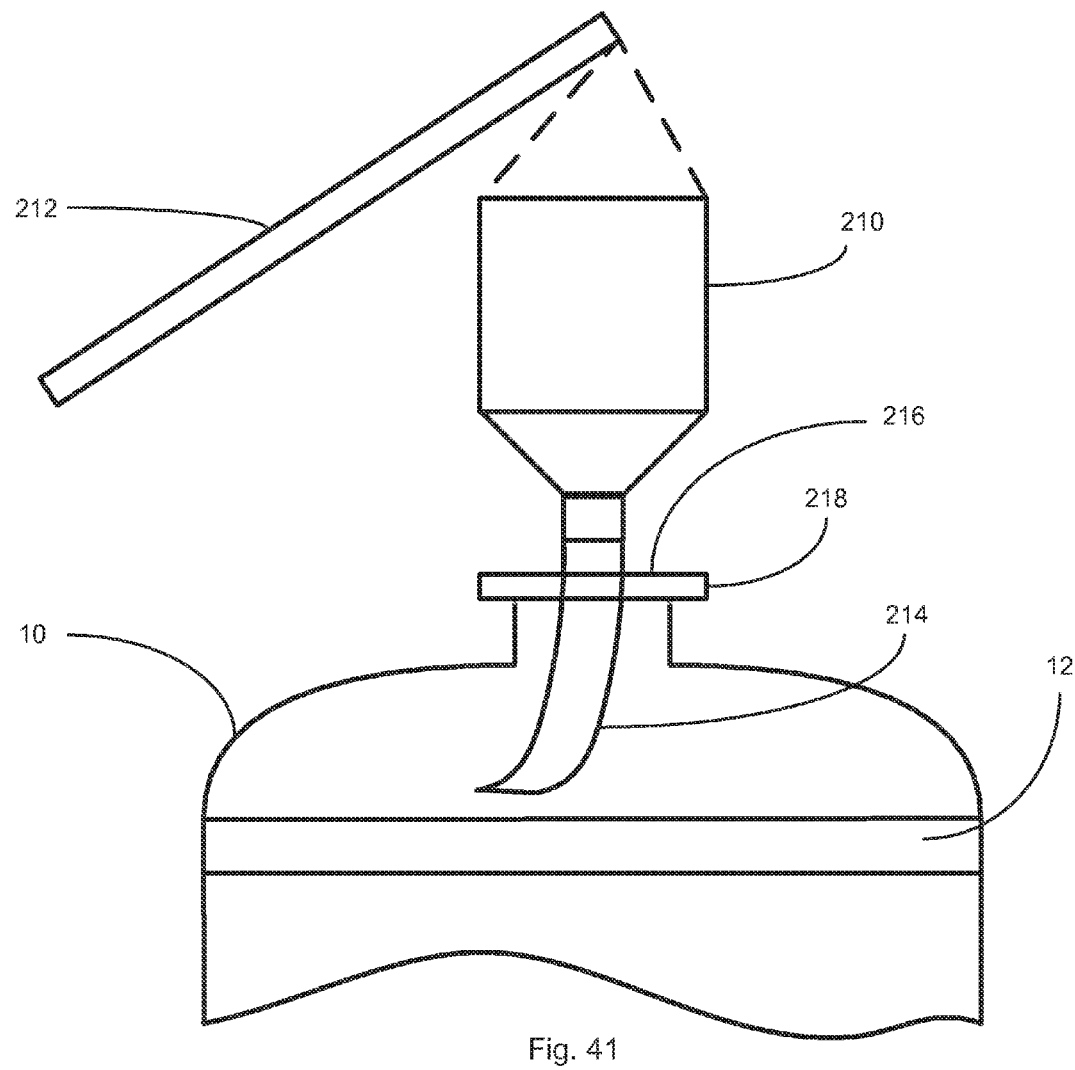
FIG. 41 is a schematic of the upper portion of the reactor vessel of FIG. 1 when dispensing catalyst into the reactor vessel in the prior art.

FIG. 41 is a broken away schematic of the transportation and dispensing of catalyst pellets from a super sack 210, as practiced in the prior art. The super sack 210 is picked up and supported above the reactor vessel 10 by a crane 212. A heavy duty hose 214 (typically a 4 inch to 6 inch diameter hose) is connected to the bottom of the super sack 210 and extends through a top opening 216 in the top flange 218 of the reactor vessel 10. Personnel (not shown) standing on the upper tube sheet 12 of the reactor vessel 10 manually handle the hose 214 inside the reactor vessel 10 to load the catalyst pellets from the super sack 210 onto a template or onto loading sleeves (not shown) placed on top of the upper tube sheet 12.

The hose 214 becomes full of catalyst pellets as the operator chokes off the free end of the hose 214 to regulate the flow of catalyst onto the tube sheet 12. This makes the hose 214 very heavy and very difficult to move around to various positions within the reactor. This also generates a large amount of dust due to the abrasion of the catalyst both in the super sack 210 and in the hose 214. In addition, the catalyst pellets tend to segregate themselves by size as they come out of the super sack 210, which prevents consistent loading into the reactor tubes.

Figure 42:
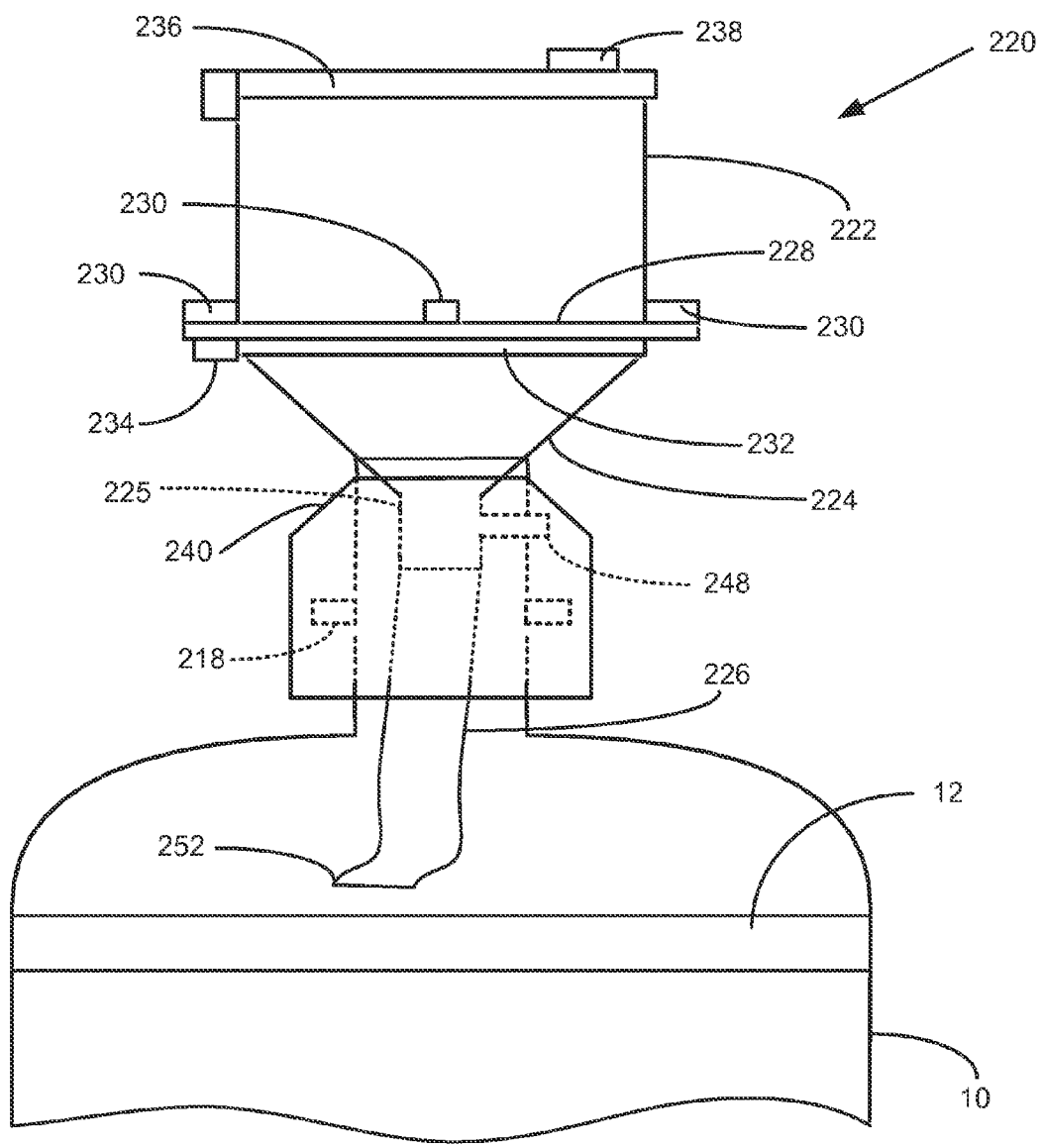
FIG. 42 is a schematic, similar to that of FIG. 41, but when dispensing catalyst into the reactor vessel using an embodiment of a pellet dispensing device made in accordance with the present invention.
Figure 43:
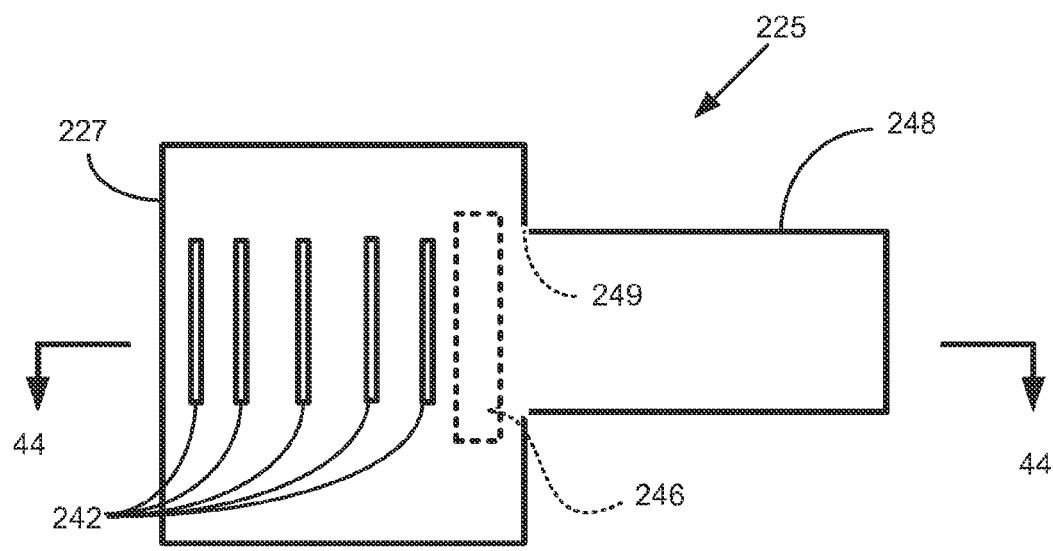
FIG. 43 is a more detailed side view of the de-dusting adapter of FIG. 42.
Figure 44:
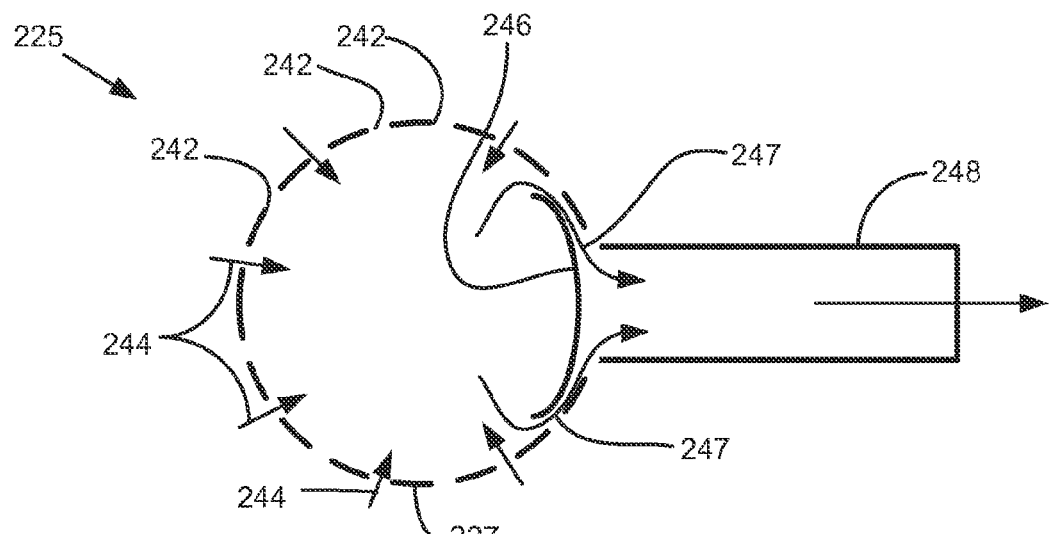
FIG. 44 is a view along line 44-44 of FIG. 43.

FIGS. 42-44 show a device 220 for dispensing catalyst pellets from a super sack, or from any other container, to a delivery point in the reactor vessel 10. The catalyst dispensing device 220 includes a hopper 222 preferably sized to handle at least all the contents of the container being emptied, such as the 2,000 pounds of catalyst in a super sack. This hopper 222 rests atop a funnel-shaped transition piece 224, which necks down to the smaller diameter of a de-dusting adapter 225, which connects the transition piece 224 to a flexible hose (or conduit) 226. It should be noted that the diameter of the hopper 22, of the de-dusting adapter 225 and of the conduit 226 are many times the diameter of the catalyst pellets that are being dispensed (at least eight times the largest dimension of the catalyst pellets), so there is no bridging of catalyst pellets as they pass through the hopper 22, the funnel 224, the adapter 225, and the conduit 226. As explained in more detail below, the hose or conduit 226 may be a flexible, light duty hose, as it is not intended for this hose 226 to be fully loaded with catalyst pellets. The flexible and light-weight nature of the hose 226, and the fact that it is not completely filled up with catalyst pellets, makes it easy to move the hose around to where the catalyst is needed within the reactor.

Between the hopper 222 and the transition piece 224 is a reciprocating plate 228 which is very similar to the bottom of the tray 26 of the catalyst dispensing device 24 of FIG. 6A, including a plurality of through openings and linear motion drive devices 230, which correspond to the through openings 36 and linear motion drives 32 of FIG. 6A. The reciprocating plate (upper plate) 228 lies on top of a second plate (lower plate) 232. This second plate 232 has its own linear motion drive 234. The second plate 232 also defines a plurality of through openings (not shown), each of which substantially aligns with a corresponding opening in the upper reciprocating plate 228 when the second plate 232 is in a first position. However, when the linear motion drive 234 of the second plate 232 is actuated, the second plate 232 moves to a second position, wherein each of the openings on the second plate 232 is in complete misalignment with its corresponding through opening on the reciprocating plate 228. When it is in the second, non-aligned position, the second plate 232 acts as a positive shut-off valve to interrupt all flow of catalyst pellets from the hopper 222 to the hose or conduit 226.

The openings in the second plate 232 are comparable in size to the openings 34 in the plate 20 of FIG. 5, and to the openings 23 of FIG. 5A, which have a diameter that is four times the largest dimension of the catalyst pellets or less, or of a size that causes bridging of the catalyst pellets above the openings in the second plate 232. (The second plate 232 may be referred to as a sieve, or the upper and lower plates together 228, 232 may be referred to as a sieve.) The openings in the reciprocating upper plate 228 are comparable in size to the openings 36 in the tray 26 of FIG. 6B or 6D, preferably somewhat larger than the openings in the second plate 232. A large number of openings in the second plate 232 creates a large number of individual pathways by which catalyst pellets pass from the hopper 222 into the large diameter conduit 226.

The hopper 222 includes a hinged, watertight cover 236, which can be opened for bulk dispensing of catalyst pellets as from a super sack. A second, smaller cover 238 may be used to load smaller quantities of catalyst pellets (as from small boxes or bags) or for continuous dispensing of catalyst pellets (as through a hose). In a preferred embodiment, both of these covers 236, 238 are watertight to allow continued dispensing of catalyst pellets into the reactor vessel 10 even in adverse weather conditions. For instance, one or more super sacks may be emptied into the hopper 222 via the cover 236 while it is not raining. Then, even if it starts to rain, the hopper 222 may be unloaded into the reactor vessel 10. A weather shield 240 may be installed over the de-dusting adapter 225 and the flange connection 218 for further assurance of water-tightness, if required.

Referring now to FIGS. 43 and 44, the de-dusting adapter 225 has a cylindrical wall 227 equidistant about an imaginary vertical axis, and that cylindrical wall 227 has an outer surface and an inner surface. A nozzle 248 extends horizontally from a large, circular opening 249 in the cylindrical wall 227. The cylindrical wall 227 defines a plurality of radially-arranged slotted openings 242 for admitting air into the interior of the cylinder 227, as shown by the arrows 244 in FIG. 44. A partial cylindrical baffle wall 246 creates a tortuous path 247 for the air being drawn through the de-dusting adapter 225 to ensure that only lighter-weight dust particles are pulled out of the de-dusting adapter 225 via a vacuum source (not shown) connected to the nozzle 248 projecting from one side of the de-dusting adapter 225. Note that the baffle 246 could be replaced by a fairly tight wire mesh screen which covers the opening 249 into the nozzle 248, such that only small dust particles are extracted from the de-dusting adapter 225 while larger catalyst pellets are rejected and allowed to fall into the hose 226.

It should also be noted that, even if there is no provision for slotted openings 242 around the de-dusting adapter 225, air may be drawn up through the free end of the hose 226, up through the length of the hose 226, through the dedusting apparatus 225 and out the nozzle 248 to the vacuum source discussed above. In either case, the vacuum level in the vacuum source is adjusted to provide the degree of de-dusting that is desired, vacuuming a stream of gas out of the side of the cylinder 227 (which is part of the conduit) as the catalyst pellets flow through the cylinder 227 in order to remove dust from the catalyst pellets.

To operate the catalyst dispensing device 220, the device 220 is first installed onto the top flange 218 of the reactor vessel 10, as shown in FIG. 42. Pneumatic air is provided for the linear motion drives 230 of the reciprocating plate 228 as well as for the linear motion drive 234 of the second plate (shut-off plate) 232. The hopper 222 is at least partially filled with catalyst pellets, which enter through the large cover 236 or the small cover 238 while the shut-off plate 232 is in the closed position. A vacuum source is also connected to the nozzle 248 of the de-dusting adapter 225.

Once the personnel are ready and inside the reactor vessel 10, the actuator 234 for the shut-off plate 232 may be actuated to open the path, allowing catalyst pellets to fall from the hopper 222, through openings in both plates 228, 232, to the hose 226. Since the effective diameter of the aligned openings in the upper plate 228 and lower plate 232 are only slightly larger in diameter than the catalyst pellets (usually less than two times the largest dimension of the catalyst pellets), there will be bridging of catalyst pellets above the plates 228, 232. Only a small amount of catalyst pellets will fall through the aligned openings in the plates before bridges of catalyst pellets form in the hopper 222 above the respective openings, preventing more catalyst pellets from falling into the hose or conduit 226. The actuators 230 for the reciprocating upper plate 228 are actuated to provide localized, direct mechanical force to continuously and gently break the bridges forming in the hopper 222, allowing the catalyst pellets to fall continuously through the aligned openings in the upper and lower plates 228, 232 and into the hose 226. This creates a controlled flow of catalyst pellets into the conduit 226, with the catalyst pellets being homogeneously spaced apart from each other, so they flow with minimal or no contact with each other. This minimizes the opportunity for the catalyst pellets to rub against each other and abrade each other. It also results in the conduit 226 being relatively lightweight and easy to move around.

This spaced-apart flow of the catalyst pellets will be referred to herein as "star flow", since it evokes the image of the stars flowing toward the viewer in a common screen-saver for a computer monitor. In practice, this "star flow" is such that, if one takes a horizontal cross-section across the conduit 226 at any given time as the catalyst pellets are flowing through the conduit, that cross-sectional area will be filled 26% or less by catalyst pellets, with the remainder being open space. This contrasts with the full flow in the prior art conduit of FIG. 41, in which the cross-sectional area would be filled 55% or more with catalyst pellets.

Another way to consider "star flow" is to contrast it with full flow or maximum flow, with full flow or maximum flow being defined as the maximum number or maximum weight of catalyst pellets that can flow through the conduit, and "star flow" being half of the maximum flow or less. In maximum flow, the catalyst pellets are packed together and are in maximum contact with each other as they flow through the conduit, with the conduit being as full of catalyst pellets as it can be. This is the condition in the prior art conduit of FIG. 41. With "star flow", the catalyst pellets are in minimal or no contact with each other and are spaced apart in a homogeneous manner across the cross-section of the conduit as they flow through the conduit. Thus, the weight of catalyst pellets in the conduit as the catalyst pellets are flowing through in a star flow arrangement is half or less of the weight of catalyst pellets in the conduit as the catalyst pellets are flowing through in a typical prior art full flow or maximum flow arrangement.

The operator directs the free end of the hose 226 as required to deposit the de-dusted catalyst pellets at delivery points where they are needed, finding the conduit to be much lighter and easier to handle and encountering far less dust than in the prior art arrangement.

In a preferred embodiment, the operator inside the reactor vessel 10 has direct control of the pneumatic air to the linear motion drive 234 of the shut-off plate 232 in order to stop the flow of catalyst pellets to the upper tube sheet 12 of the reactor vessel 10. Preferably, the operator also has direct control of the pneumatics to the linear motion drives 230 of the reciprocating plate 228 so he can regulate the frequency of reciprocation of the plate 228, which regulates the flow of catalyst pellets by regulating the frequency with which the bridges impeding the flow of catalyst pellets are broken. In one extreme, if the frequency of reciprocation of the plate 228 is reduced to zero (the air to the linear motion drives 230 is shut off), the flow of catalyst pellets will quickly stop due to bridging of catalyst above the openings in the reciprocating upper plate 228.

Using the catalyst dispensing device 220, the hopper 222 is emptied evenly, gradually, gently, and from the bottom. That is, the catalyst pellets closest to the reciprocating plate 228 are always the first to be drawn out of the hopper 222. A metered flow rate of catalyst pellets, controlled by the operator, flows down through the transition piece 224 and through the de-dusting adapter 225, where the dust generated thus far by the handling of the catalyst pellets is removed, as discussed earlier. The de-dusted catalyst pellets proceed down the hose 226 to where the operator wants them to be deposited. Since the flow rate can be controlled by the operator, and the flow of catalyst pellets can be stopped at the bottom of the hopper 222 by the operator (either by stopping the reciprocation of the upper plate 228 or by actuating the actuator 234 for the lower, shut-off plate 232), the hose 226 need not ever be full of catalyst pellets. This makes it much easier for the operator to handle the hose 226, and a lighter weight hose can be used than is the case with the prior art arrangement shown in FIG. 41.

Device Used for Dispensing and De-Dusting Catalyst and for Fully Automatic Loading of Catalyst into a Chemical Reactor As explained in the previous section, the catalyst unloading device 220 may be used for dispensing catalyst pellets from a super sack, or from any other container, to a delivery point in the reactor vessel 10. Personnel inside the reactor vessel 10 move the lightweight hose 226 (See FIG. 42) to deposit catalyst pellets in a desired pattern to load the reactor tubes. Also, as indicated earlier, catalyst pellets may be deposited directly over the tubesheet 12, or over a plurality of loading sleeves installed in the openings of the tubes in the tubesheet 12, or over a template placed over the tubesheet 12, or over a catalyst loading device 24 (See FIG. 6A).

It should be noted that chemical reactors have many different configurations. Many chemical reactors have a very large plurality of small diameter tubes extending between the upper and lower tubesheets, as shown in FIGS. 1 and 2. Other chemical reactors have a smaller number of larger diameter tubes. Still other chemical reactors, known as fixed-bed reactors, may have no tubes at all. Instead, the entire chemical reactor vessel is filled with one or more layers of catalyst pellets. The different layers usually contain different types of catalyst, and some of the layers may be inert catalyst pellets which separate two layers of active catalyst pellets.

Loading catalyst pellets into a fixed bed reactor is different from loading catalyst pellets in a multi-tube reactor in that there is no concern about the catalyst pellets bridging in the tubes of a fixed bed reactor, since the diameter of the fixed bed reactor is many times larger than the diameter of the catalyst pellets. However, it is desirable to deposit the catalyst pellets evenly across the cross-sectional profile of the vessel so that, when one layer of catalyst pellets has been loaded and the vessel is ready for another, different layer of catalyst pellets, the depth of the bed of catalyst (the loading profile) is the same throughout the vessel. It is undesirable to have peaks, valleys, doughnuts, or skewed loading of the catalyst pellets.

Catalyst loading of fixed bed reactor vessels is often accomplished by pouring catalyst pellets onto a broadcast spreader (such as the broadcast spinner, item 68 on FIG. 5 of U.S. Pat. No. 7,695,215, Method and System for Broadcast Sediment Capping, "Buhr", dated Apr. 13, 2010, which is hereby incorporated herein by reference). For a broadcast spreader to operate correctly, it is important that the outlet of the hose feeding the spreader (and the spreader itself) be at the geometric center of the vessel and that the hose be substantially vertical (plumb). If there are any obstacles that impede the even distribution of catalyst pellets on the surface of the vessel (for example, any structural members extending vertically along the height of the vessel), it may become necessary to reverse the direction of rotation of the spreader head to ensure an even fill around the obstruction.

FIGS. 45-51 show a loading device 250 for fully automatic loading of catalyst pellets onto a chemical reactor 10. As will be explained later, this loading device 250 may be utilized in multi-tube chemical reactors as well as in fixed bed reactors.

Figure 45:
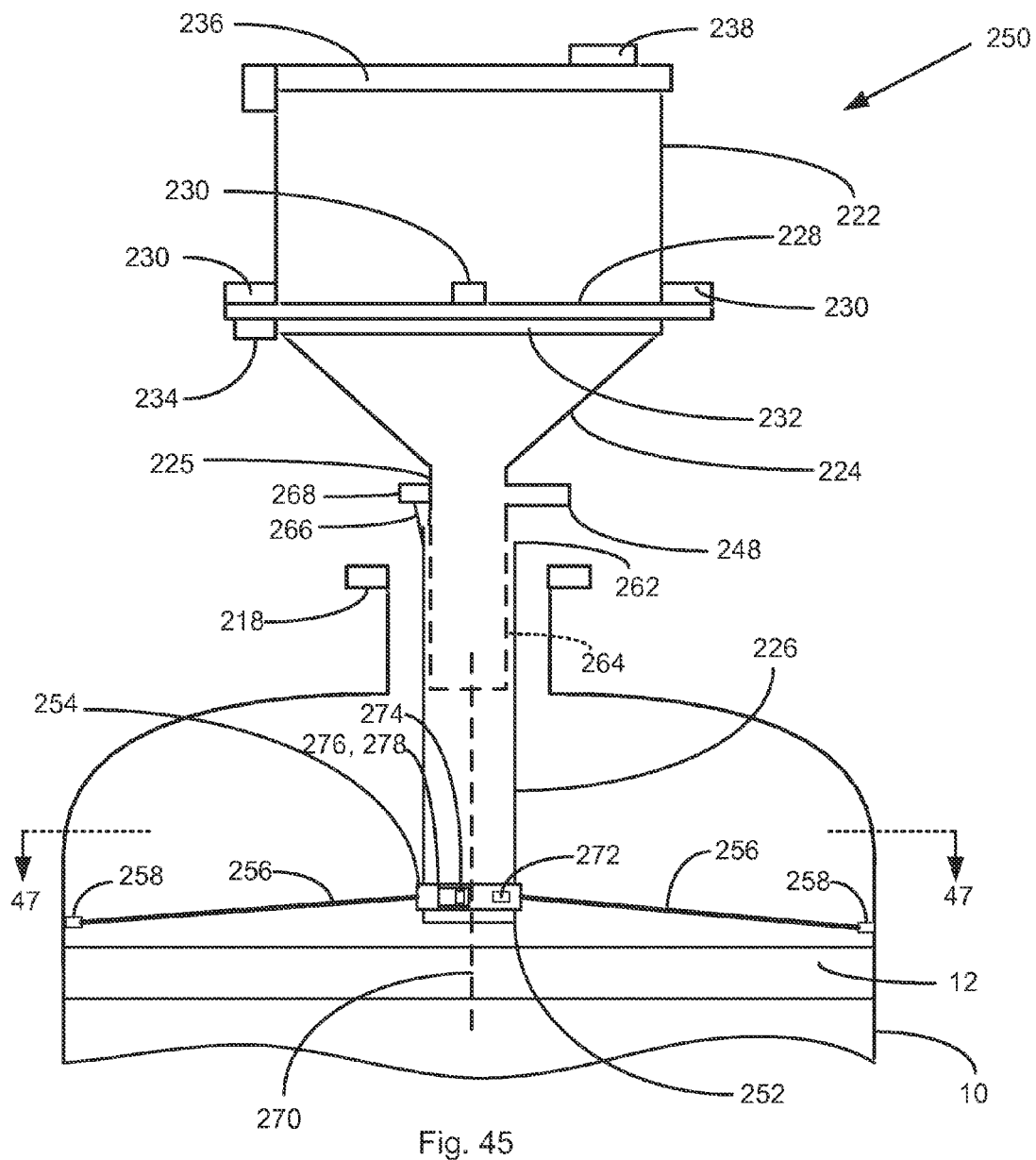
FIG. 45 is a schematic, similar to FIG. 42, but for a fully automatic arrangement for dispensing of catalyst into the reactor vessel and loading of the catalyst into the reactor tubes.

Comparing FIGS. 42 and 45 it may be appreciated that the loading device 250 of FIG. 45 includes substantially all the elements of the loading device 220 of FIG. 42, including the upper and lower reciprocating plates 228, 232 with a plurality of openings for flow control. The weather shield 240 of FIG. 42 has been omitted for clarity in FIG. 45). The main difference is that the distal end 252 of the lightweight hose 226 is now tethered to the walls of the reactor vessel 10 via a collar 254 and cords 256, as described in more detail below.

Figure 47:
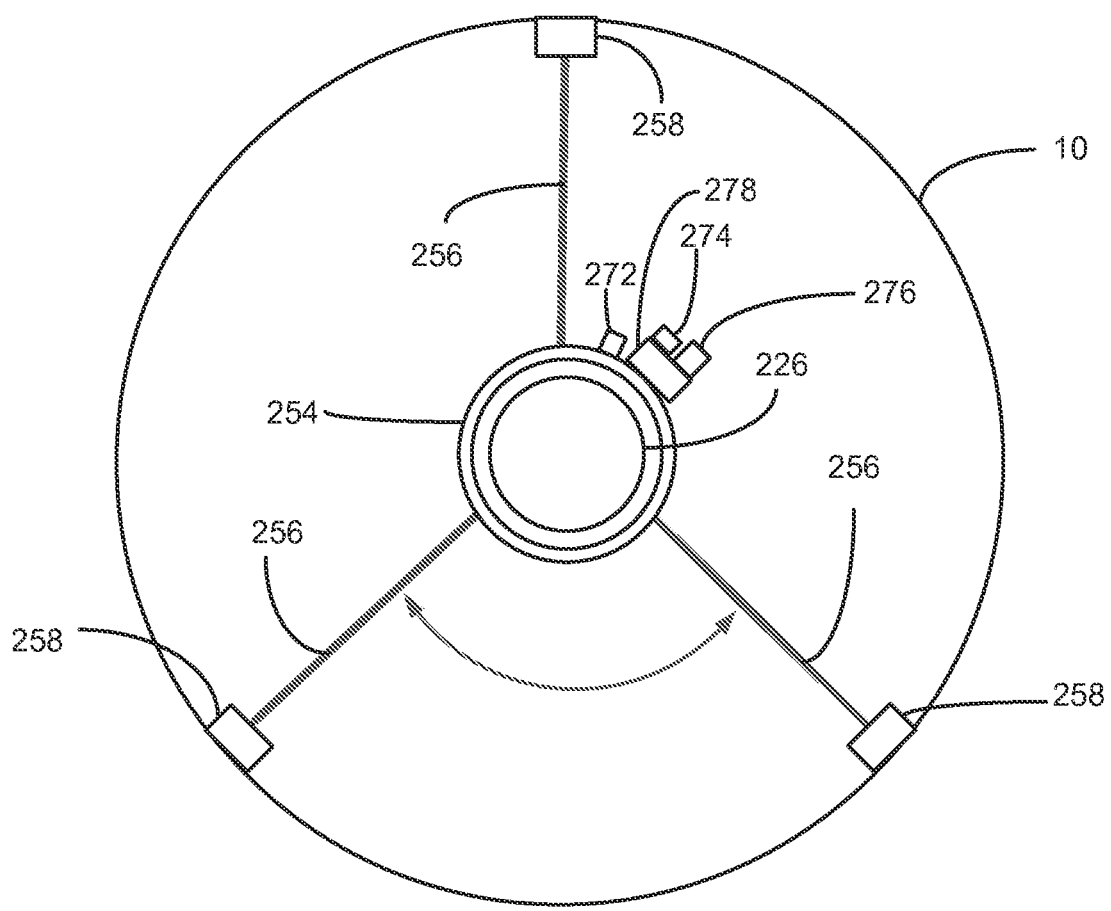
FIG. 47 is a view along line 47-47 of FIG. 45, with tube openings omitted for clarity.

Referring to FIGS. 45 and 47, a collar 254 encircles the distal end 252 of the lightweight hose 226. A plurality of cords 256 extends from the collar 254 to corresponding retracting reels 258, which are secured at or near the walls of the reactor vessel 10. In the embodiment shown in FIG. 47, three cords 256 extend from the collar 254 and are anchored at points that are equidistant from each other around the perimeter of the collar 254, with one end of each cord 256 secured to the collar 254 and the other end of each cord 256 attached to its corresponding retracting reel 258. The retracting reels 258 also are substantially equidistant from each other around the perimeter of the wall of the reactor vessel 10.

In the embodiment shown in FIGS. 45 and 47, the retracting reels 258 are secured to the wall of the reactor vessel 10. They may be secured by a permanent means, such as by a bracket welded to the inner surface of the reactor vessel 10, or they may be secured by a releasable means, such as permanent magnets or electro-magnets. The retracting reels 258 need only be mounted in some manner that fixes them relative to the tubesheet 12 of the reactor vessel 10 during the loading process. The retracting reels 258 may, for instance, be secured to the tubesheet 12 or to a device, such as the "mirror" tubesheet 20\* (See FIG. 53), which is in turn secured to the tubesheet 12, or to the wall of the reactor vessel 10.

In this embodiment, the retracting reels 258 are "powered reels", and each retracting reel 258 includes an encoder which is in communication with a controller to enable the controller (not shown) not only to determine the location of the distal end 252 of the lightweight hose 226 relative to the tubesheet 12, but also to actively guide the distal end 252 of the lightweight hose 226 along a programmed path or track 260 (See FIG. 49) by powering the appropriate reel 258 to cause that reel 258 to retract or extend its corresponding cord 256.

Even though the cords 256 may attach directly to the lightweight hose 226, preferably in an area adjacent the distal end 252 of the lightweight hose 226, it is preferred for the cords 256 to attach to a collar 254. The collar 254 is able to rotate about the longitudinal axis 270 (See FIG. 45) of the lightweight hose 226. The collar 254 may be described as resembling a ball bearing with the inner race of the bearing secured at or near the distal end 252 of the lightweight hose 226. The cords 256 are secured to the outer race of the bearing. Also mounted to the outer race of the bearing (See FIGS. 45 and 47) are a level 272, an inclinometer 274, and a distance measuring device 276, such as a laser or a LIDAR, mounted on a gimbal arrangement 278 which allows the distance measuring device 276 to be accurately aimed as desired (as explained in more detail later). LIDAR is an acronym for Light Detection and Ranging, an optical remote sensing technology that can measure the distance to a target, often using pulses from a laser.

In this embodiment, the level 272, the inclinometer 274, the distance measuring device 276, and the gimbal arrangement 278 are electronic devices which communicate with a remotely-located controller. Their measurement outputs may be remotely accessed and used as feedback to control the actuator reels 258 and to generate a map of the loading profile, as explained later.

Figure 46:
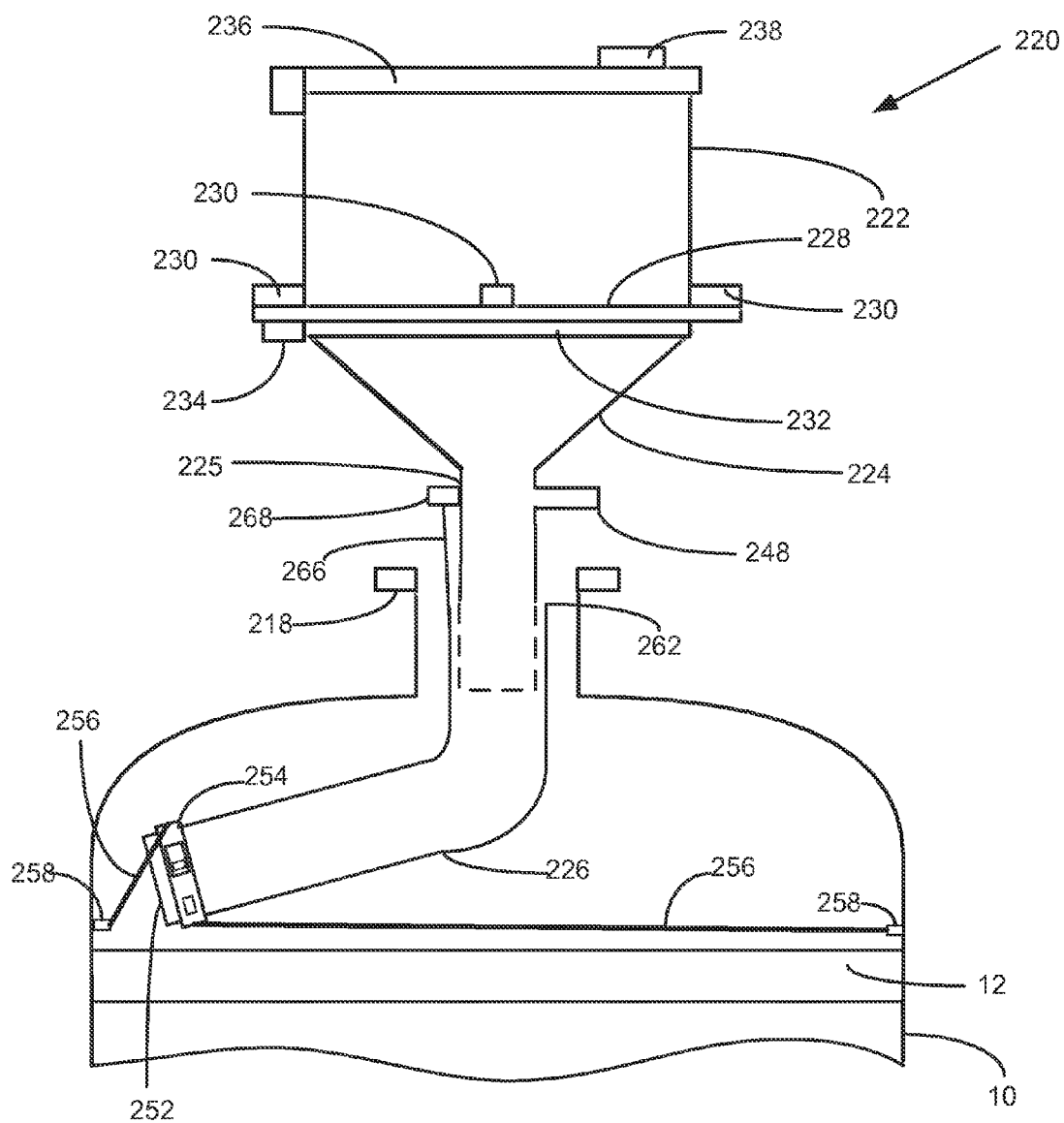
FIG. 46 is a schematic, similar to FIG. 45, but with the discharge hose of the device in a fully extended position.

Referring back to FIG. 45, the lightweight hose 226 is allowed to telescope up and down over a truncated section of heavier hose or cylinder 264 (shown in phantom). A cord 266 attaches the proximal end 262 of the lightweight hose 226 to a retracting reel 268 secured to the heavier hose 264 (as shown in FIG. 45) or to any other structure which is substantially fixed relative to the tubesheet 12. It should be noted that this retracting reel 268 and corresponding cord 266 may be replaced, in some embodiments, by a simple spring (not shown) which allows the lightweight hose 226 to be pulled down (against the spring) as required to reach toward the perimeter of the tubesheet 12, as shown in FIG. 46, but which automatically, telescopically retracts the lightweight hose 226 upwardly, over the heavier hose 264 in order to take up the extra length of the lightweight hose 226 when this extra length is not required (as shown in FIG. 45).

Figure 48:
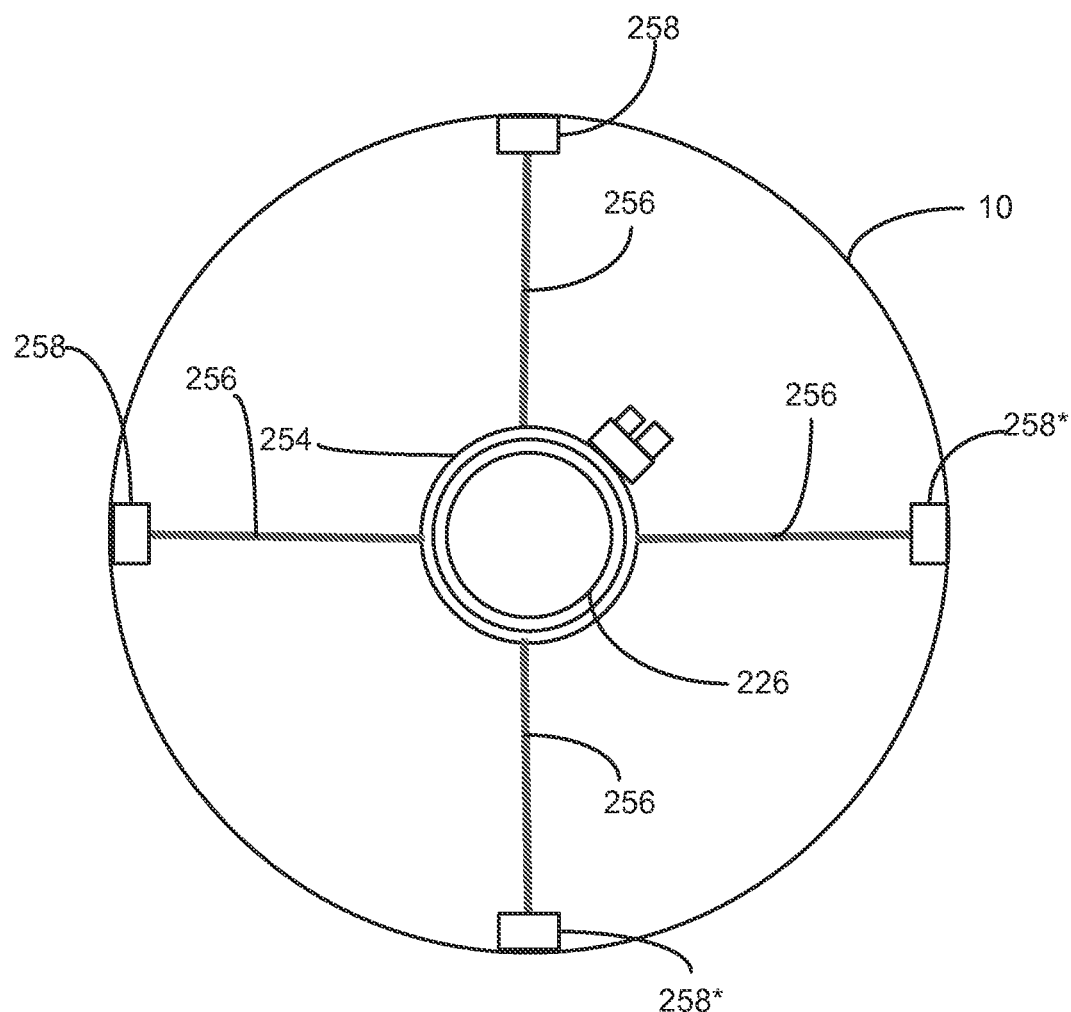
FIG. 48 is a view similar to FIG. 47, but for a different arrangement for a cord retracting mechanism.
Figure 49:
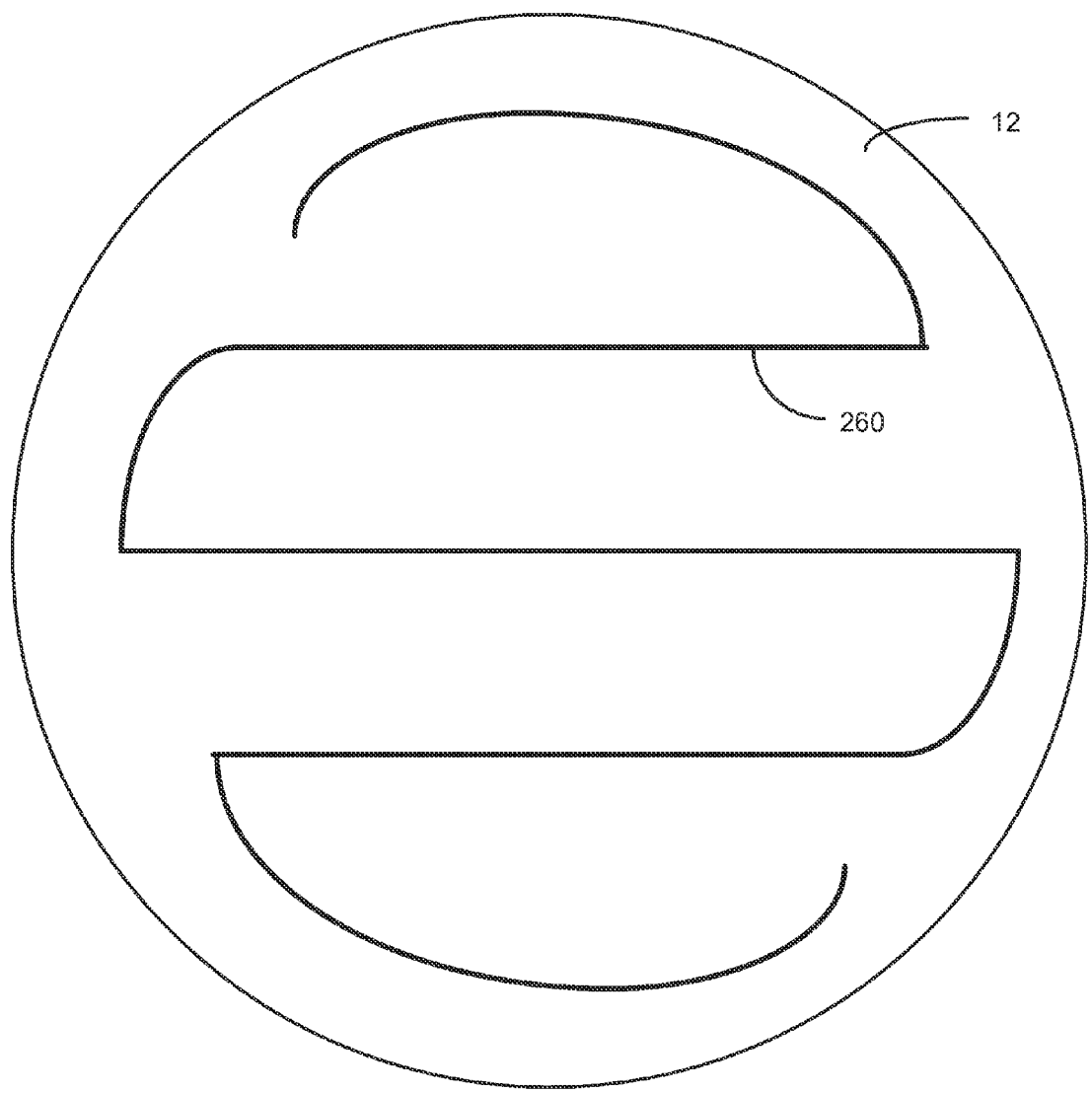
FIG. 49 is schematic plan view of the tubesheet of FIG. 47 showing one possible tracking pattern for the lightweight hose as it distributes catalyst pellets onto the surface of the tubesheet.

FIG. 48 shows a slightly different arrangement for moving the distal end 252 of the lightweight hose 226. It uses four equidistant retracting reels 258, 258\* instead of the three retracting reels 258 shown in FIG. 47. In this instance, two of the retracting reels 258\* may be replaced by springs, if desired, which exert a biasing force that pulls the distal end 252 of the lightweight hose 226 toward the position on the wall where the respective spring 258\* is mounted. It should be noted that the arrangement may include any number of retracting reels 258 or springs 258\* to ensure that the distal end 252 of the lightweight hose 226 follows the desired track 260 (See FIG. 49).

The track 260 may be pre-programmed into a controller, not shown, so that the controller can ensure that the distal end 252 of the lightweight hose 226 follows this track 260 based on inputs the controller receives from encoders in the retracting reels 258. It should be noted that the controller may receive other inputs in order to ascertain the position of the distal end 252 of the lightweight hose 226 and may use these inputs to extend or retract the encoded retracting reels 258 in order to move the distal end 252 of the lightweight hose 226 along the desired track 260. For instance, a laser may be used to determine the distance between the distal end 252 of the lightweight hose 226 and fixed points on the tubesheet 12 (or mirror tubesheet), and this information can then be used to actuate the retracting reels 258 in order to move the distal end 252 of the lightweight hose 226 along the desired track 260.

Figure 50:
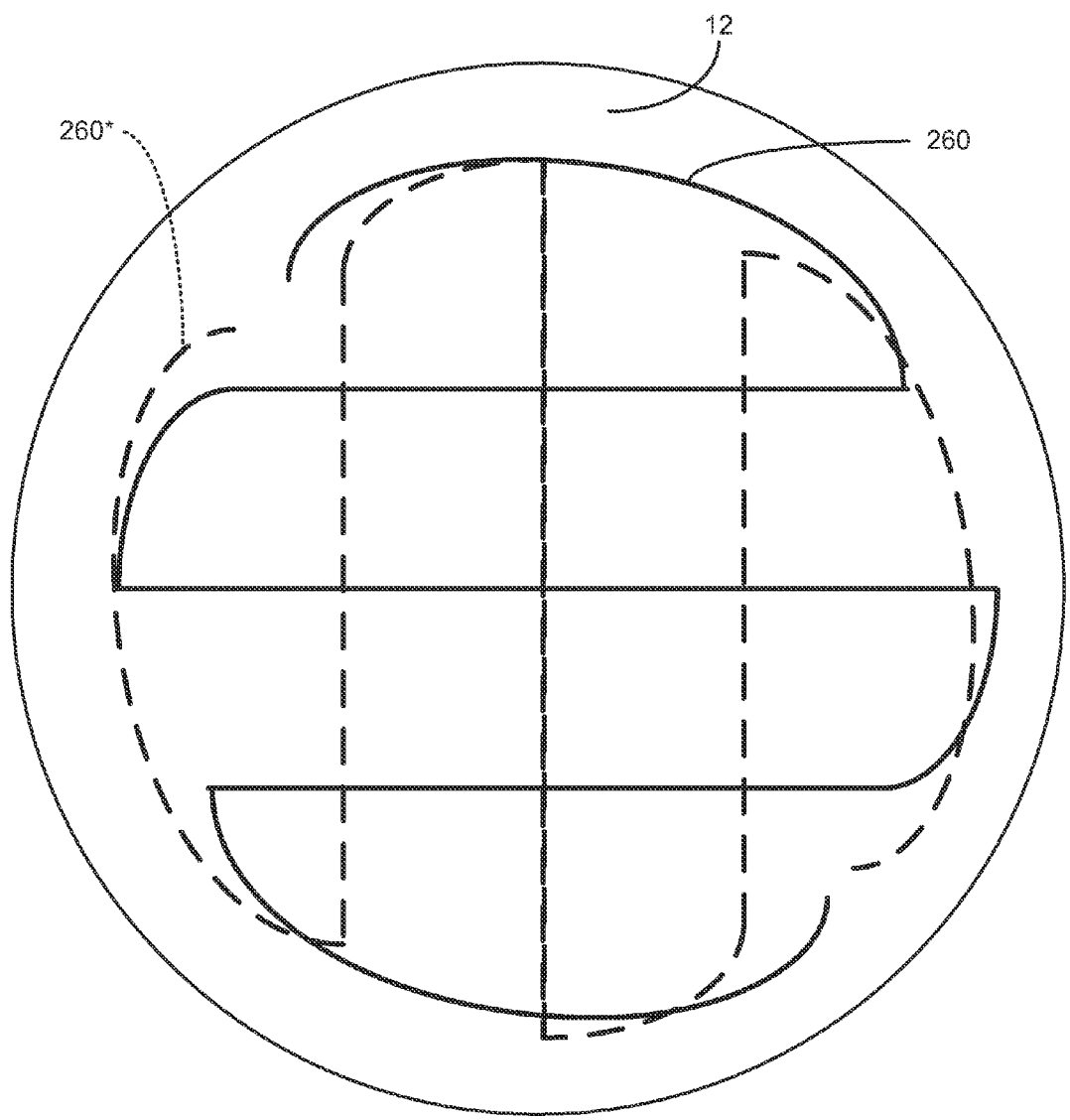
FIG. 50 is a view similar to FIG. 49, but showing in phantom an additional tracking pattern to provide a substantially uninterrupted flow of catalyst pellets onto the surface of the tubesheet.

FIG. 50 shows a different path which may be followed by the distal end 252 of the lightweight hose 226. It includes the original path 260 of FIG. 49, and it adds a second path 260\* which complements the original path 260 and allows uninterrupted deposition of catalyst pellets on the tubesheet 12. The combined paths 260, 260\* may be repeated seamlessly until all the tubes in the reactor vessel 10 have been loaded with catalyst pellets.

To operate the loading device 250 in a conventional chemical reactor 10 having a plurality of reactor tubes 16 which are to be loaded with catalyst pellets, the catalyst pellets are first unloaded from a super sack (or other container) into the hopper 222, and from there the catalyst pellets are evenly unloaded from the bottom of the hopper 222 and through a de-dusting arrangement using the mechanism 220 described earlier with respect to FIG. 42. The unloading of the catalyst pellets from the bottom of the hopper 222 is controlled by controlling the frequency of reciprocation of the of the plate 228, which regulates the flow of catalyst pellets by regulating the frequency with which the bridges impeding the flow of catalyst pellets are broken, as was discussed earlier.

In a preferred method of operation, the flow of catalyst pellets is controlled so as to obtain a star flow as opposed to a flooded flow (or plug flow) which is characterized by the hose 226 being packed or filled with catalyst pellets which abut each other, as explained earlier. Since there are far fewer catalyst pellets at any given time within the hose 226 using the star flow, the total weight of the hose 226 and of the catalyst pellets flowing through the hose 226 is much less than with flooded flow, making it much easier to move the distal end 252 of the hose 226 around within the reactor 10.

Referring now to FIG. 46, the distal end 252 of the hose 226 is moved along a path 260 (See FIG. 49) over the tubesheet 12 in order to deposit catalyst pellets.

In one embodiment, the tubesheet 12 is covered by a mirror tubesheet 20\* (as described earlier) that duplicates the tubesheet 12 itself in terms of the location of the openings of the reactor tubes 16. The reactor tubes 16 may be loaded with catalyst pellets by using this mirror tubesheet 20\* as a pristine starting surface, uninterrupted by any irregularities on the tubesheet 12. The loading device 24 (See FIG. 6A) may be placed directly over the mirror tubesheet 20\* for loading catalyst pellets into the reactor tubes 16, or loading sleeves 22 may be installed in the openings 34 of the mirror tubesheet 20\* with the loading device 24 placed over these loading sleeves 22.

The loading device 24 automatically loads the reactor tubes with catalyst pellets. If the loading sleeves are, for instance, of the type described on FIGS. 39- 41 of U.S. Pat. No. 7,836, 919, Device for Loading Chemical Reactor Tubes, Johns, dated Nov. 23, 2010, which is hereby incorporated herein by reference, then the loading sleeves can be removed from the mirror tubesheet 20\* once the catalyst pellet loading of the tubes is complete. The outage level (the empty space within the reactor tube above the catalyst) will be within the specified range and the catalyst pellet loading of the reactor vessel 10 will be complete.

The catalyst pellets will have been uniformly emptied from the hopper 222, de-dusted in the process of being transferred to the tubesheet 12, and evenly deposited over the tubesheet 12 (or over the mirror tubesheet 20\*) following a pre-programmed path 260. The catalyst pellets will have been "metered" into each reactor tube using the loading device 24 of FIG. 6A, preferably feeding through a template 20 or through loading sleeves 22, ensuring that no undesirable bridging occurs in the reactor tubes in the loading process.

Once the loading of the reactor tubes is complete, the template 20 or the loading sleeves 22 are removed. (It may be desirable to vacuum any excess catalyst pellets lying on top of the template 20, or on top of the loading sleeves 22, or on top of the mirror tubesheet 20\*). The tubes in the reactor vessel 10 may then be back-pressure tested. It should be noted that the back-pressure testing can be accomplished using the mirror tubesheet 20\*. In fact, it may be desirable to leave the mirror tubesheet 20\* in the reactor vessel 10 even during normal operation of the reactor, never having to be removed other than in exceptional circumstances when work needs to be done on the tubesheet 12 itself. Even then, it may be possible to simply move a portion of the mirror tubesheet 20\* out of the way, without having to physically remove the mirror tubesheet 20\* from the top dome 13 (See FIG. 1) of the reactor vessel 10.

Fixed-Bed Reactor Loading

Figure 51A:
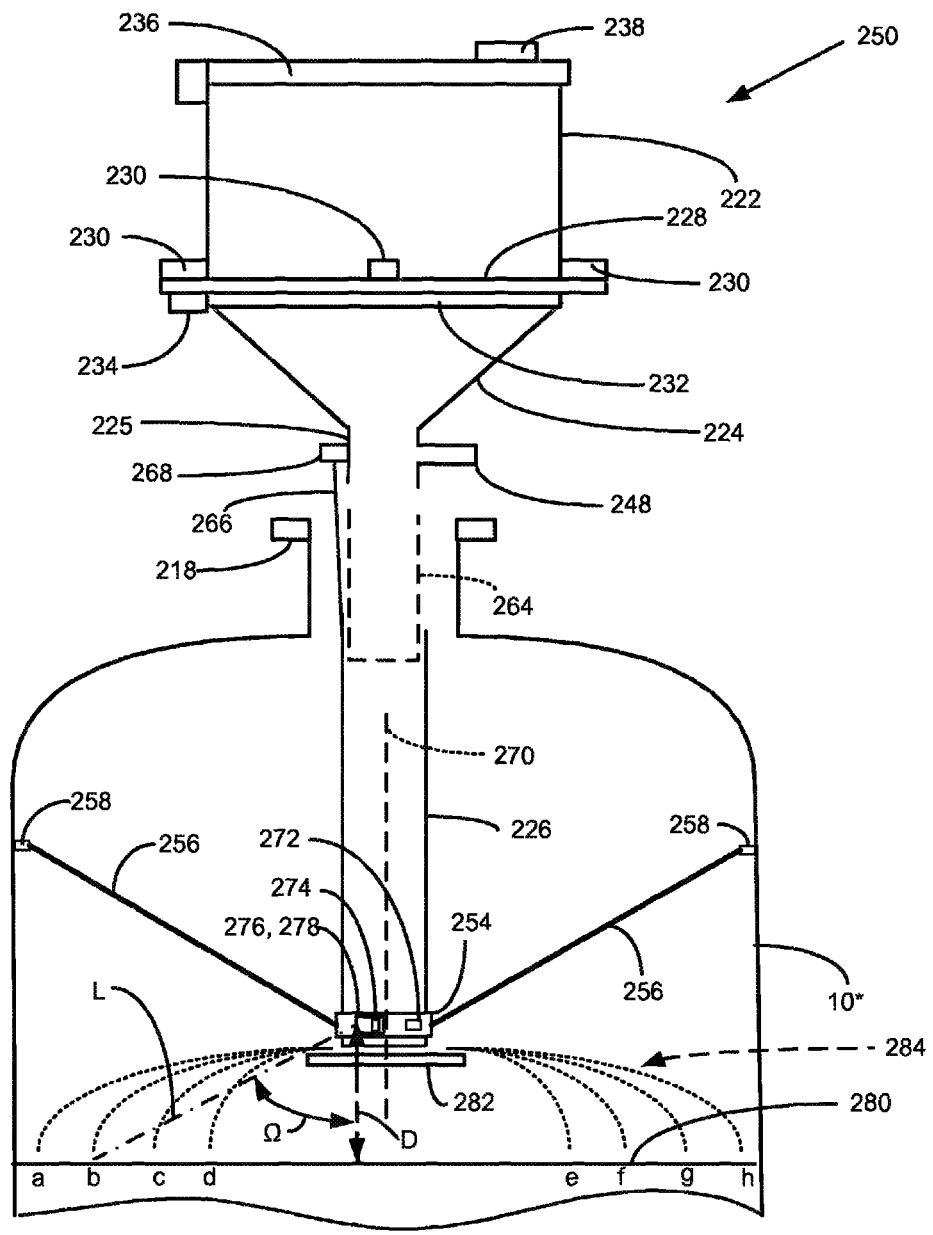
FIG. 51A is a schematic similar to FIG. 45, showing the loading device being used to load catalyst into a fixed bed reactor.

FIGS. 51A-C, 52, and 54 show the loading device 250 of FIG. 45 being used for loading a fixed-bed reactor 10\*. Referring to FIG. 51A, the fixed-bed reactor 10\* is a substantially empty vessel which, in this view, is partially loaded with catalyst pellets to the level indicated by the line 280. As discussed earlier, a broadcast spreader 282 is suspended at the geometric center of the fixed-bed reactor 10\*, for rotation about the longitudinal axis 270 of the catalyst pellet delivery hose 226.

Catalyst pellets are delivered to the broadcast spreader 282 via the hose 226, creating a star flow, and are then evenly broadcast, as denoted by the dotted lines 284, over the cross-sectional area of the fixed-bed reactor 10\*. In order to ensure an even loading profile of the catalyst pellets in the fixed-bed reactor 10\* it is important that the broadcast spreader 282 and the hose 226 be substantially in the geometric center of the fixed-bed reactor vessel 10\* and that the broadcast spreader 282 is substantially horizontally aligned. Since, in this embodiment, the broadcast spreader 282 is horizontally suspended from the hose 226, it is important that the hose 226 be substantially vertically aligned (that is, the longitudinal axis 270 of the hose 226 should be substantially plumb).

The level 272, mounted on the collar 254 of the hose 226, may be used to ascertain that the broadcast spreader 282 is substantially horizontally aligned. An electronic output from the level 272 is used by the controller (not shown) to actuate the retractable reels 258 in order to extend or retract their respective cords 256 until the level 272 indicates that the broadcast spreader 282 is substantially level (horizontally aligned).

A distance measuring device 276 mounted on a gimbal arrangement 278 is used to provide an indication of the loading profile 280 of the catalyst pellets in the reactor vessel 10\*. The distance measuring device 276 takes a distance reading to each of the points a, b, c, d, e, f, g, h. An inclinometer 274, also mounted on the gimbal arrangement 278, provides an electronic indication of how far the conduit 226 is off of plumb. This information is corrected with the reading from the level 272, as explained later. The controller, given the distance reading for each point a, b, c, d, e, f, g, h as indicated by the distance measuring device 276 (such as a laser beam) and the angle off of plumb as indicated by the inclinometer 274, can then calculate the loading profile 280 across the entire cross-sectional profile of the vessel 10\*. (Namely, the vertical component of the distance "D" from the positioning device 276 to the measured point is equal to the measured length "L" as indicated by the positioning device 276 times the cosine of the angle $\Omega$ as measured by the inclinometer 274).

Note that the feed of catalyst pellets may be momentarily halted before the distance measurements "L" at each of the plurality of points a, b, c, d, e, f, g, h are taken to ensure that the laser beam (or LIDAR) does not mistakenly measure the distance to a falling catalyst pellet during a measurement, thus giving an erroneous distance "L" reading. However, the readings may be taken "on the fly", without halting the feed of catalyst pellets, by incorporating an algorithm to ensure that the laser beam (or LIDAR) is not measuring the distance to a falling catalyst pellet. For example, a series of distance measurements may be taken over a very small time interval (for example, three measurements within a one second interval) and the measurements are then compared to ensure that they all match within a very small range (for instance, within the size of one or two catalyst pellets). If one or more of the measurements were taken off of a falling catalyst pellet, then the measurements will show a much larger variance than the specified range. The readings will then be deemed suspect and an additional set of readings will be taken for the point in question.

Also note that, for clarity, only one set of level 272, inclinometer 274, positioning device 276, and gimbal arrangement 278 is shown in the figures. However, it may be desirable to provide more than one set, preferably evenly spaced along the perimeter of the collar 254 in order to generate a more accurate map of the loading profile of the vessel 10\*, such as the readings in the x, y, and z directions shown in the upper set of measurements of the map 286 of FIG. 54.

Figure 51B:
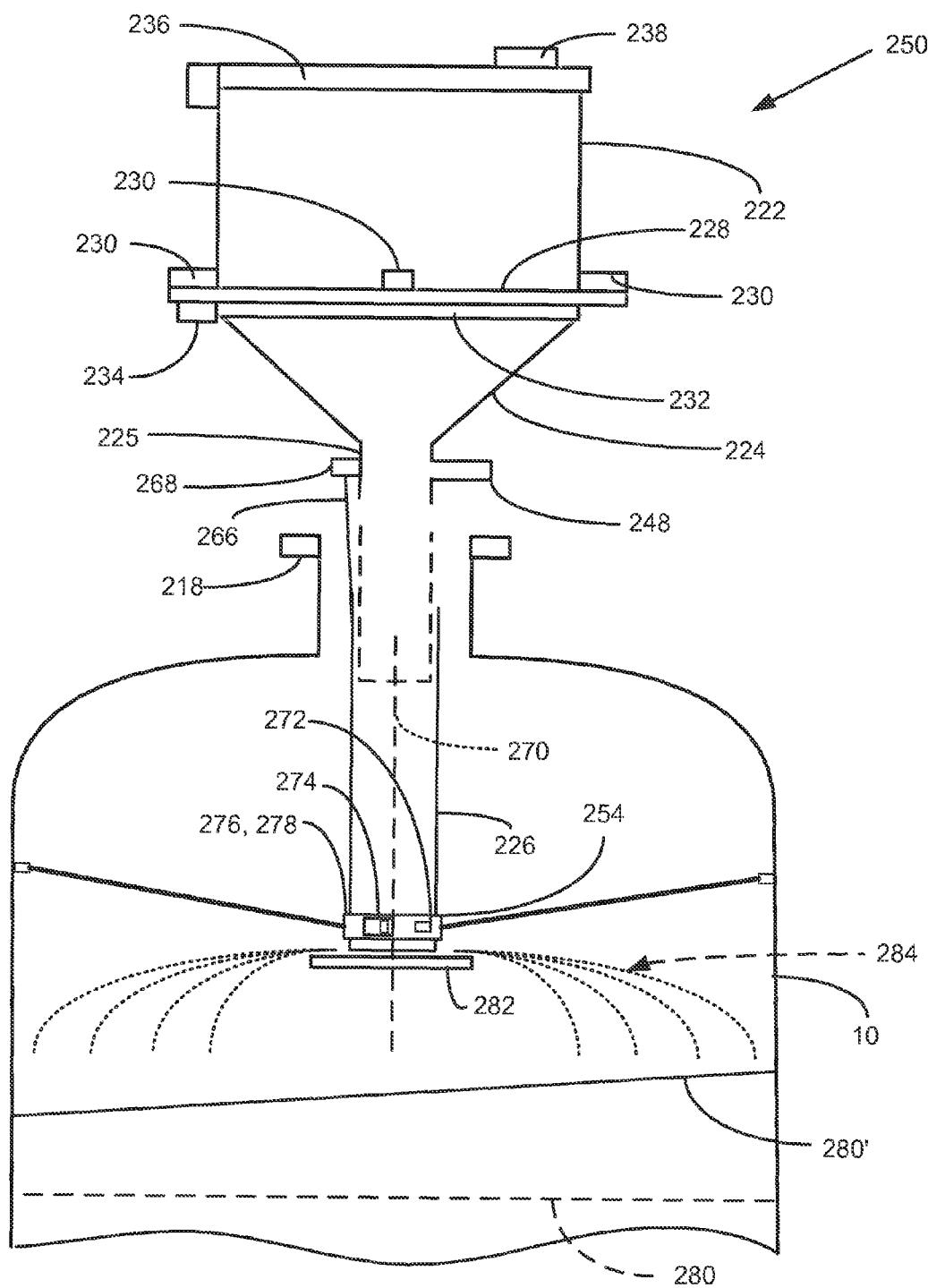
FIG. 51B is a schematic similar to FIG. 51A, showing a first, horizontal catalyst bed level in phantom and a second catalyst bed level in solid showing an undesirable skewed condition.
Figure 51C:
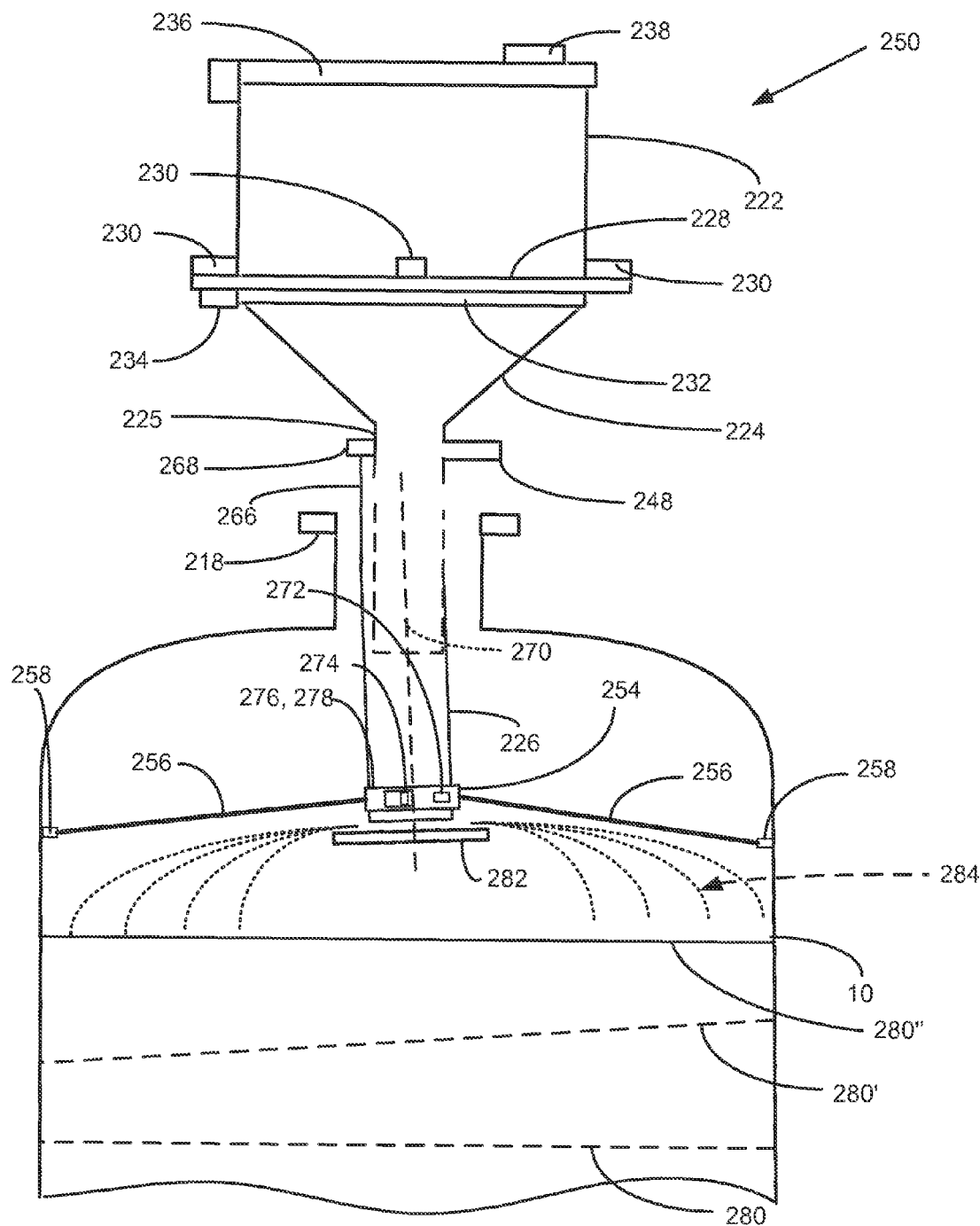
FIG. 51C is a schematic similar to FIG. 51B, showing a first horizontal catalyst bed level in phantom, a second level, also in phantom, in an undesirable skewed condition, and a third catalyst bed level in a corrected horizontal level achieved via a correction of the operating parameters.

FIG. 51B shows the reactor vessel 10\* of FIG. 51A but at a later point in time, when more catalyst pellets have been loaded into the vessel 10\*. The new loading profile 280' is shown to be undesirably skewed so it is at a higher elevation on the right than on the left. To correct this undesirable condition, the broadcast spreader 282 may be tilted, as shown in FIG. 51C, to bring the loading profile 280" back to horizontal. (Note that this is only given as an example. It may be necessary to tilt the broadcast spreader 282 in a different direction, or to take some other corrective action, to correct this particular undesirable condition).

Figure 54:
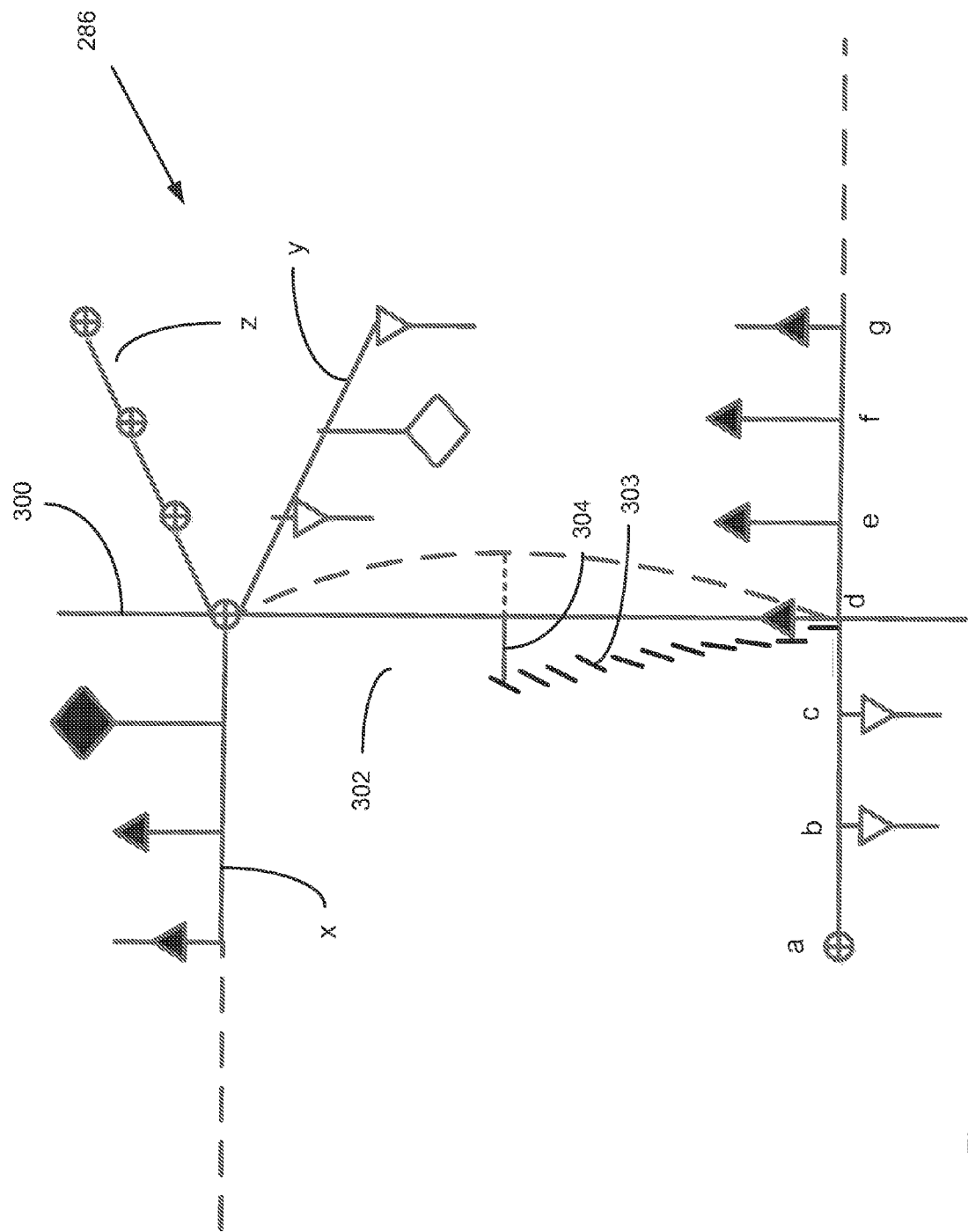
FIG. 54 is a schematic of a display which maps the loading profile of the fixed reactor bed of FIGS. 51A-51C using the symbols shown in FIG. 52.

FIG. 54 shows a loading profile map 286 which may be generated to provide a graphical display of the loading profile of the vessel 10\* at several stages of catalyst loading. The map 286 shows the results from only two points in time but the map could be generated to show the loading profile at any one or more points in time.

Figure 52:
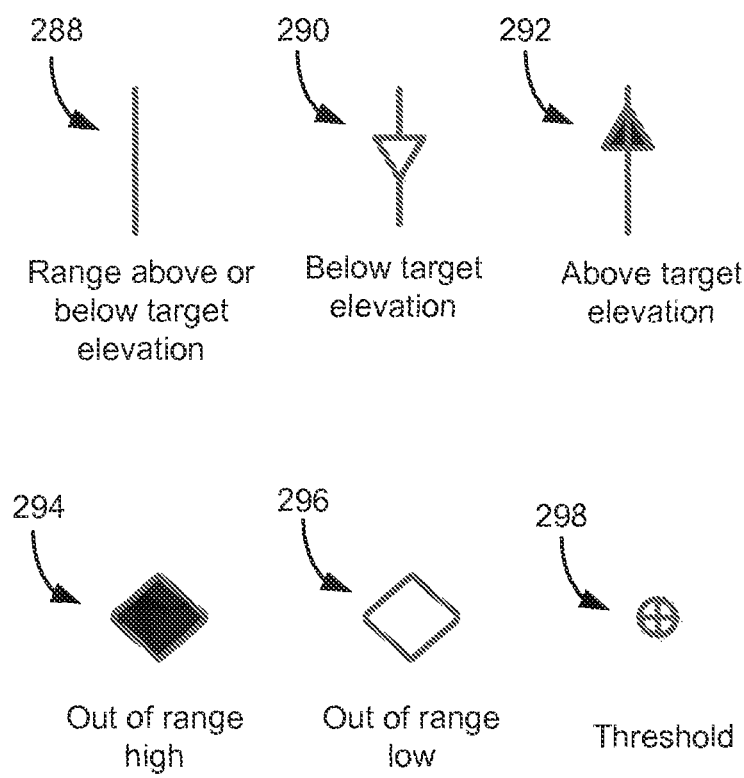
FIG. 52 is an illustration of various symbols which may be used when mapping the catalyst bed level in the fixed bed reactor of FIGS. 51A-51C.

FIG. 52 provides the key for the symbols used in the map 286 of FIG. 54. The vertical line 288 is an indication of the range allowed within the specification. For instance, the specification may allow the height to vary ¾" above or below the target elevation before the measurement is considered to be out of spec. The vertical line with a clear triangle pointing down 290 indicates that the measurement at the point taken is below the target elevation but still within the range allowed by the specification. The location of the tip of the arrow relative to the line provides a quantitative indication of the extent to which the measurement is below the target elevation within the allowable range. In this instance the reading is low by approximately 60% of the allowable range. The vertical line with a solid triangle pointing up 292 indicates that the measurement is above the target elevation but still within the allowable range. In this instance the reading is high by approximately 80% of the allowable range. The solid diamond shaped symbol 294 indicates the measurement is high and outside of the allowable range. The clear diamond shaped symbol 296 indicates the measurement is low and outside of the allowable range. Finally, the cross-hatched circle 298 indicates that the measurement is substantially at the target elevation (at the threshold of the target elevation).

Referring again to FIG. 54, the map 286 shows the measurements taken at two different points in time, when the pellet level is at two different elevations. At the lower elevation, the measurement at point "a" is at the specification elevation, at points "b" and "c" the measurements are below the target elevation at approximately 50% of the allowable range, at points "d" and "g" the measurements are above the target elevation at approximately 50% of the allowable range, and at points "e" and "f" the measurements are above the target elevation at approximately 100% of the allowable range.

The line 300 represents the centerline of the vessel 10\*. The dotted line 302 represents the actual centerline of the broadcast spreader 282, and the individual, sloped, line segments 303 represent the degree to which the axis of the broadcast spreader 282 is tilted relative to plumb (Note that these line segments 303 are not shown all the way up to the upper elevation measurement. The line segments 303 in the upper portion are omitted for clarity so that the dotted line 302 representing the actual centerline of the broadcast spreader 282 can be readily visible). It should be obvious that the broadcast spreader 282 can be moved off-center while remaining horizontal, or it can remain in the geometric center of the vessel 10* while being tilted, or it can both be moved off of the geometric center of the vessel 10* and it can be tilted in any direction about its axis of rotation in order to address any irregularity in the loading profile of the vessel 10*. The line 304 is a visual indication of the centerline correction or offset of the centerline of the broadcast spreader 282 relative to the centerline of the vessel 10*.

The centerline offset 304 of the broadcast spreader 282 is caused by the extension or retraction of the cords 256 by their respective retraction reels 258, which is controlled by the controller. The broadcast spreader 282 is internally supported for rotation by the hose 226. A similar extension and retraction mechanism can be used to tilt the shaft which rotationally supports the broadcast spreader 282 in order to cause the desired degree of tilt of the broadcast spreader 282, or the hose 226 may be tilted, as shown in FIG. 51C, for a similar effect. In the event that the hose 226 is tilted, the level 272 provides an indication of the degree of tilt of the hose 226.

In order to load the vessel 10* of a fixed-bed reactor with catalyst pellets, the procedure is similar to that discussed earlier with respect to loading reactor tubes in the vessel 10 (See FIG. 45), except that, in this instance, there are no reactor tubes to load so there is no template and no loading sleeves. The reactor is set up initially as shown in FIG. 51A, with the broadcast spreader 282 in the geometric center of the vessel 10*. The broadcast spreader 282 is started rotating and the catalyst pellets are started dropping from the hopper 222 through the loading device 220, as discussed with respect to FIG. 42, to establish a star-field flow of de-dusted catalyst pellets descending onto the broadcast spreader 282.

Several parameters can be adjusted in the arrangement shown in FIG. 51A in order to establish the desired loading profile 280 in the vessel 10*. These parameters include the rotational speed and direction of the broadcast spreader 282, the height of the broadcast spreader 282 above the loading profile 280, the degree of offset 304 (See FIG. 54) of the centerline 302 of the broadcast spreader 282 relative to the centerline 300 of the vessel 10*, and the degree of tilt 303 of the broadcast spreader 282 relative to vertical.

Referring to FIG. 51B, as the loading progresses, it may become apparent that the loading profile 280' is skewed or otherwise does not conform to the desired loading profile (which typically will be a flat and smooth loading profile across the entire cross-section of the vessel 10*). The continuous readings of the height of the catalyst pellets at a plurality of points along the loading profile 280' are displayed in a map 286 (See FIG. 54) so that the operator can immediately see the loading profile at any elevation. The operator can also see the trend of the loading profile as he changes some (or all) of the parameters so he can determine whether the changes he has made are correcting the loading profile anomaly or exacerbating the condition.

As shown in FIG. 51C, the correction initiated by the operator, which in this instance included tilting the broadcast spreader 282, corrected the loading profile 280" back to a desirable flat and unskewed condition. It should be noted that the controller may be programmed to actuate the retracting reel 268 so as to maintain a constant height of the broadcast spreader 282 above the loading profile of the catalyst pellets in the vessel 10*. Of course, this condition can be over-ridden by the operator if he deems it necessary to correct an anomalous loading condition.

As the operator becomes more proficient with the use of the loading device 250, and with the aid of the map 286 of FIG. 54, he will be able to look at the trend of the loading profile and he will know what corrections or changes to make to the operating parameters to anticipate any problems and maintain a desirable loading profile.

It also should be noted that, while the use of upper and lower plates with openings is preferred, any of the methods of breaking up bridges above an opening that have been described herein with respect to bridges above the openings into the reactor tubes may be used to create the star flow from the large hopper into the large diameter conduit, to meter the flow of catalyst pellets through the plurality of openings and into the large diameter conduit by allowing bridges to form and then repeatedly breaking up the bridges in a controlled manner.

It will be obvious to those skilled in the art that modifications may be made to the embodiments described above without departing from the scope of the present invention as claimed.

What is claimed is:

1. A method for dispensing catalyst pellets to a chemical reactor, comprising the steps of:
   providing a hopper for holding a plurality of catalyst pellets at an elevation above the chemical reactor;
   loading a plurality of catalyst pellets into the hopper;
   providing a large diameter open conduit through which the catalyst pellets pass in order to flow from the hopper to the chemical reactor, with the diameter of the conduit being at least eight times the largest dimension of the catalyst pellets;
   providing a sieve between the hopper and the conduit defining a plurality of openings that are small enough relative to the size of the catalyst pellets so that the catalyst pellets form bridges above the sieve; and
   repeatedly breaking the bridges to allow the catalyst pellets to flow through the openings in a controlled manner to form a flow in which the catalyst pellets are separated from each other in a homogeneous manner and have minimal or no contact with each other as they fall through the open conduit.

2. A method for dispensing catalyst pellets to a chemical reactor as recited in claim 1, wherein a cross-section taken through the conduit as the catalyst pellets are flowing through the conduit has 26% or less of the cross-sectional area occupied by catalyst pellets.

3. A method for dispensing catalyst pellets to a chemical reactor as recited in claim 2, wherein the sieve comprises upper and lower plates, with the upper plate lying on top of the lower plate, wherein said upper plate defines a plurality of upper openings and the lower plate defines a plurality of lower openings which can be aligned with respective upper openings, wherein, when the upper and lower plates are stationary, with the upper and lower openings aligned, the upper and lower openings together form the plurality of openings that are small enough relative to the size of the catalyst pellets so that the catalyst pellets form bridges above the openings; and wherein the step of breaking up the bridges includes moving at least one of the upper and lower plates parallel to the other of the upper and lower plates, thereby breaking up the bridges of catalyst pellets above the upper openings and further including the step of allowing the catalyst pellets to flow through the aligned upper and lower openings and then into and through the conduit.

4. A method for dispensing catalyst pellets to a chemical reactor as recited in claim 2, and further comprising the step of vacuuming a stream of gas out of the side of the conduit as the catalyst pellets flow through the conduit to remove dust from the catalyst pellets.

5. A method for dispensing catalyst pellets to a chemical reactor as recited in claim 3, and further comprising the step of moving at least one of the upper and lower plates parallel to the other of the upper and lower plates so that the upper and lower openings are out of alignment with each other, thereby preventing the flow of catalyst pellets from the hopper to the conduit.

6. A method for dispensing catalyst pellets to a chemical reactor as recited in claim 5, and further comprising the steps of providing a cover on top of the hopper and opening the cover to load catalyst pellets into the hopper.

7. A method for dispensing catalyst pellets to a chemical reactor as recited in claim 6, and further comprising the step of vacuuming a stream of gas out of the side of the conduit as the catalyst pellets flow through the conduit to remove dust from the catalyst pellets.

8. A method for dispensing catalyst pellets to a chemical reactor as recited in claim 5, wherein said upper and lower plates are planar plates, oriented horizontally.

9. A method for dispensing catalyst pellets to a chemical reactor as recited in claim 7, wherein said upper and lower plates are planar plates, oriented horizontally.

10. A method for dispensing catalyst pellets to a chemical reactor as recited in claim 1, wherein the conduit has a first end adjacent to the hopper and a second end at a lower elevation than the first end, and further comprising the step of automatically controlling the movement of the second end of the conduit inside the reactor vessel along a desired path in order to provide uniform loading.

11. A method for dispensing catalyst pellets to a chemical reactor as recited in claim 9, wherein the conduit has a first end adjacent to the hopper and a second end at a lower elevation than the first end, and further comprising the step of automatically controlling the movement of the second end of the conduit inside the reactor vessel along a desired path in order to provide uniform loading.

12. A method for dispensing catalyst pellets to a chemical reactor as recited in claim 1, wherein a maximum flow rate is defined as the maximum number of catalyst pellets that can pass through the conduit per unit of time, and wherein the flow rate of catalyst pellets as the catalyst pellets are flowing through the conduit is not greater than half of the maximum flow rate.

13. A method for dispensing catalyst pellets to a chemical reactor as recited in claim 12, wherein the sieve includes upper and lower plates, with the upper plate lying on top of the lower plate, said upper and lower plates being located between the hopper and the conduit, wherein said upper plate defines a plurality of upper openings and the lower plate defines a plurality of lower openings which can be aligned with respective upper openings, wherein, when the upper and lower plates are stationary, with the upper and lower openings aligned, the upper and lower openings together form the plurality of openings that are small enough relative to the size of the catalyst pellets so that the catalyst pellets form bridges above the openings; and wherein the step of breaking up the bridges includes moving at least one of the upper and lower plates parallel to the other of the upper and lower plates, and further comprising the step of allowing the catalyst pellets to flow through the aligned upper and lower openings and then into and through the conduit.

14. A method for dispensing catalyst pellets to a chemical reactor as recited in claim 12, and further comprising the step of vacuuming a stream of gas out of the side of the conduit as the catalyst pellets flow through the conduit to remove dust from the catalyst pellets.

15. A method for dispensing catalyst pellets to a chemical reactor as recited in claim 13, and further comprising the step of moving at least one of the upper and lower plates parallel to the other of the upper and lower plates so that the upper and lower openings are out of alignment with each other, thereby preventing the flow of catalyst pellets from the hopper to the conduit.

16. A method for dispensing catalyst pellets to a chemical reactor as recited in claim 15, and further comprising the steps of providing a cover on top of the hopper and opening the cover to load catalyst pellets into the hopper.

17. A method for dispensing catalyst pellets to a chemical reactor as recited in claim 16, and further comprising the step of vacuuming a stream of gas out of the side of the conduit as the catalyst pellets flow through the conduit to remove dust from the catalyst pellets.

18. A method for dispensing catalyst pellets to a chemical reactor as recited in claim 15, wherein said upper and lower plates are planar plates, oriented horizontally.

19. A method for dispensing catalyst pellets to a chemical reactor as recited in claim 17, wherein said upper and lower plates are planar plates, oriented horizontally.

* * * * *